(12) United States Patent
Sasaki et al.

(10) Patent No.: US 9,264,765 B2
(45) Date of Patent: Feb. 16, 2016

(54) METHOD FOR PROVIDING A VIDEO, TRANSMITTING DEVICE, AND RECEIVING DEVICE

(71) Applicant: Panasonic Intellectual Property Corporation of America, Torrance, CA (US)

(72) Inventors: Taiji Sasaki, Osaka (JP); Hiroshi Yahata, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/349,364

(22) PCT Filed: Aug. 6, 2013

(86) PCT No.: PCT/JP2013/004742
§ 371 (c)(1),
(2) Date: Apr. 3, 2014

(87) PCT Pub. No.: WO2014/024475
PCT Pub. Date: Feb. 13, 2014

(65) Prior Publication Data
US 2014/0245367 A1     Aug. 28, 2014

(30) Foreign Application Priority Data
Aug. 10, 2012   (JP) ................................ 2012-178623

(51) Int. Cl.
*G06F 3/00*      (2006.01)
*G06F 13/00*     (2006.01)
(Continued)

(52) U.S. Cl.
CPC ..... *H04N 21/4402* (2013.01); *H04N 21/21805* (2013.01); *H04N 21/2343* (2013.01); *H04N 21/25891* (2013.01); *H04N 21/6175* (2013.01); *H04N 5/23238* (2013.01)

(58) Field of Classification Search
CPC .................................................. H04N 5/23238
See application file for complete search history.

(56) References Cited

U.S. PATENT DOCUMENTS 6,525,731 B1 *   2/2003   Suits et al. ..................... 345/427
8,300,081 B1 *   10/2012   Sawyer ....................... 348/14.08
(Continued)

FOREIGN PATENT DOCUMENTS

| JP | 2005-277949 | 10/2005 |
|---|---|---|
| JP | 2005-333552 | 12/2005 |
| JP | 2008-28970 | 2/2008 |
| JP | 2008-244922 | 10/2008 |

OTHER PUBLICATIONS

International Search Report issued Oct. 15, 2013 in International (PCT) Application No. PCT/JP2013/004742.

*Primary Examiner* — Joshua Taylor
(74) *Attorney, Agent, or Firm* — Wenderoth, Lind & Ponack, L.L.P.

(57) ABSTRACT

A method for providing a video includes: (a) acquiring a first main video captured of a first capture space, and a second main video captured of a second capture space including a space other than the first capture space; (b) generating a wide-angle video by combining the plurality of main videos acquired in step (a); (c) acquiring user preference information via a network; (d) calculating a region to be cropped which is a region of the wide-angle video and smaller than the area captured in the wide-angle video, based on the user preference information acquired in step (c); (e) cropping the wide-angle video into the cropping region; and (f) providing, to a user, a cropped video generated by cropping the wide-angle video.

3 Claims, 48 Drawing Sheets

(51) Int. Cl.
*H04N 5/445* (2011.01)
*H04N 21/4402* (2011.01)
*H04N 21/61* (2011.01)
*H04N 21/218* (2011.01)
*H04N 21/2343* (2011.01)
*H04N 21/258* (2011.01)
*H04N 5/232* (2006.01)

(56) References Cited

U.S. PATENT DOCUMENTS

| | | | |
|---|---|---|---|
| 2009/0113505 A1* | 4/2009 | Yu | 725/114 |
| 2011/0199487 A1* | 8/2011 | Husoy et al. | 348/159 |
| 2011/0251896 A1* | 10/2011 | Impollonia et al. | 705/14.55 |
| 2012/0307068 A1* | 12/2012 | Feinson | 348/159 |
| 2013/0322689 A1* | 12/2013 | Carmichael | 382/103 |

* cited by examiner

FIG. 5
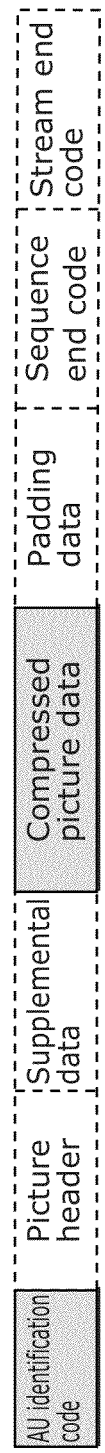

FIG. 16
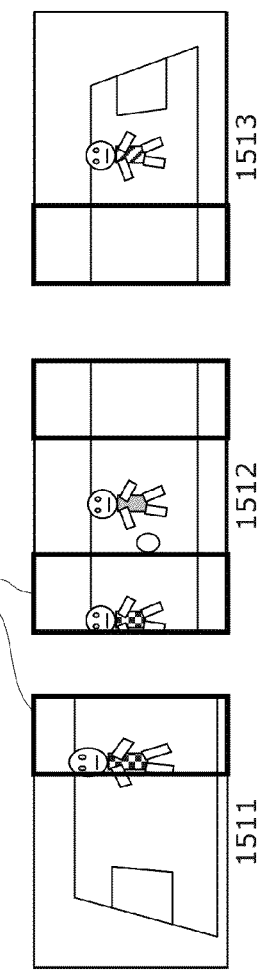
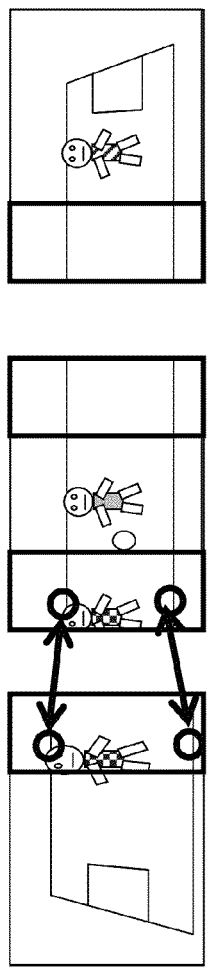
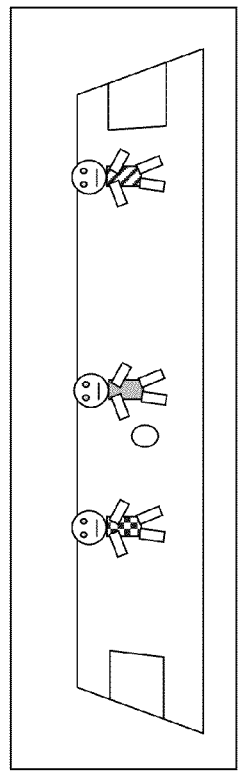

FIG. 19
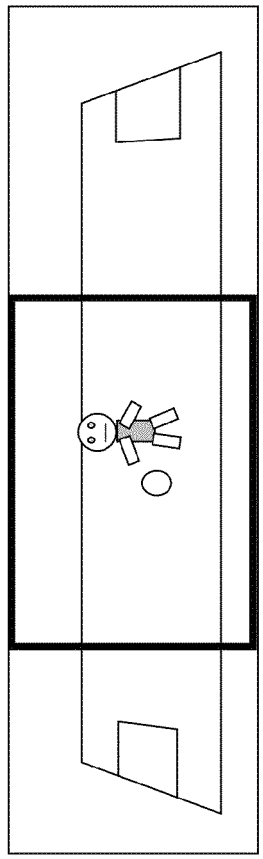
(a)
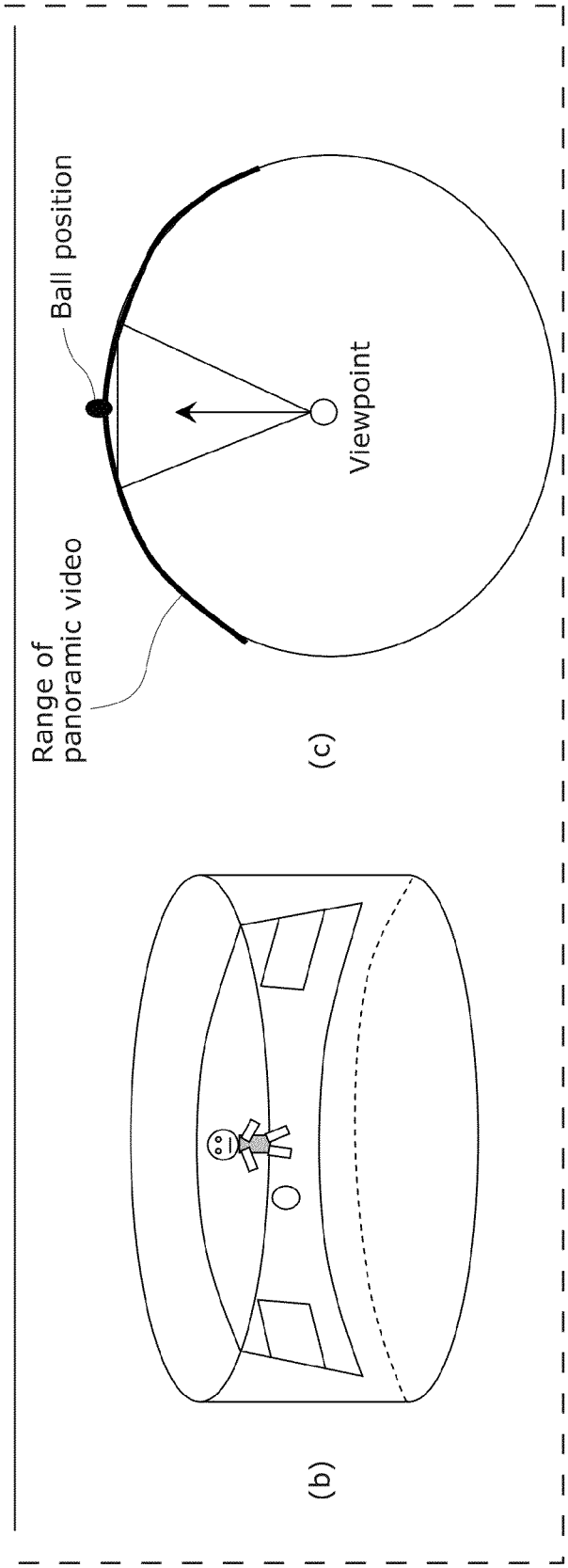
(b)
(c)

(b) Cropping region lags behind movement of ball -> natural video as if person pans camera is obtained.

(a) Cropping region moves as ball moves -> video excessively follows ball, making user feel discomfort.

FIG. 31
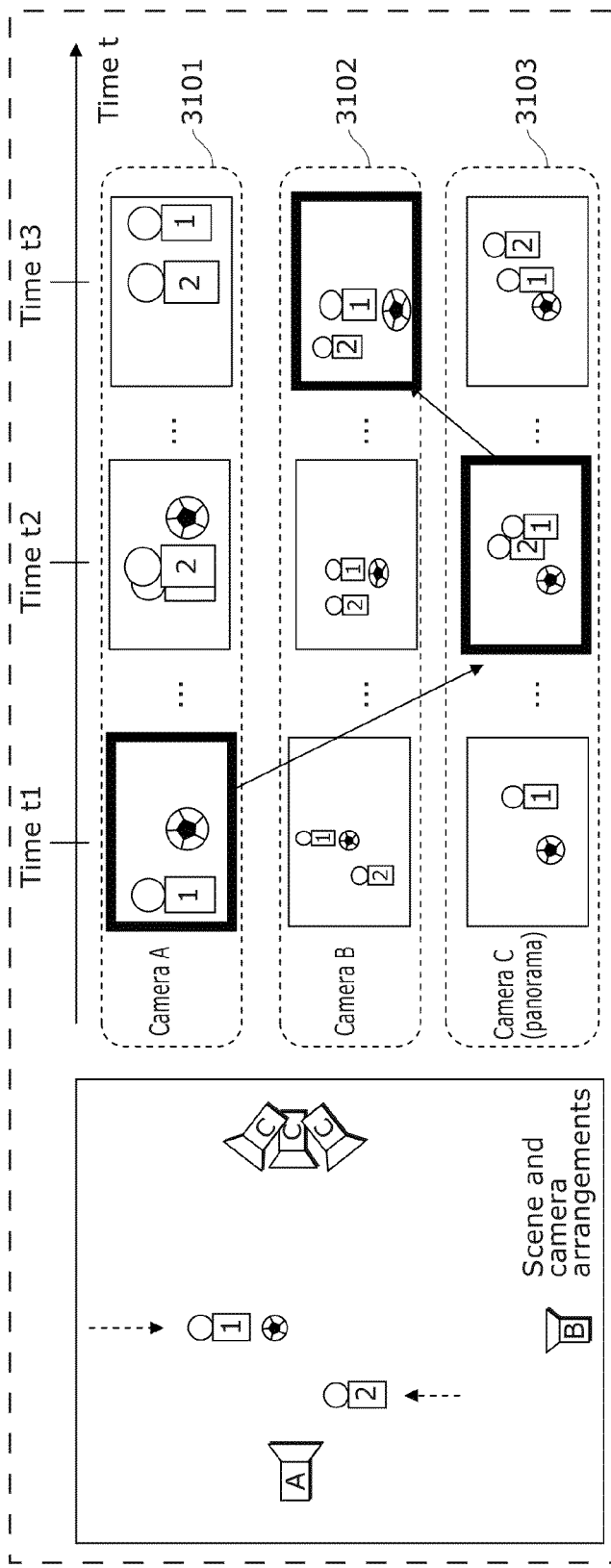
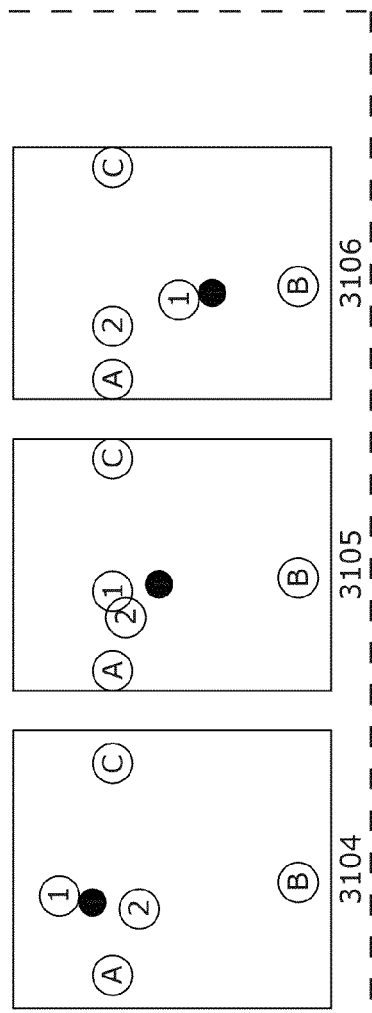

FIG. 38

| Scene | Scene start | Detection algorithm |
|---|---|---|
| Team A is on the attack | Team A initiated attack | - Player touching ball has changed to player of team A.<br>- Majority of players is in team B's environment.<br>- Majority of motion vectors of players is on team B side. |
| Team B is on the attack | Team B initiated attack | - Player touching ball has changed to player of team B.<br>- Majority of players is in team A's environment.<br>- Majority of motion vectors of players is on team A side. |

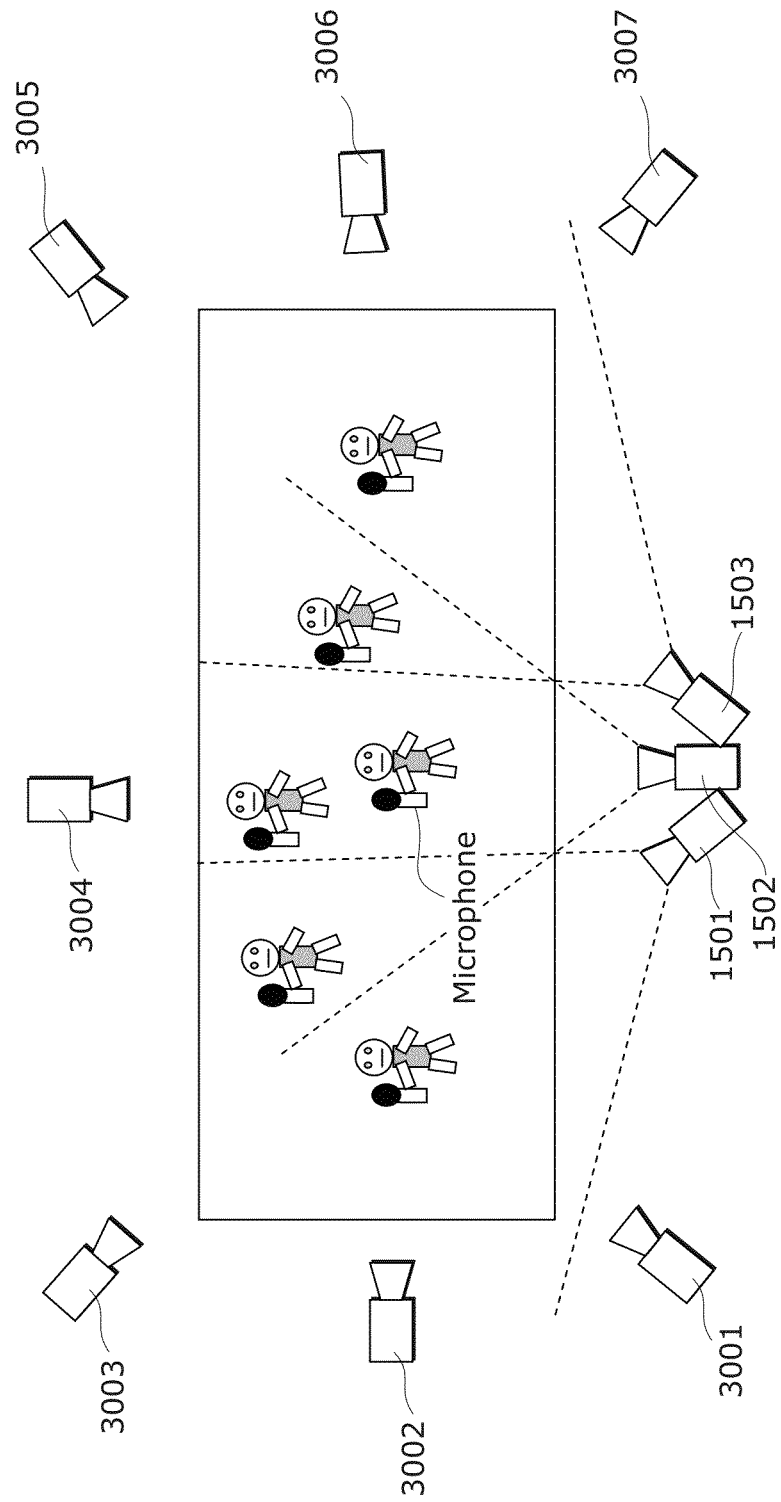

FIG. 41
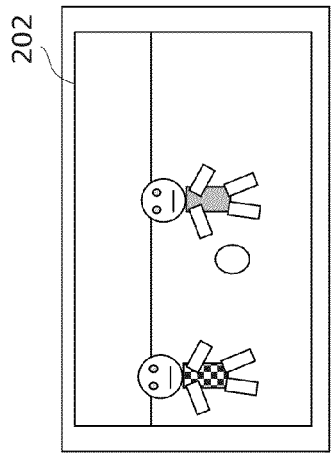
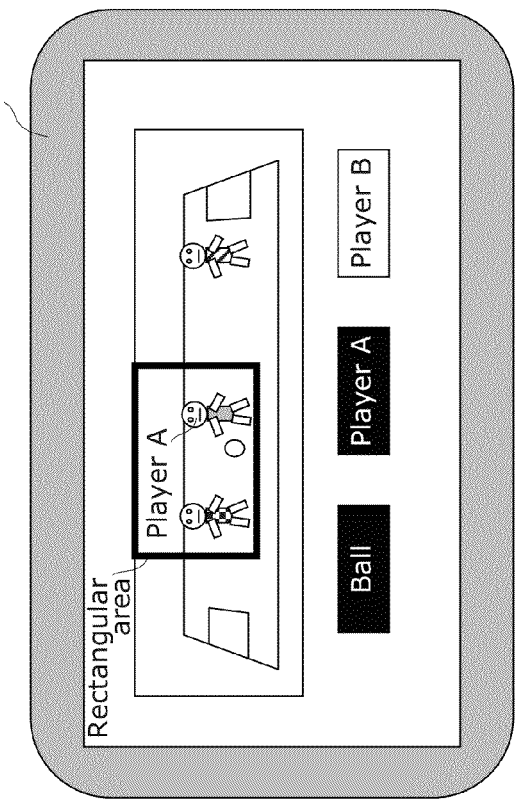

FIG. 48
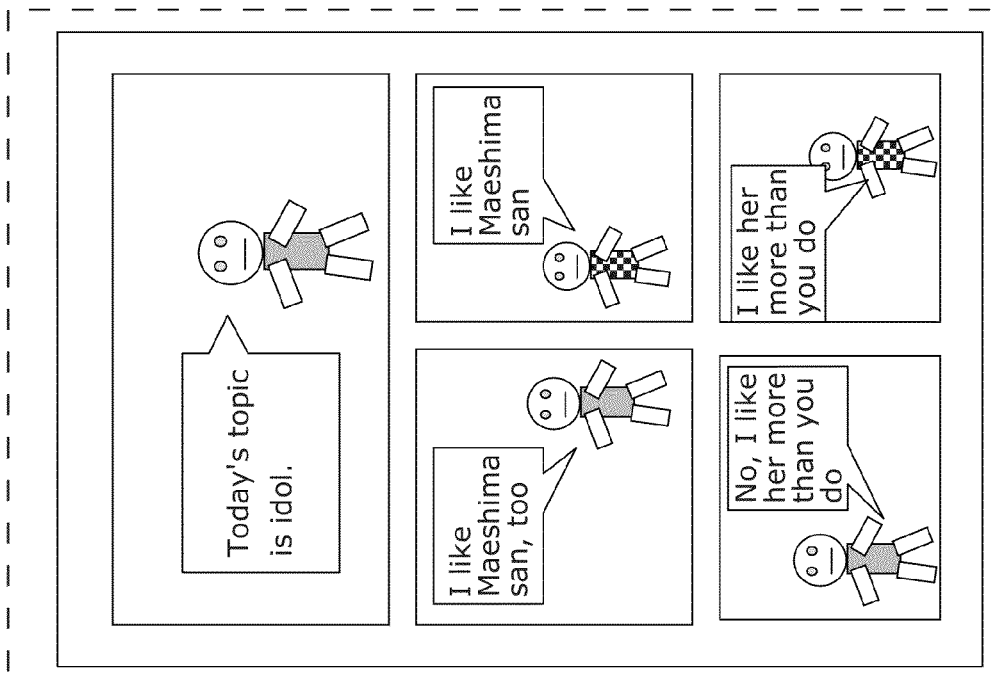
(a)
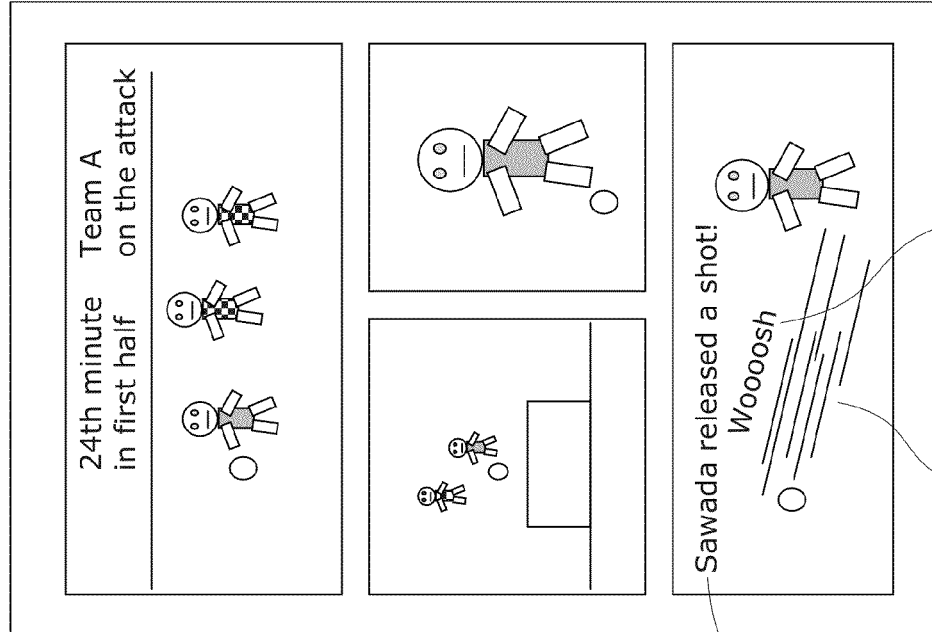
(b)

ure METHOD FOR PROVIDING A VIDEO, TRANSMITTING DEVICE, AND RECEIVING DEVICE

TECHNICAL FIELD

The present invention relates to a method for providing a video, a transmitting device, and a receiving device for creating, transmitting, and playing video content.

BACKGROUND ART

Conventional video content distribution is distributing video content produced by broadcast stations to ordinary households through broadcast waves. Advance in digitizing broadcast enables users to enjoy high-definition videos at high-quality on televisions at ordinary households. Video content of various genres such as a variety program, drama, and sport are produced and distributed.

Meanwhile, with the growing popularity of the broadband environment, services which distribute video content via the Internet are prevalent. For example, Patent Literature (PTL) 1 discloses a server on which video content from individuals can be uploaded and shared. This allows a user to select and view video content uploaded by individuals via the Internet. PTL 2 discloses a system which enables a video captured by a camera to be directly uploaded on the Internet. This allows a user to enjoy playing a distributed live video via the Internet.

CITATION LIST

Patent Literature

[PTL 1] Japanese Unexamined Patent Application Publication No. 2008-28970
[PTL 2] Japanese Unexamined Patent Application Publication No. 2005-277949

SUMMARY OF INVENTION

Technical Problem

Video content distribution and viewing systems employed by broadcast stations and video distribution services over the Internet, however, do not allow users to view videos that reflect user preference.

Thus, the present invention is made in view of the above problem, and has an object to provide a method for providing a video reflecting user preference.

Solution to Problem

To achieve the above object, a method for providing a video according to one aspect of the present invention is a method, executed by a computer, for providing a video to a user, the method including: (a) acquiring (i) a first main video captured of a first capture space which is a portion of a capture space, and (ii) a second main video captured of a second capture space including a space other than the first capture space, the second capture space being a partial space of the capture space; (b) generating a wide-angle video by combining the first main video and the second main video acquired in step (a); (c) acquiring user preference information of the user via a network; (d) calculating a cropping region, based on the user preference information acquired in step (c), the cropping region being a partial area of the wide-angle video and smaller than an area captured in the wide-angle video; (e) cropping the wide-angle video generated in step (b) into the cropping region calculated in step (d); and (f) providing the user with a cropped video generated by cropping the wide-angle video in step (e).

Advantageous Effects of Invention

The method for providing a video, the transmitting device, and the receiving device according to the present invention allow automatic generation of video content that reflects user intention, allowing users to enjoy the video content in a way of viewing as desired by personal preference.

BRIEF DESCRIPTION OF DRAWINGS

FIG. 5 is a diagram illustrating an internal structure of access units of the video stream.
FIG. 16 is a diagram illustrating a method for generating a wide-angle video.
FIG. 19 is a diagram illustrating a method for cutting (cropping) out a video from the wide-angle video.

FIG. 31 is a diagram illustrating an example of editing by an automatic video selection and editing unit.

FIG. 38 is a diagram illustrating a method of separating scenes, based on switchover between attack and defense.

FIG. 39 is a diagram illustrating application 1 of the embodiments 1 and 2.

FIG. 41 is a diagram illustrating a variation of the viewing system according to the embodiments 1 and 2.

FIG. 48 is a diagram illustrating a method for distributing electronic comics.

DESCRIPTION OF EMBODIMENTS

Hereinafter, embodiments according to the present invention will be described, with reference to the accompanying drawings.

(Underlying Knowledge Forming Basis of the Present Disclosure)

Figure 1:
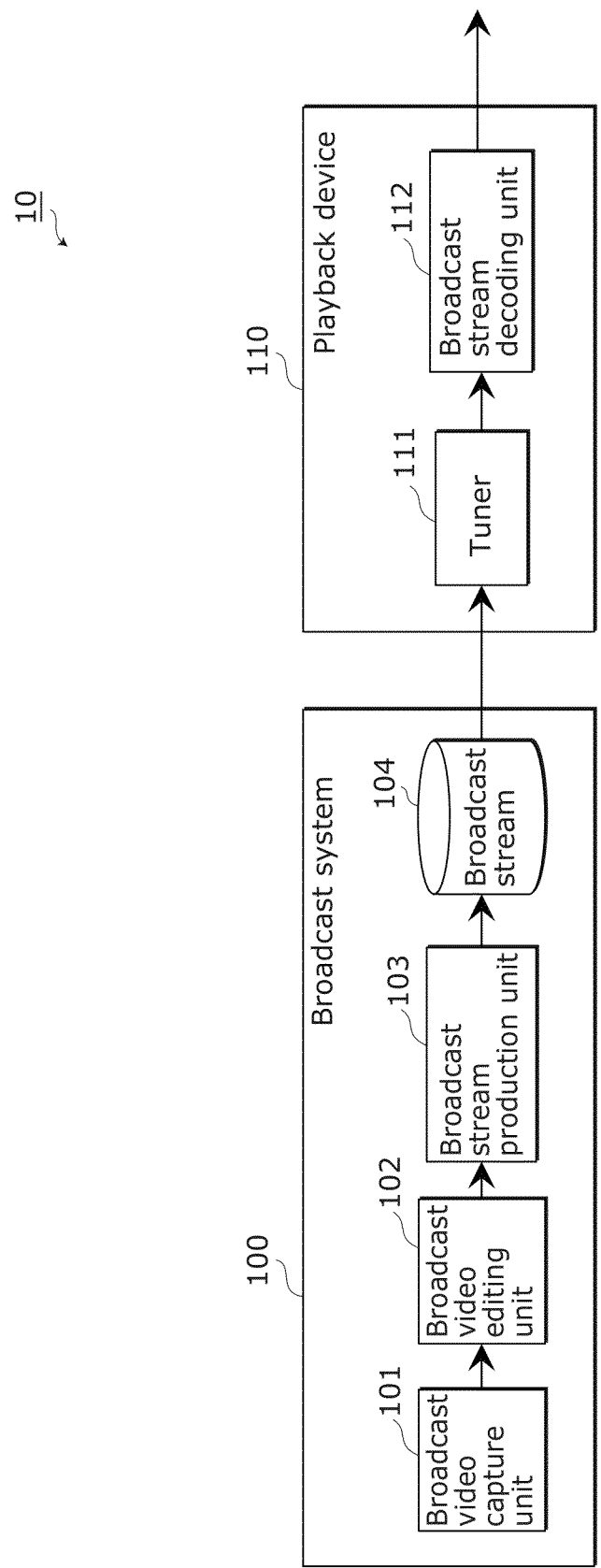
FIG. 1 is a diagram showing a configuration of a video content distribution and viewing system over broadcast waves.

In relation to the distribution and viewing system described in the Background Art section, the inventors have found the following problems:

By way of background, a video content distribution and viewing system over broadcast waves will be described with reference to FIG. 1. A distribution and viewing system 10 includes, as FIG. 1 shows, a broadcast system 100 which is a system of a broadcast station which produces and sends video content, and a playback device 110 which receives video content from broadcast waves.

The broadcast system 100 includes a broadcast video capture unit 101, a broadcast video editing unit 102, and a broadcast stream production unit 103.

The broadcast video capture unit 101 refers primarily to a video camera of a broadcast station. The broadcast video capture unit 101 captures videos and collects sounds (Hereinafter, simply referred to as "captures a video."). Specifically, videos are captured by, in general, a plurality of camera operators utilizing the broadcast video capture units 101 from various angles. For example, to produce soccer content, using the broadcast video capture units 101 camera operators at various positions capture videos such as a bird's-eye view of a soccer field, close-up of players, and those captured from different viewpoints, for example, behind the goal.

The broadcast video editing unit 102 edits video and audio which are recorded by being captured by the broadcast video capture unit 101. Specifically, in the videos captured by the plurality of broadcast video capture units 101, the broadcast video editing unit 102 selects scenes to be broadcast, and performs image processing such as superimposing graphics on the captured video, such as score information and subtitle information. A director, who is dedicated to selecting scenes, selects scenes to be broadcast from the videos captured by the plurality of broadcast video capture units 101. The director selects scenes to be utilized as appropriate, making decisions in accordance with the context of the captured content. In the example of soccer for example, the director selects, while viewing the game status, videos by cameras which have well captured players and a ball.

The broadcast stream production unit 103 converts video and audio content edited by the broadcast video editing unit 102 to a broadcast stream 104 in a format for streaming the broadcast stream 104 over broadcast waves. The broadcast stream production unit 103, if a video, for example, codes the video with a video codec such as MPEG-2 and MPEG-4 AVC and generates a video stream, and if an audio, the broadcast stream production unit 103 codes the audio with an audio codec such as AC3 and AAC and generates an audio stream, and multiplexes the video stream and the audio stream into a system stream such as an MPEG-2 TS.

The playback device 110 includes a tuner 111 and a broadcast stream decoding unit 112.

The tuner 111 has functionality of receiving the system stream and demodulating a received signal.

The broadcast stream decoding unit 112 decodes the system stream. The broadcast stream decoding unit 112 generates an uncompressed image video by decoding a compression coded video stream in the system stream, and outputs it as a video plane, thereby outputting the video to a television or the like. Moreover, the broadcast stream decoding unit 112 decodes a compression coded audio stream in the system stream, and generates audio frames in uncompressed linear pulse code modulation (LPCM), and outputs the audio frames through a loudspeaker of the television.

The above is the configuration of a conventionally prevalent video content distribution and viewing system 10 over broadcast waves.

In the video content distribution and viewing system 10 used by the broadcast station shown in FIG. 1, however, although a user is allowed to view video content produced by the broadcast station, the user cannot enjoy video content edited in a manner reflecting user intention. In other words, the video content depends on intentions of the camera operators who capture videos using the broadcast video capture units 101, and intention of a director who selects a video, from among a plurality of scenes, using the broadcast video editing unit 102. This does not reflect user preference.

For example, in the case of live soccer video, even if a user desires to view a video showing close-up of his/her favorite player, a video disproportionately showing a specific player is less likely to be broadcast because videos are edited by broadcast stations so as to be widely embraced by the general public. For example, in the case of a live video of an idol concert, even if a user desires to view a video showing close-up of his/her favorite idol, a video disproportionately showing a specific idol is less likely to be broadcast because videos are edited by broadcast stations so as to be widely embraced by the general public.

This problem is not solved by video distribution services over the Internet as disclosed in PTL 1 and PTL 2 either. While a user can select content of his/her favorite from a plurality of video content items and play the content on demand, the user cannot alter the viewing video content to one dynamically reflecting the user preference.

To solve such a problem, the method for providing a video according to one aspect of the present invention is a method, executed by a computer, for providing a video to a user, the method including: (a) acquiring (i) a first main video captured of a first capture space which is a portion of a capture space, and (ii) a second main video captured of a second capture space including a space other than the first capture space, the second capture space being a partial space of the capture space; (b) generating a wide-angle video by combining the first main video and the second main video acquired in step (a); (c) acquiring user preference information of the user via a network; (d) calculating a cropping region, based on the user preference information acquired in step (c), the cropping region being a partial area of the wide-angle video and smaller than an area captured in the wide-angle video; (e) cropping the wide-angle video generated in step (b) into the cropping region calculated in step (d); and (f) providing the user with a cropped video generated by cropping the wide-angle video in step (e).

According to the above configuration, the cropping region is specified in a wide-angle video which is generated by combining a plurality of videos based on the user preference information, and a cropped video generated by cropping the wide-angle video to the specified cropping region is provided to the user. Thus, the user can be provided with a video in accordance with the user preference information.

Moreover, for example, the user preference information may indicate a viewed subject which the user desires to view, the method may further include (g) locating a position of the viewed subject in the wide-angle video by performing image recognition on the wide-angle video based on the user preference information, wherein in step (d), a region which includes the viewed subject in the wide-angle video may be calculated as the cropping region, using the position of the viewed subject located in step (g).

According to the above configuration, by performing, in the wide-angle video, the image recognition on the viewed subject which is a subject the user desires to view and specified based on the user preference information, a region captured of the viewed subject in the wide-angle video can be specified as the cropping region. Thus, the user can be provided with a video captured of the subject which the user desires to view.

Moreover, for example, in step (d), a region, which is in the wide-angle video and defined by a cropping frame when the position of the viewed subject is matched with a predetermined reference position in the cropping frame, may be calculated as the cropping region, the cropping frame having a predetermined size, for cropping the wide-angle video.

According to the above configuration, the cropping region is specified so that a position of the viewed subject matches with a reference position of the cropping frame for cropping the wide-angle video. Thus, a video captured of the viewed subject can be reliably obtained as the cropped video.

Moreover, for example, in step (d), a region, which is in the wide-angle video and defined by the cropping frame when the position of the viewed subject in a frame a predetermined time prior to a frame to be processed is matched with the predetermined reference position in the cropping frame, may be calculated as the cropping region.

The movement of the cropping region can be lagged behind the movement of the viewed subject, thereby generating a video as if a person operates a camera. Thus, a video which is natural to the user without making the user feel discomfort can be provided.

Moreover, for example, step (a) may further include acquiring a sub video captured of at least a partial space of the capture space at a different angle from the first main video and the second main video at a same timing as the first main video and the second main video, the method may further include: (h) segmenting, based on a predetermined algorithm, each of the cropped video obtained in step (e) and the sub video acquired in step (a) into plural scenes; and (i) selecting, for each of the plural scenes, one of the cropped video and the sub video, based on the user preference information acquired in step (c), wherein in step (f), the one of the cropped video and the sub video selected in step (i) may be provided to the user.

According to the above configuration, each of the videos is segmented into a plurality of scenes, and a video best suited for each scene can be selected in accordance with the user preference information. Thus, a video more suited for the user can be provided.

Moreover, for example, in step (h), each of the cropped video and the sub video may be segmented into the plural scenes at predetermined time intervals, independent of the predetermined algorithm.

According to the above configuration, the scenes are segmented at predetermined time intervals, independent of the predetermined algorithm. Thus, even if a scene has a long length due to the scene segmentation by the predetermined algorithm, the scene can be further segmented at predetermined time intervals. This can make small a processing unit according to the method for providing a video. Thus, a plurality of videos can be processed substantially in real time.

Moreover, for example, the predetermined algorithm may depend on a type of an event taking place in the capture space.

According to the above configuration, the predetermined algorithm is different for different event types. Thus, scenes can be segmented in a manner suited for an event type.

Moreover, for example, in step (h), if the type of the event taking place in the capture space is sport, each of the cropped video and the sub video may be segmented into plural scenes at a timing when a result of determining, by the predetermined algorithm, whether a state of the event is "In play" or "Out of play" changes from one of the "In play" and the "Out of play" to the other.

If a type of the event is sport, scenes are segmented into "In play" and "Out of play," thereby suitably segmenting the scenes.

Moreover, for example, in step (i), if the type of the event taking place in the capture space is sport, a video may be selected from among videos of an immediately preceding "In play" scene when the "In play" is switched to the "Out of play," instead of selecting a scene of the "Out of play."

A video of the immediately preceding "In play" scene is selected upon a switchover from "In play" to "Out of play," thereby providing the user with a replay.

Moreover, for example, in step (h), if the type of the event taking place in the capture space is concert, each of the cropped video and the sub video may be segmented into plural scenes by determining, by the predetermined algorithm, whether a state of the event is "In performance" or "Out of performance."

If a type of the event is concert, scenes are segmented into "In performance" and "Out of performance," thereby suitably segmenting the scenes.

Moreover, for example, in step (h), if the type of the event taking place in the capture space is a discussion, each of the cropped video and the sub video may be segmented into plural scenes by determining, by the predetermined algorithm, a changeover of a speaker during the discussion, among a plurality of participants of the discussion.

If a type of the event is discussion, scenes are segmented at a timing when a speaker is changed, thereby suitably segmenting the scenes.

Moreover, for example, the method for providing a video may further include (j) evaluating each of the plural scenes obtained in step (h), based on the user preference information acquired in step (c) and a predetermined metric, wherein in step (i), one of the cropped video and the sub video may be selected for each scene, based on a result of evaluating the scene in step (j).

A video to be provided is selected based on a result of evaluation on a plurality of scenes, thereby providing a video more suited to the user preference.

Moreover, for example, the predetermined metric may include an indicator for determining a higher value on a video scene captured by a camera, among a plurality of cameras capturing videos, that has an angle of view covering the viewed subject and is closer to the viewed subject.

A higher value is determined on a video scene that is captured by a camera that is closer to the viewed subject, thereby selecting a video suited to the user preference.

Moreover, for example, the predetermined metric may include an indicator for determining a higher value on a video scene captured by a camera, among a plurality of cameras capturing videos, that has an angle of view covering the viewed subject and includes a less number of objects between the viewed subject and the camera.

A higher value is determined on a video scene which includes a less number of objects between the viewed subject and a camera, thereby selecting a video suited to the user preference.

Moreover, for example, the predetermined metric may include an indicator for determining a higher value on a video scene that includes a larger area of the viewed subject and is captured by a camera, among a plurality of cameras capturing videos, that has an angle of view covering the viewed subject.

The larger the viewed subject is captured the higher a video scene is evaluated, thereby selecting a video suited to the user preference.

Moreover, for example, the predetermined metric may include two or more indicators of: a first indicator for determining a higher value on a video scene captured by a camera, among a plurality of cameras capturing videos, that has an angle of view covering the viewed subject and is closer to the viewed subject; a second indicator for determining a higher value on a video scene captured by a camera, among a plurality of cameras capturing videos, that has an angle of view covering the viewed subject and includes a less number of objects between the viewed subject and the camera; and a third indicator for determining a higher value on a video scene that includes a larger area of the viewed subject and is captured by a camera, among a plurality of cameras capturing videos, that has an angle of view covering the viewed subject, and in step (j), each of the plural scenes may be evaluated, based on a total sum of weighted values obtained by applying predefined weights, which are associated with the respective two or more indicators, to a plurality of results of evaluating the scene based on the two or more indicators.

A video scene can be evaluated by a combination of a plurality of metrics. Thus, a video suited to the user preference can be variously selected.

Moreover, for example, in step (c), the user preference information input by the user to an information terminal connected to the computer via the network may be acquired via the network.

The user can acquire a video reflecting the preference information by operating an information terminal at hand, thereby readily viewing a video suited to the user preference.

These general and specific aspects may be implemented using a system, a transmitting device, a receiving device, an integrated circuit, a computer program, or a computer-readable recording medium such as a CD-ROM, or any combination of systems, the transmitting device, the receiving device, integrated circuits, computer programs, or computer-readable recording media.

Hereinafter, a method for providing a video, a transmitting device, and a receiving device according to one aspect of the present invention will be more specifically described, with reference to the accompanying drawings.

It should be noted that the embodiments described below are each merely an illustration of the present invention. Values, shapes, materials, components, disposition or a form of connection between the components, steps, and the order of the steps are merely illustrative and are not intended to limit the present invention. Moreover, among components of the embodiments below, components not set forth in the independent claims indicating the top level concept of the present invention will be described as optional components.

(Embodiment 1)

A method for providing a video, a transmitting device, and a receiving device for generating, transmitting, and playing video content according to the present embodiment will be described.

First, the use of the receiving device according to the present embodiment will be described, with reference to FIG. 2.

Utilizing the receiving device, a user plays video content received by a communication I/F or the like. Herein, a digital TV 202 will be described as shown in FIG. 2, by way of example of the receiving device.

Figure 2:
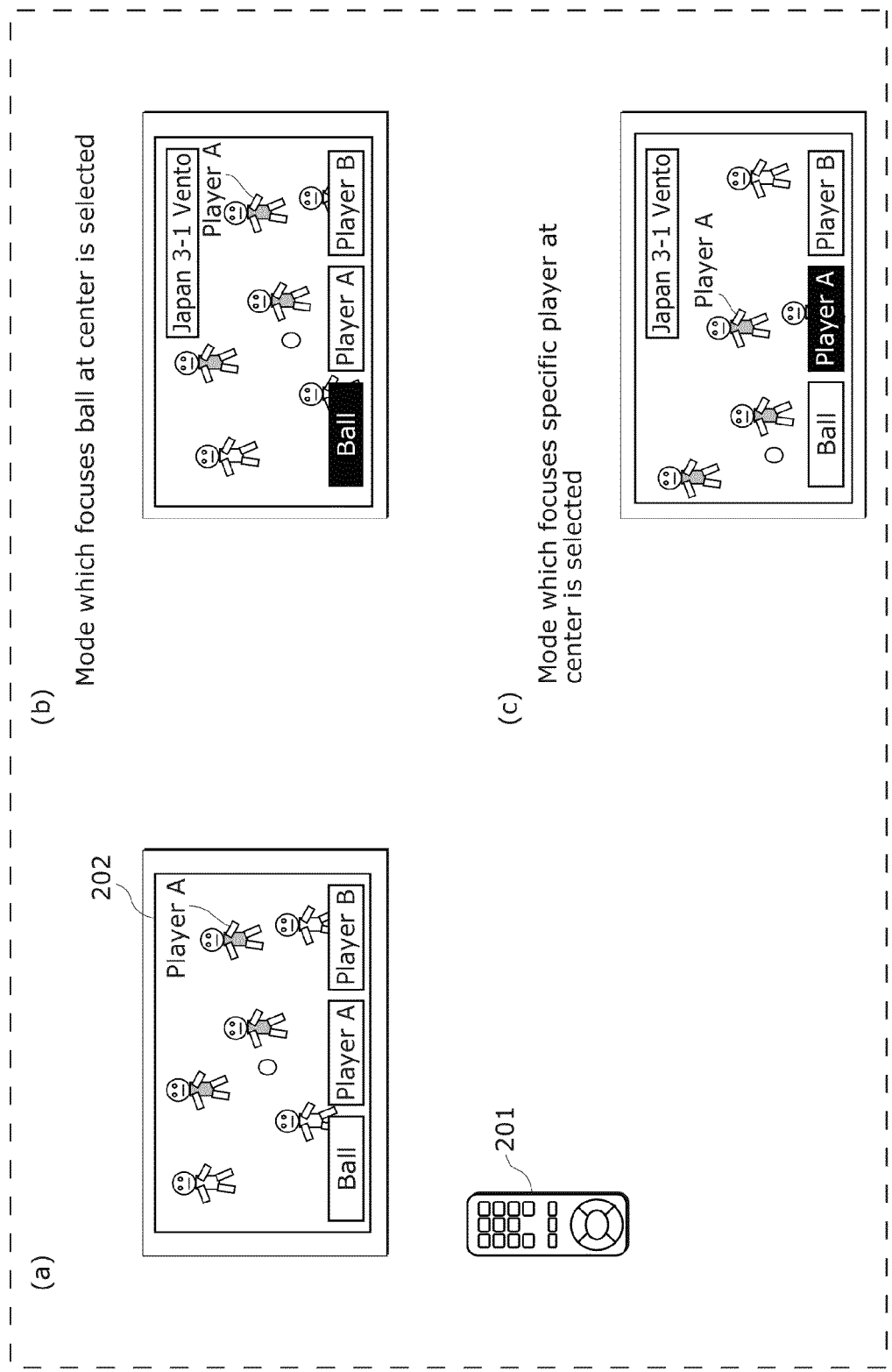
FIG. 2 is a diagram illustrating the use of a playback device according to an embodiment 1.

As (a) of FIG. 2 shows, the digital TV 202 is provided with a remote controller 201 as a user interface. A user operates the digital TV 202 by providing the remote controller 201 with input. The digital TV 202 displays a menu screen for reflecting user preference. In the example of FIG. 2, the digital TV 202 displays a screen on which a user is allowed to select a user's preferred object to be focused and shown at the center in a video with respect to soccer. If the user desires to view a video showing, for example, a "ball" at the center, a video focusing mainly a ball at the center as shown in (b) of FIG. 2 is displayed once the user selects a button "Ball" on the menu screen. Then, the user can view a video showing a ball at the center. If the user desires to view a video showing, for example, a "player A" at the center, a video focusing mainly a player A at the center as shown in (c) of FIG. 2 is displayed once the user selects a button "Player A." Then, the user can view a video showing the player A at the center. As such, the use of the playback device according to the present embodiment allows a user to view video content in accordance with the user preference.

This is the end of description of the use of the receiving device.

Next, a typical structure of a stream, which is transmitted by digital television broadcast waves or communications, will be described.

Transmission by digital television broadcast waves or the like employs a digital stream in a form of an MPEG-2 transport stream. The MPEG-2 transport stream is a standard for multiplexing and transmitting various streams such as a video or audio. The MPEG-2 transport stream is standardized by ISO/IEC13818-1 or ITU-T Recommendation H222.0.

Figure 3:
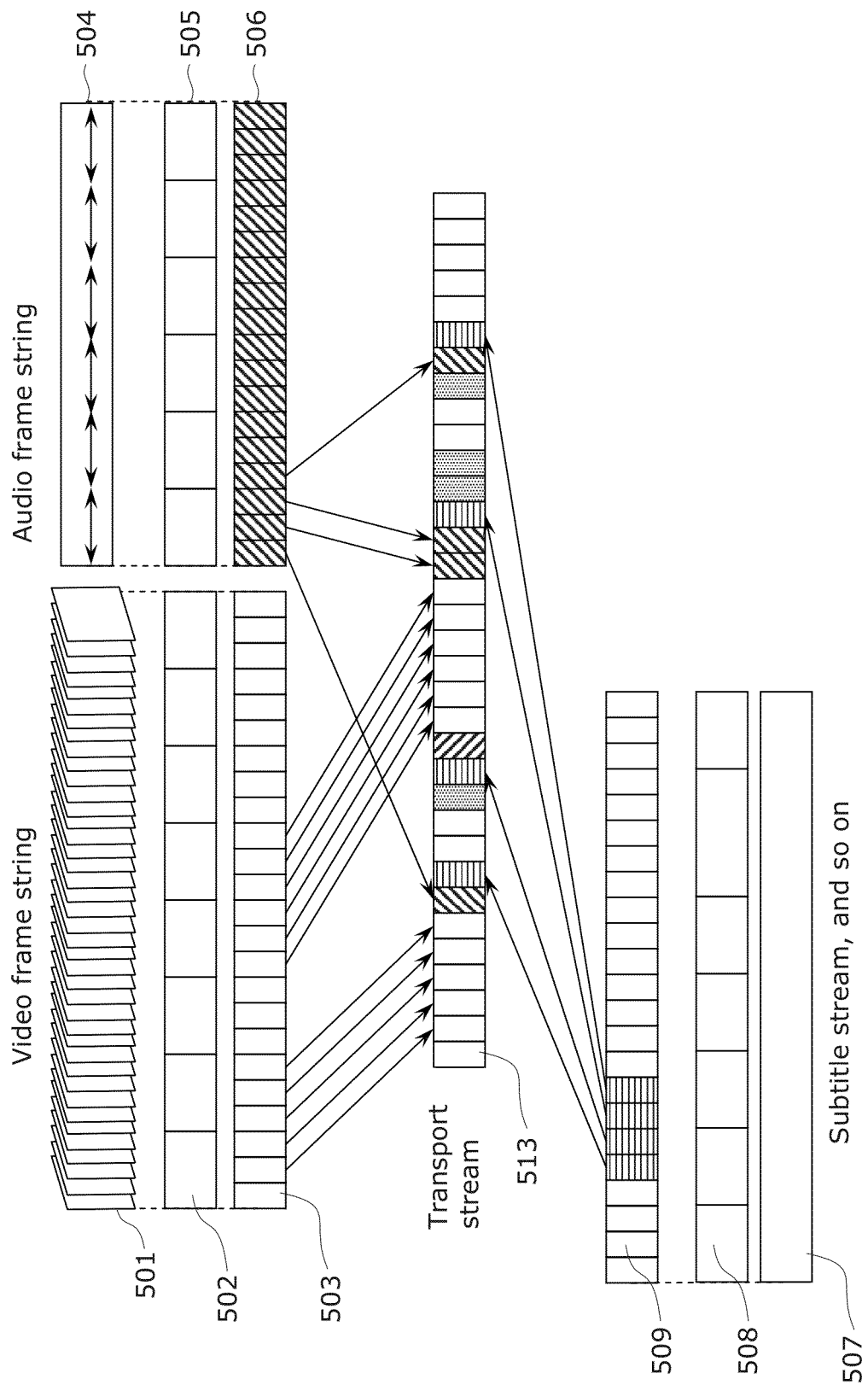
FIG. 3 is a diagram showing a structure of a digital stream in a form of a transport stream.

FIG. 3 is a diagram showing a structure of the digital stream in the form of the MPEG-2 transport stream. As the figure shows, a transport stream is obtained by multiplexing a video stream, audio stream, subtitle stream, and so on. The video stream stores a main video of a program, the audio stream stores the first sound channel and second sound channel of the program, and the subtitle stream stores subtitle information of the program. The video stream is encoded and recorded by a scheme such as MPEG-2 and MPEG-4 AVC. The audio stream is compression encoded, and recorded by a scheme such as Dolby AC-3, MPEG-2 AAC, MPEG-4 AAC, and HE-AAC.

Figure 11:
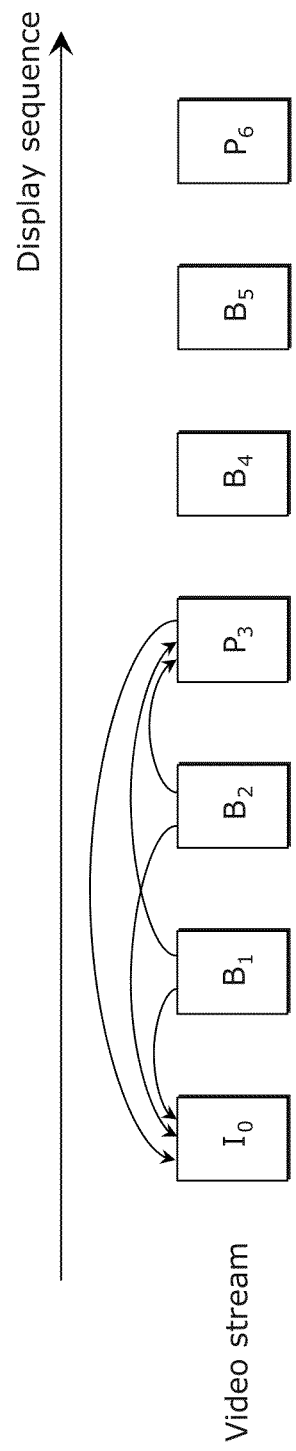
FIG. 11 is a diagram illustrating a referential relationship in the video stream.

A structure of the video stream will be described. In compression encoding a video by, for example, MPEG-2, MPEG-4 AVC, and SMPTE VC-1, the amount of data is compressed utilizing redundancy in spatial and temporal directions of a motion picture. Inter-picture predictive coding is employed as the method which utilizes the redundancy in temporal direction. For encoding a given picture in inter-picture predictive coding, a picture displayed earlier or later than the given picture is used as a reference picture. Then, an amount of motion of the picture from the reference picture is detected and motion compensation is performed on the picture, using the amount of motion, and the redundancy in spatial direction is removed from a difference value between the motion compensated picture and the picture to be encoded, thereby compressing the amount of data of the picture. FIG. 11 shows a typical pictures reference structure of a video stream. Arrows indicate pictures which are referred to and compressed.

Herein, a picture on which intra-picture predictive coding is performed using only a picture to be coded that has no reference picture will be referred to as an I-picture. A picture is a unit of encoding, including both frames and fields. A picture on which inter-picture predictive coding is performed with reference to a processed picture will be referred to as a P-picture. A picture on which inter-picture predictive coding is performed with reference to two processed pictures will be referred to as a B-picture. A picture which is referred to by another picture in the B-picture will be referred to as a Br-picture. A frame where the picture structure is a frame structure and a field where the picture structure is a field structure will be each referred to as a video access unit, herein.

Figure 4:
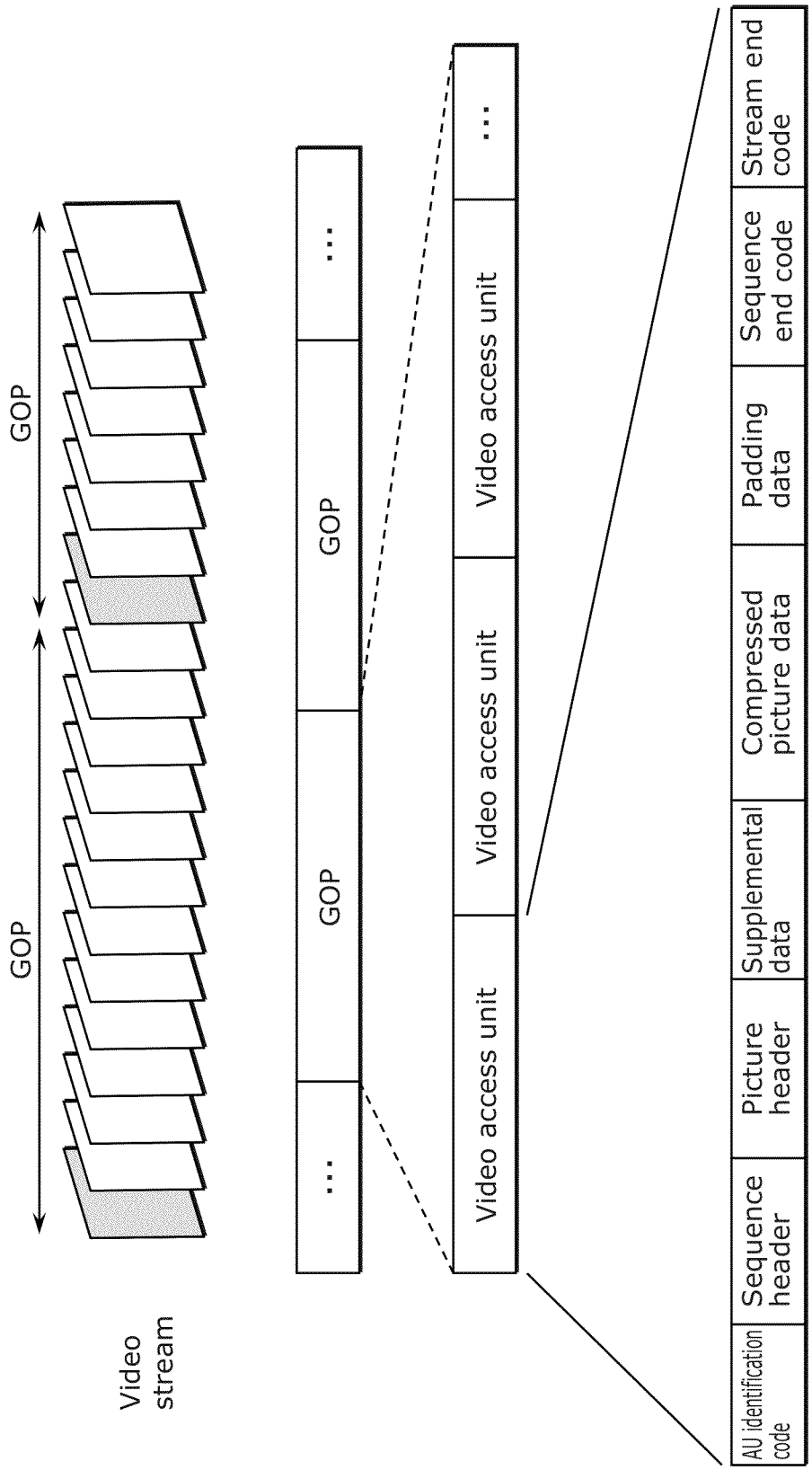
FIG. 4 is a diagram illustrating a structure of a video stream.

The video stream has a hierarchical structure as shown in FIG. 4. The video stream includes a plurality of groups of pictures (GOP). Using the GOP as a basic unit for the encoding process allows editing and random access to a motion picture. The GOP includes one or more video access units. The video access unit is a unit in which encoded data of a picture is stored. In the case of frame structure, data of one frame is stored in a video access unit. In the case of field structure, data of one field is stored. Each video access unit includes an AU identification code, a sequence header, a picture header, supplemental data, compressed picture data, padding data, a sequence end code, and a stream end code. Each data is, in the case of MPEG-4 AVC, stored in a unit called NAL unit.

The AU identification code is a start code indicating the beginning of an access unit. The sequence header is a header storing common information to play sequences each of which include a plurality of video access units. Information such as resolution, a frame rate, aspect ratio, and a bitrate are stored in the sequence header. The picture header is a header storing information such as a scheme for encoding an entire picture. The supplemental data is additional information which is not essential in decoding compressed data. For example, the supplemental data stores GOP structure information and text of closed caption which is displayed on TV in synchronization with a video. The compressed picture data stores data of a compression coded picture. The padding data stores non-significant data which is for formatting the video access unit. For example, the padding data is used as stuffing data for keeping a fixed bitrate. The sequence end code is data indicating the end of the play sequence. The stream end code is data indicating the end of a bitstream.

The structures of the AU identification code, the sequence header, the picture header, the supplemental data, the compressed picture data, the padding data, the sequence end code, and the stream end code depend on a video encoding scheme.

In the case of MPEG-4 AVC for example, the AU identification code, the sequence header, the picture header, the compressed picture data, the supplemental data, the padding data, the sequence end code, and the stream end code respectively correspond to an access unit delimiter (AU delimiter), a sequence parameter set (SPS), a picture parameter set (PPS), a plurality of slices, supplemental enhancement information (SEI), FillerData, End of Sequence, and End of Stream.

In the case of MPEG-2 for example, the sequence header corresponds to sequence_Header and sequence_extension, group_of_picture_header, the picture header corresponds to picture_header and picture_coding_extension, the compressed picture data corresponds to a plurality of slices, the supplemental data corresponds to user_data, and the sequence end code corresponds to sequence_end_code. While the AU identification code does not exist in this case, it should be noted that the use of a start code of each header allows identifying breaks between the access units.

Each data is not always necessary. For example, the sequence header may be necessary only for a video access unit at the beginning of the GOP, and may not be required for the other video access units. Alternatively, depending on an encoding scheme, a video access unit itself may not include a picture header and a picture header at the preceding video access unit in the encoding order may be referred to.

As FIG. 5 shows, the video access unit at the beginning of the GOP stores data of the I-picture as the compressed picture data, always stores the AU identification code, the sequence header, the picture header, and the compressed picture data, and may store the supplemental data, the padding data, the sequence end code, and the stream end code. The video access units at other than the beginning of the GOP always store the AU identification code and the compressed picture, and may store the supplemental data, the padding data, the sequence end code, and the stream end code.

Next, cropping region information and scaling information will be described, with reference to FIGS. 6 and 7.

Depending on a video encoding scheme, an encoded frame region and a region to be actually displayed may be different.

Figure 6:
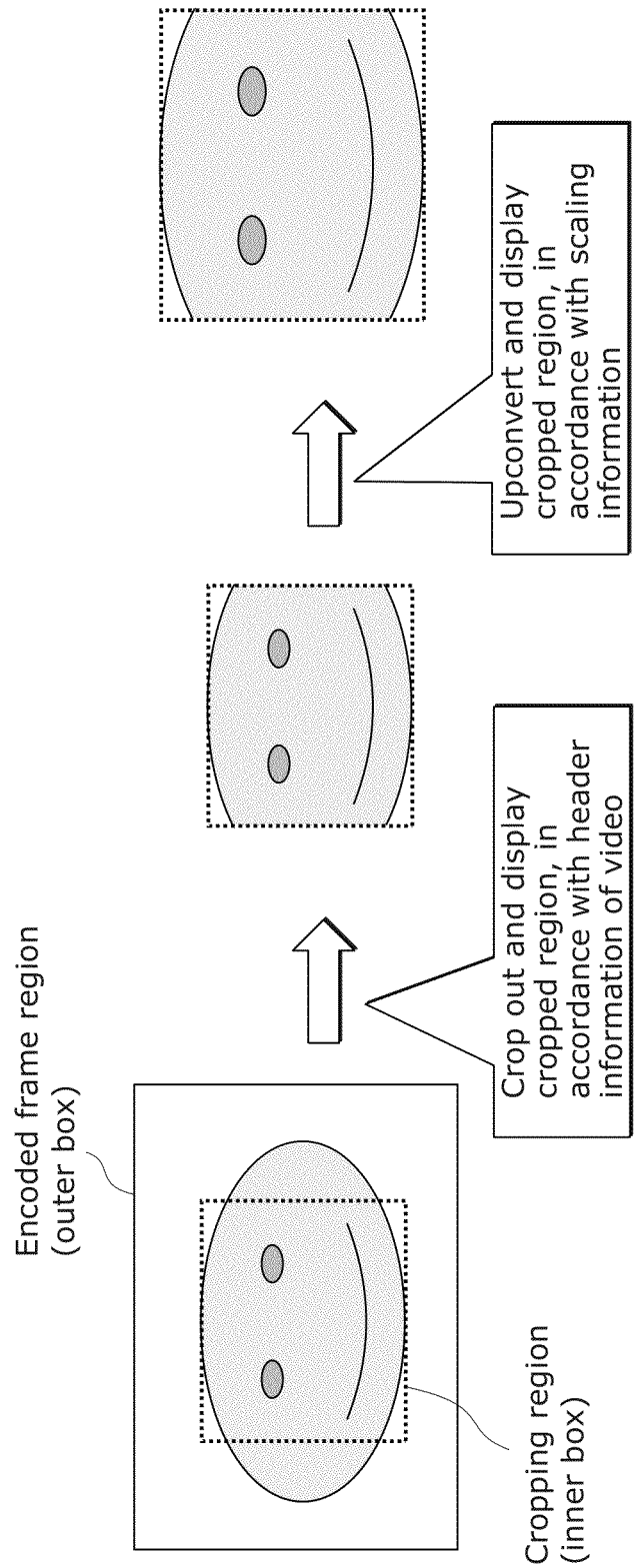
FIG. 6 is a diagram illustrating cropping region information and scaling information.
Figure 7:
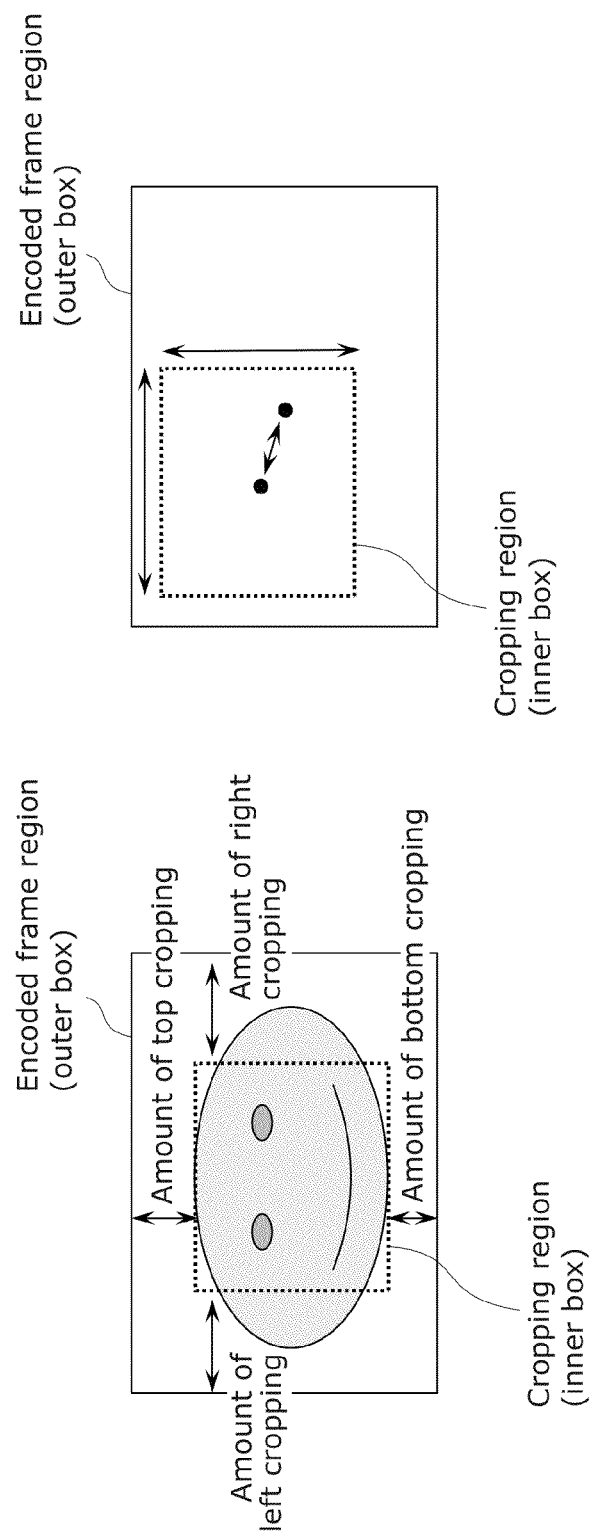
FIG. 7 is a diagram illustrating a method of specifying the cropping region information and scaling information in detail.

As FIG. 6 shows, a region to be actually displayed may be specified as a "cropping region" in the encoded frame region. For example, in the case of MPEG-4 AVC, the region to be actually displayed can be specified using information frame_cropping stored in the SPS. Information frame_cropping specifies differences between overline/underline/left line/right line of the cropping region and respective overline/underline/left line/right line of the encoded frame region, as amounts of top cropping/bottom cropping/left cropping/right cropping, respectively, as shown in (a) of FIG. 7. More specifically, to specify the cropping region, frame_cropping_flag is set to 1, and the amounts of top cropping/bottom cropping/left cropping/right cropping are respectively specified to frame_crop_top_offset/frame_crop_bottom_offset/frame_crop_left_offset/frame_crop_right_offset. In the case of MPEG-2, the cropping region can be specified as shown in (b) of FIG. 7, using the length and width in size of the cropping region (display_horizontal_size and display_vertical_size of sequence_display_extension) and difference information (frame_centre_horizontal_offset and frame_centre_vertical_offset of picture_display_extension) between the center of the encoded frame region and the center of the cropping region.

Moreover, depending on a video encoding scheme, there exists scaling information which indicates a method of scaling for actually displaying the cropping region on, for example, a television. This is set as, for example, an aspect ratio. Using the aspect ratio information, the playback device upconverts and displays the cropping region. For example, in the case of MPEG-4 AVC, the aspect ratio information (aspect_ratio_idc) is stored as the scaling information in SPS. In the case of MPEG-4 AVC, to enlarge and display a cropping region of 1440×1080 to 1920×1080, the aspect ratio is set to 4:3. In this case, the cropping region is horizontally upconverted to 4/3-fold (1440×4/3=1920) to be enlarged to 1920×1080, and displayed. In the case of MPEG-2, the aspect ratio information (aspect_ratio_information) is similarly stored in sequence_header.

This is the end of description of the video stream.

Each of streams included in the transport stream is identified by a stream identification ID called PID. By extracting a PID packet, a decoder can extract a target stream. Correspondence between a PID and a stream is stored in a descriptor of a PMT packet described below.

FIG. 3 schematically illustrates how a transport stream is multiplexed. First, a video stream 501 which includes a plurality of video frames, an audio stream 504 which includes a plurality of audio frames are respectively converted to a PES packet string 502 and a PES packet string 505, and then to TS packets 503 and TS packets 506. Likewise, data of a subtitle stream 507 is converted to a PES packet string 508, and further to TS packets 509. A MPEG-2 transport stream 513 is formed by multiplexing these TS packets into a stream.

Figure 8:
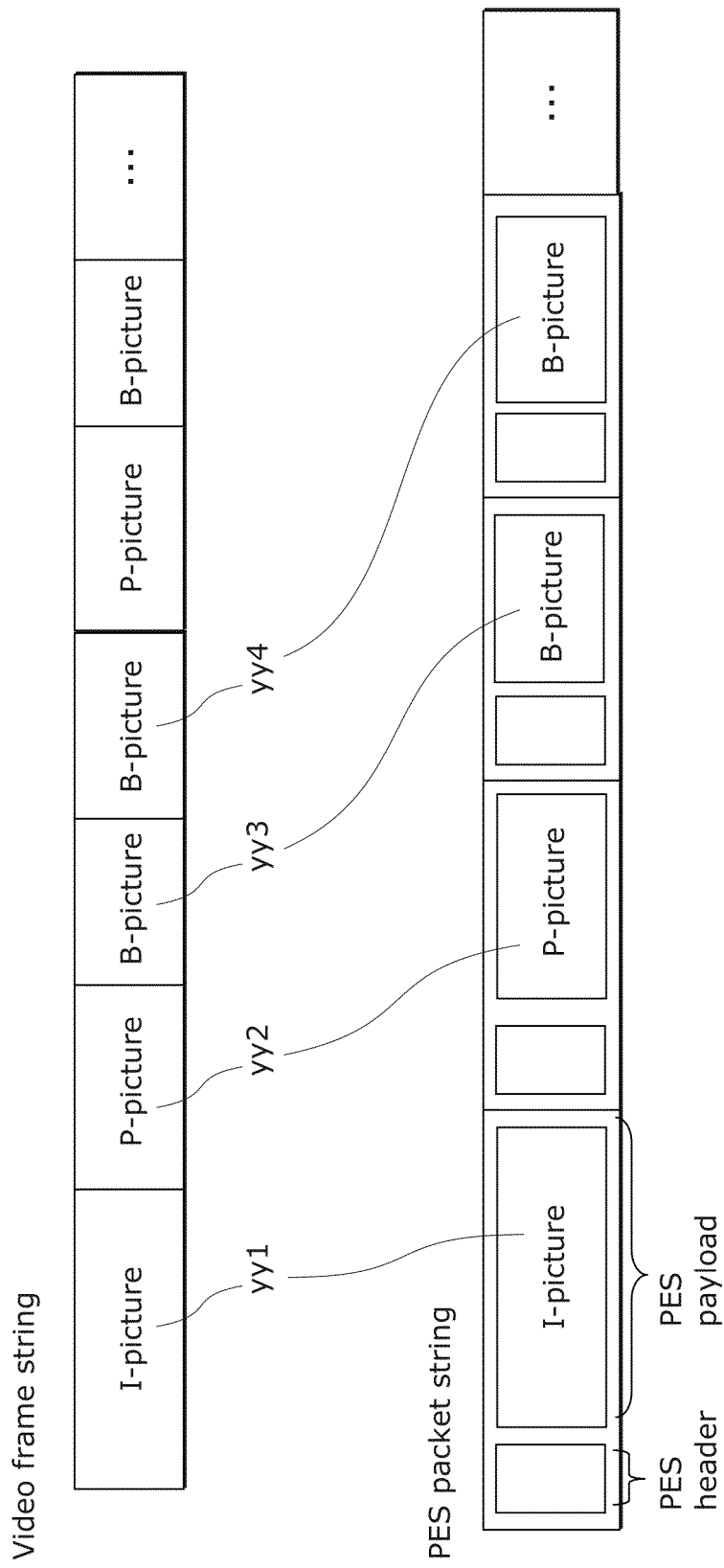
FIG. 8 is a diagram illustrating a structure of a PES packet.

FIG. 8 illustrates how the video stream is stored in a PES packet string in further detail. The first row in the figure shows a video frame string of the video stream. The second row shows a PES packet string. As indicated by yy1, yy2, yy3, and yy4 in the figure, the video frame string is divided into the I-pictures, the B-pictures, and the P-pictures which are a plurality of video presentation units in the video stream, and each picture is stored in payload of a PES packet. Each PES packet has a PES header. The PES header stores a presentation time-stamp (PTS) which is a time at which each picture is displayed, and a decoding time-stamp (DTS) which is a time at which the picture is decoded.

Figure 9:
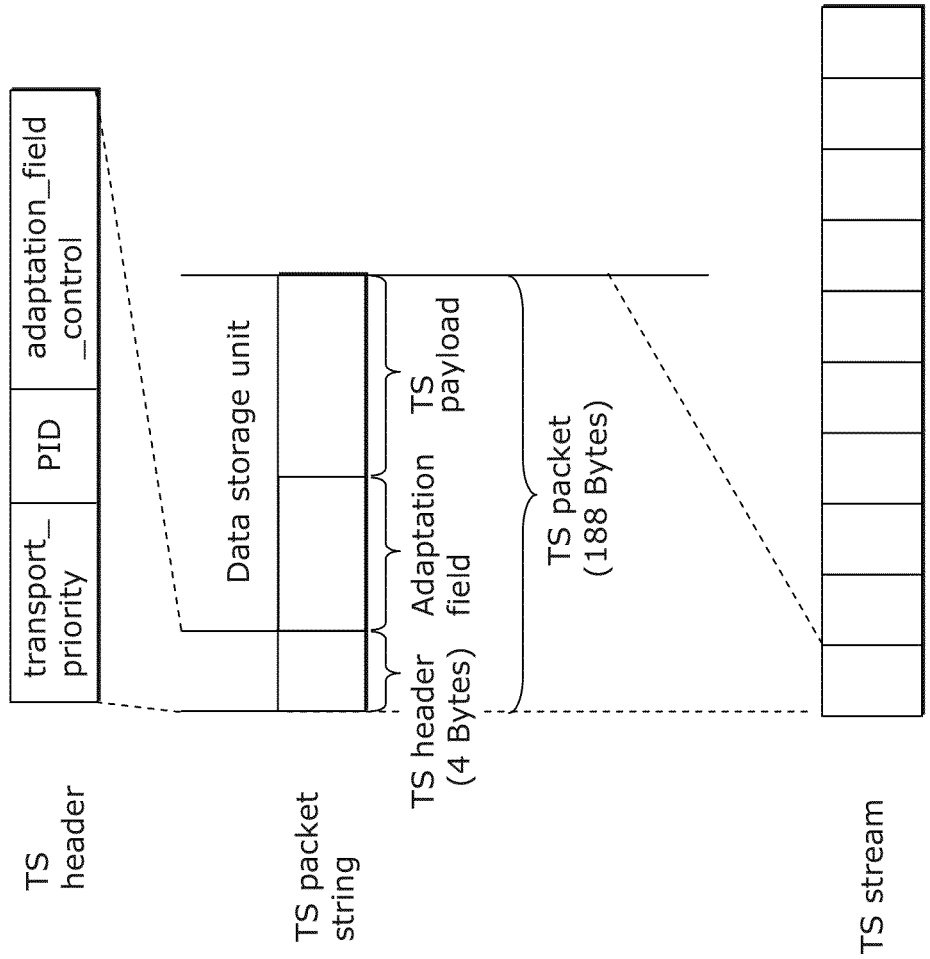
FIG. 9 is a diagram showing a data structure of TS packets included in a transport stream.

FIG. 9 is a diagram showing a data structure of TS packets included in the transport stream. The TS packet is a 188-Byte fixed length packet which includes a TS header of 4 Bytes, an adaptation field, and a TS payload. The TS header includes transport_priority, PID, adaptaion_field_control, and so on. The PID is, as mentioned earlier, an ID for identifying a stream multiplexed into a transport stream. transport_priority is information for identifying a packet type of TS packets having the same PID. adaptation_field_control is information for controlling structures of the adaptation field and the TS payload. Both or either one of the adaptation field and the TS payload may exist, which is indicated by adaptation_field_control. If adaptation_field_control is 1, only the TS payload exists, if adaptation_field_control is 2, only the adaptation field exists, and if adaptation_field_control is 3, both the TS payload and the adaptation field exist.

The adaptation field is a storage area storing information such as PCR, or storing stuffing data for causing a TS packet to have a 188-byte fixed length. A PES packet is divided and a divided portion is stored in the TS payload.

Examples of the TS packets included in the transport stream include a program association table (PAT), a program map table (PMT), and a program clock reference (PCR) besides each stream such as video stream, audio stream, and subtitle stream. These packets are referred to as program specific information (PSI). The PAT indicates a PID of the PMT to be utilized in the transport stream. PID of the PAT itself is registered as 0. The PMT includes a PID of each stream such as video stream, audio stream, and subtitle stream included in the transport stream, and stream attribute information corresponding to each PID, and also includes various descriptors related to the transport stream. Examples of the descriptors include copy control information indicating allow or disallow copying an AV stream. For synchronization between arrival time of the TS packet at the decoder and a system time clock (STC) which is a time axis of PTS and DTS, the PCR includes information on the STC time corresponding to a timing at which the PCR packet is transferred to the decoder.

Figure 10:
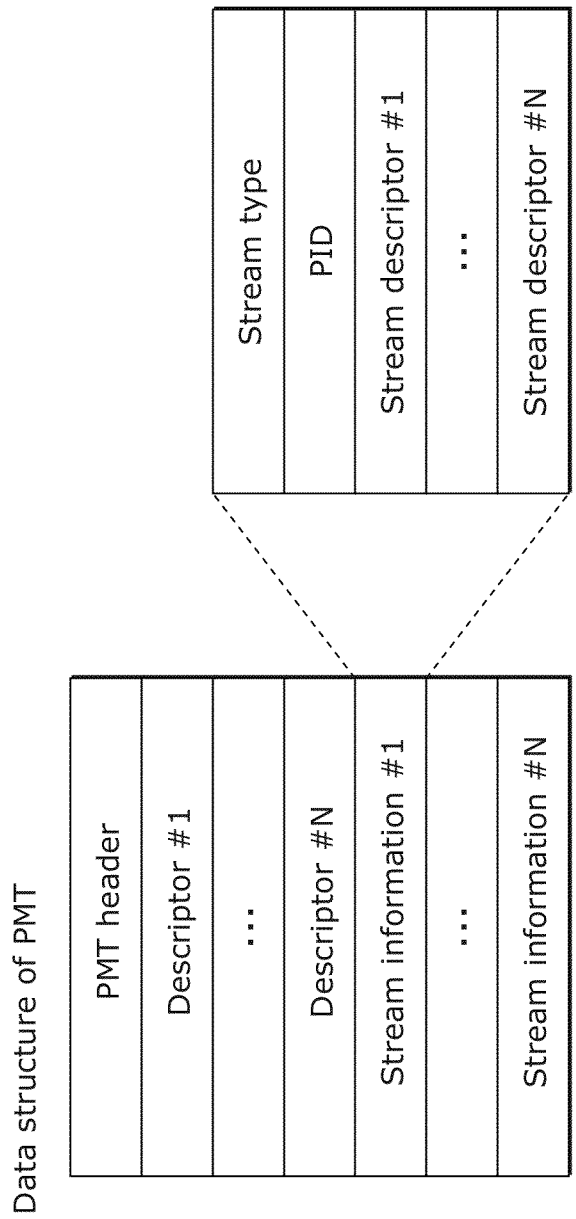
FIG. 10 is a diagram illustrating a data structure of a PMT.

FIG. 10 is a diagram illustrating a data structure of the PMT in detail. A PMT header describing the length of data which is included in the PMT is placed at the beginning of the PMT. Following thereafter, a plurality of descriptors related to the transport stream is placed. For example, the copy control information mentioned above is described as the descriptor. Following the descriptor, a plurality of pieces of stream information related to streams included in the transport stream is placed. The stream information includes stream descriptors describing a stream type for identifying a compression codec for the stream, a PID of the stream, and stream attribute information (such as a frame rate and aspect ratio).

Figure 12:
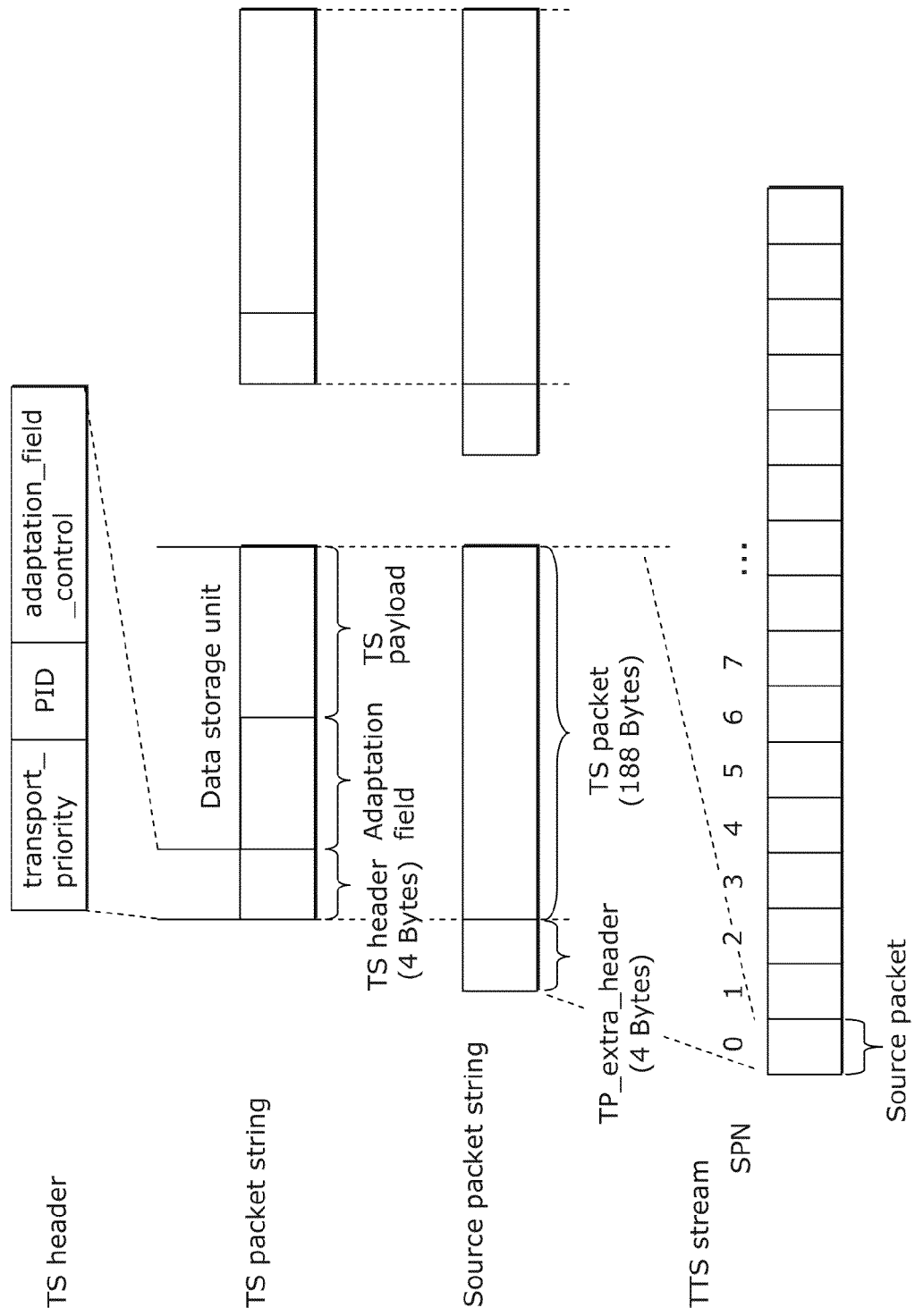
FIG. 12 is a diagram illustrating a structure of source packets.

Herein, the transport stream shown in FIG. 9 is a stream in which TS packets are queued. This is a form of a stream that is typically used for broadcast waves. The transport stream shown in FIG. 9 will be referred to as a TS stream, hereinafter. On the other hand, the transport stream shown in FIG. 12 is a stream which includes source packets being queued in which a timestamp of 4 Bytes is attached at the beginning of a TS packet of 188 Bytes. This is a format of a stream that is typically transmitted via communications. The transport stream shown in FIG. 12 will be referred to as a TTS stream, hereinafter. The timestamp attached at the beginning of a TS packet will be referred to as arrival_time_stamp (ATS), hereinafter, indicating a transfer start time at which a stream that includes the TS packets having the ATS attached thereto is transferred to the decoder. The TTS stream includes source packets being queued as shown in FIG. 12. Ascending numbers assigned to the source packets starting from the beginning of the TTS stream will be referred to as a source packet number (SPN).

In typical broadcast waves, a full TS obtained by multiplexing TSs for a plurality of channels is sent out. The full TS is a TS stream which includes a TS packet string that has a 188-byte fixed length. On the other hand, when recording a broadcast program to a stored media such as BD-RE and HDD, data only of a necessary channel is extracted from the full TS and recorded as a partial TS. The partial TS is a TTS stream. Herein, when converting the TS stream to a TTS stream, if unnecessary TS packets are simply deleted from the full TS and the remaining TS packets are recorded into the TTS stream, time interval information between the unnecessary TS packets is lost. Hence, a timing at which the TTS stream is input to a decoder is off a timing expected when sending out the TTS stream, ending up with the decoder unable to properly play the TTS stream. Thus, ATS is added to the TTS stream to keep the time interval information between the unnecessary TS packets in the full TS. By controlling, using ATS, the timing at which data is input to the decoder in this manner, the TTS stream can be played without crashing the decoder.

Figure 13:
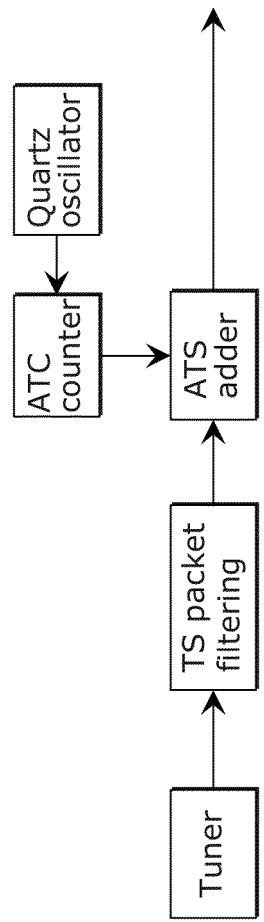
FIG. 13 is a diagram illustrating conversion of a TS stream to a TTS stream.

The conversion of the TS stream to the TTS stream is performed using a mechanism illustrated in FIG. 13. FIG. 13 shows a scheme of converting the TS stream to the TTS stream, involving a TS packet filtering, an ATS adder, an ATC counter, and a high frequency oscillator.

A quartz oscillator is a device which utilizes the piezoelectric effect of crystal (quartz) to cause oscillation that has sufficient frequency accuracy. Herein, it is assumed that the quartz oscillator generates dock signals at 27 Mhz.

The ATC counter is a counter which counts an ATC time, in accordance with the clock by the quartz oscillator. The ATC counter is initialized by an ATS of a TS packet inputted thereto from a data buffer, and a value of the ATC counter is incremented by the 27 Mhz frequency.

Utilizing program information in EIT and stream structure information in a PMT packet of a program, the TS packet filtering filters only TS packets that constitute the program which is selected by a user, and inputs the TS packets to the ATS adder.

The ATS adder refers to an ATC value of the ATC counter with respect to each 188-Byte TS packet inputted thereto via the TS packet filtering, adds an ATS value to the beginning of the TS packet and generates a 192-Byte TS packet. A field for ATS has a size of 4 Bytes, thus ATS has a value in a range from 0x0 to 0xFFFFFFFF. If the ATC value is greater than 0xFFFFFFFF, the value wrap-arounds and returns to 0. It should be noted that in the case of Blu-ray (registered trademark), the first two bits of 4 Bytes at the beginning of the TS packet are used for copy control information. Thus, the ATS value has up to 30 bits, and when reached 30 bits, wrap-arounds.

This is the end of description of the typical structure of the stream which is transmitted by digital television broadcast waves or communications.

(Automatic Generation and Viewing System for Video Content Reflecting Personal Preference)

Next, an automatic generation and viewing system for video content reflecting personal preference (Hereinafter, referred to as a "distribution and viewing system,") according to the present embodiment will be described, with reference to the accompanying drawings.

Figure 14:
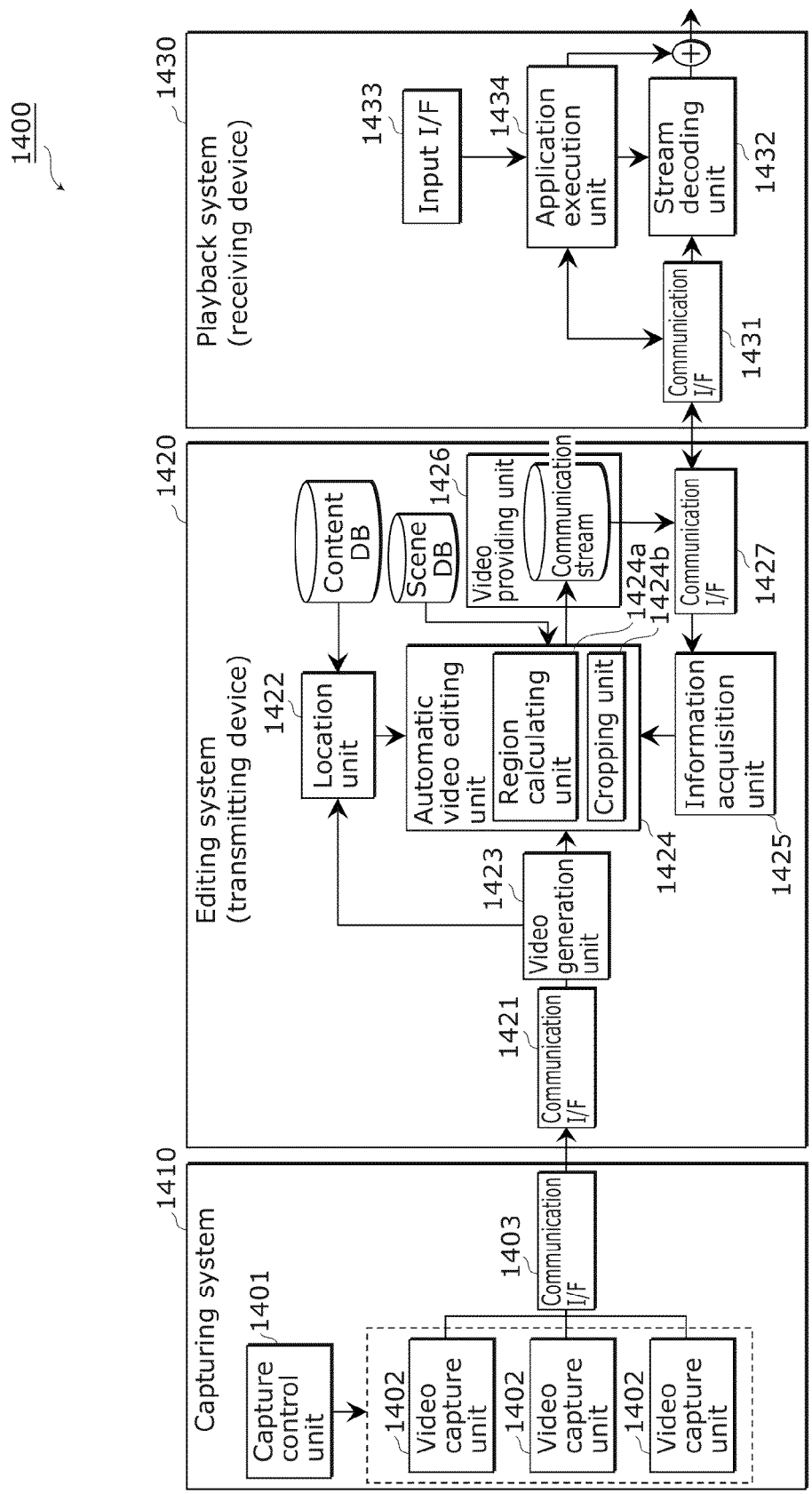
FIG. 14 is a diagram illustrating a distribution and viewing system for video content reflecting personal preference.

FIG. 14 illustrates an overview of the distribution and viewing system. A distribution and viewing system 1400 includes a capturing system 1410, an editing system 1420, and a playback system 1430.

(Capturing System)

The capturing system 1410 includes a capture control unit 1401, a plurality of video capture units 1402, and a communication I/F 1403. Using the plurality of video capture units 1402 controlled by the capture control unit 1401, the capturing system 1410 captures an event, compression encodes the captured video, and transmits the compression encoded video to the editing system 1420 through the communication I/F 1403.

Figure 15:
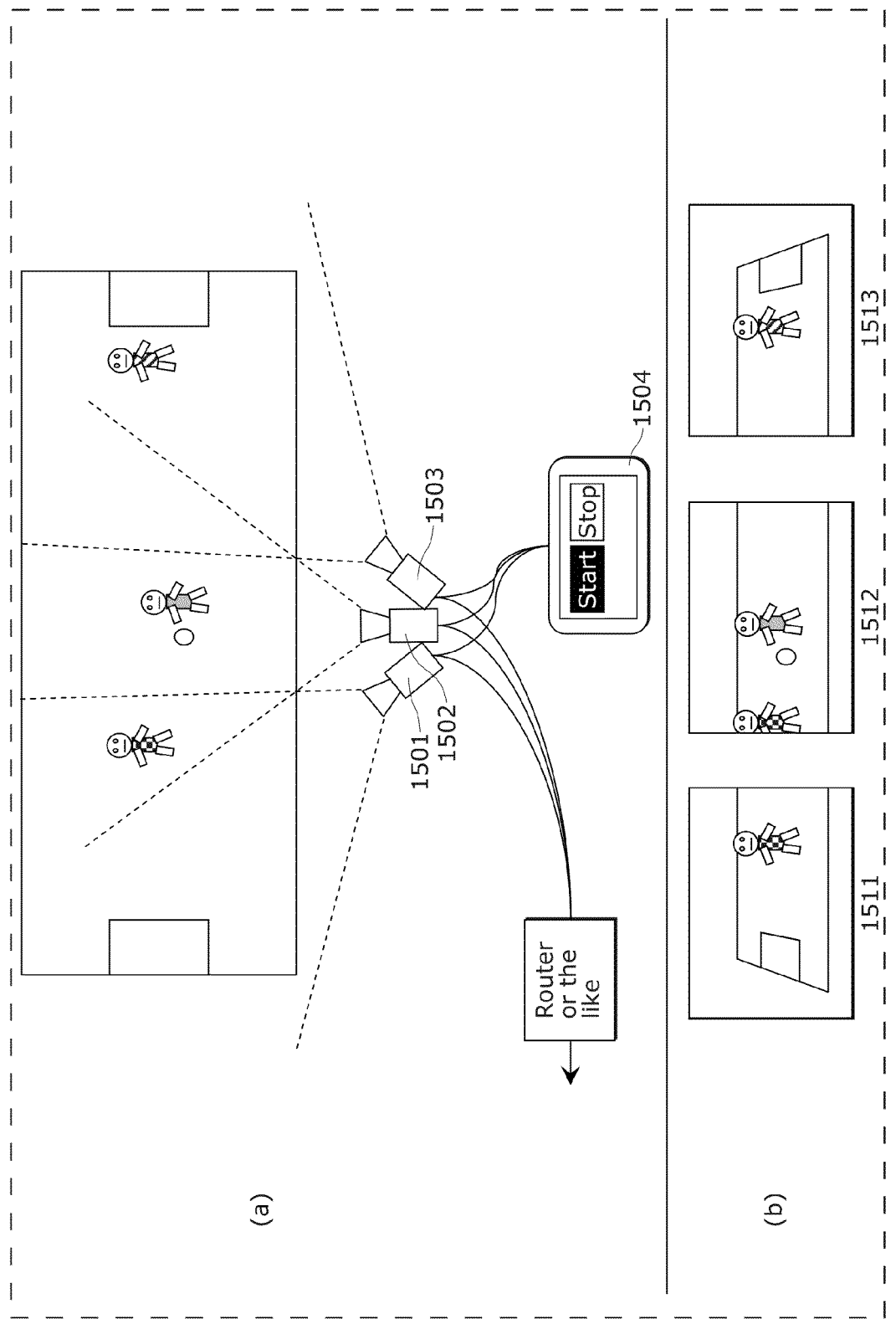
FIG. 15 is a diagram illustrating a method for wide-angle capturing an event by a plurality of video capture units.

The video capture unit 1402 refers primarily to a video camera. The video capture unit 1402 captures a video (including audio) and transmits compression encoded video data to the communication I/F 1403 under control of the capture control unit 1401. Herein, there exists one or more video capture units which are arranged as shown in (a) of FIG. 15 so that the entirety of the event is within a wide-angle range. Part (a) of FIG. 15 illustrates an example of capturing a soccer game in which a first camera 1501, a second camera 1502, and a third camera 1503 which are the plurality of video capture units are arranged so that the entire court is within the wide-angle range. Specifically, the first camera 1501 is arranged oriented so as to capture the left side of the court, the second camera 1502 is arranged oriented so as to capture the center of the court, and the third camera 1503 is arranged oriented so as to capture the right side of the court. Part (b) of FIG. 15 schematically illustrates videos captured by the cameras 1501 to 1503. A first main video 1511 is captured by the first camera 1501, a second main video 1512 is captured by the second camera 1502, and a third main video 1513 is captured by the third camera 1503. In short, the video captured by the first camera 1501 is the first main video 1511 captured of a first capture space which is a portion of a capture space. The video captured by the second camera 1502 is the second main video 1512 captured of a second capture space including a space other than the first capture space, which is a partial space of the capture space. The video captured by the third camera 1503 is the third main video 1513 captured of a third capture space of the capture space, including a space other than the first capture space and the second capture space. In this way, one or more of the video capture units 1402 are arranged the orientations and positions of which are fixed so as to capture the entirety of the event. It should be noted that the video capture units 1402 include three cameras 1501 to 1503, but the video capture units 1402 may include a plurality of cameras, including at least the two cameras 1501 and 1502.

The capture control unit 1401 controls the plurality of video capture units 1402 for synchronized capture start and capture stop, and so on. In (a) of FIG. 15, the capture control unit 1401 is a media tablet 1504. The media tablet 1504 includes a communication unit which can perform wired or wireless communications with the first camera 1501, the second camera 1502, and the third camera 1503 which are the plurality of video capture units 1402. Thus, the media tablet 1504 can control operations of the first camera 1501, the second camera 1502, and the third camera 1503, using application executed on the media tablet 1504. Specifically, the media tablet 1504 can instruct the first camera 1501, the second camera 1502, and the third camera 1503 to start capturing, stop capturing, and so on. Moreover, the media tablet 1504 sends synchronization signals to the first camera 1501, the second camera 1502, and the third camera 1503 wirelessly or via wire through the communication unit. The synchronization signals are embedded into streams which are generated by the first camera 1501, the second camera 1502, and the third camera 1503 capturing videos. Use of the synchronization signals in the subsequent processing allows the plurality of streams to be synchronized. In other words, locating a frame at the same time as a frame of another stream is facilitated. The synchronization signals may be, for example, signal information from an NTP server. It should be noted that any one of the video capture units 1402 may have the function of the capture control unit 1401. It should be noted that a GUI, which is displayed on the media tablet 1504, for controlling the first camera 1501, the second camera 1502, and the third camera 1503 may be implemented in application such as HTML5 or Java (registered trademark).

The communication I/F 1403 refers to an I/F for connecting to the Internet, for example, a router. As (a) of FIG. 15 shows, video streams captured by the cameras 1501 to 1503 are transmitted to the editing system 1420 on the Internet through the router or the like which is the communication I/F 1403. It should be noted that the communication I/F 1403 may be an I/F for transmitting the video streams to the editing system on the network, and thus may connect to, for example, a mobile telephone network (such as 3G and LTE). It should be noted that videos captured by the video capture units 1402 may be stored in a local storage (a memory or HDD) inside the capturing system 1410, and after the videos are captured, the data may be uploaded to the editing system, using an information terminal such as a personal computer.

(Editing System)

The editing system 1420 includes a location unit 1422, a video generation unit 1423, an automatic video editing unit 1424, an information acquisition unit 1425, a video providing unit 1426, and communication I/Fs 1421 and 1427. The editing system 1420 generates a wide-angle video from the video streams of the event captured by the capturing system 1410, and also generates a video stream best suited for a user based on the user preference information and the positional information obtained by identifying subject position information by image recognition. The editing system 1420 includes a computer, and functions as a transmitting device which provides a user with a video edited based on the user preference information.

The communication I/F 1421 functions as the information acquisition unit, and acquires the first main video captured by the first camera 1501, the second main video captured by the second camera 1502, and the third main video captured by the third camera 1503.

The video generation unit 1423 generates a wide-angle video (a panoramic video) from the plurality of video streams captured by the capturing system 1410. Specifically, the video generation unit 1423 generates a wide-angle video by combining the first main video 1511, the second main video 1512, and the third main video 1513 which are the plurality of video streams.

FIG. 16 is a diagram schematically illustrating a method of generating a wide-angle video. Part (a) of FIG. 16 shows a plurality of videos captured by the capturing system 1410 which are the first main video 1511, the second main video 1512, and the third main video 1513 shown in the example in FIG. 15. As (a) of FIG. 16 shows, the first main video 1511 and the second main video 1512 include an overlapping region in which the same space is captured by the first main video 1511 and the second main video 1512. The second main video 1512 and the third main video 1513 also include an overlapping region. The video generation unit 1423 superimposes one of the overlapping regions included in the videos on top of the other and generates a wide-angle video as shown in (c) of FIG. 16.

Specifically, the video generation unit 1423 performs the following processing:

First, the video generation unit 1423 (1) extracts image features in the overlapping regions included in the videos and performs image feature matching between the videos. Herein, an algorithm such as SIFT and SURF is used to extract the image features. In the example of the first main video 1511 and the second main video 1512 in (b) of FIG. 16, circles denote feature points, and feature point matching between the first main video 1511 and the second main video 1512 is indicated by the arrows.

Next, the video generation unit 1423 (2) distorts images so that the image features between the videos 1511 to 1513 are matched. In the example of (b) of FIG. 16, it can be seen from the image features that the first main video 1511 is a video enlarged, larger than the second main video 1512. Thus, seamless connection between the first main video 1511 and the second main video 1512 is possible by reducing the size of the first main video 1511 or enlarging the second main video 1512. Image can be distorted based on image features by generating, from the image features, a matrix such as a homography matrix for shape deformation and performing matrix operation on the images.

Next, the video generation unit 1423 (3) combines the distorted videos into a wide-angle video. When combining, the overlapping regions included in the videos 1511 to 1513 may be blended, or the overlapping region of either one of the videos may be deleted. Such means for generating a wide-angle video from a plurality of videos is generally known as "stitching," and is widely used as a means for generating a wide-angle video. The stitching is implemented in various software such as OpenCV. It should be noted that in step (1), the distortion of the images may be specified not by feature matching but by using positional and orientation information or the angle-of-view parameters of the plurality of cameras 1501 to 1503, and the specified distortion of the images may be utilized to combine the videos 1511 to 1513.

For generation of the wide-angle video using the plurality of videos 1511 to 1513, the video generation unit 1423 performs the above image combining on respective three frames, captured at the same timing, of the plurality of videos 1511 to 1513. Specifically, the video generation unit 1423 synchronizes the first main video 1511, the second main video 1512, and the third main video 1513, based on the synchronization signals that are embedded in the first main video 1511, the second main video 1512, and the third main video 1513 for the synchronization, and also performs the image combining on the respective three frames of the first main video 1511, the second main video 1512, and the third main video 1513 that are captured at the same timing.

The location unit 1422 analyzes and identifies the subject position information by performing the image recognition processing on the wide-angle video generated by the video generation unit 1423, while referring to a content database. Herein, the "content database" stores information such as the shape of the ball, the shape of the court, names, positions, uniform numbers, or head shots of players. For example, the ball position information is identified by performing pattern matching on the wide-angle video, generated by the video generation unit 1423, for the shape or color of the ball. For example, player position information is identified by pattern matching on the wide-angle video for the face, uniform, uniform number, or body type of the player. In other words, if the viewed subject the user desires to view is found, the location unit 1422 locates the viewed subject in the wide-angle video by performing the image recognition on the wide-angle video, while referring to the content database based on the viewed subject.

Moreover, tracking the motion of the identified player and ball allows the player position information and the ball position information to be identified. Here, the processing of tracking an object such as the player or ball is achieved by background subtraction to extract only moving objects and measuring the image motion. Optical flow for example, is a well-known way of the object tracking process by the image processing, and is implemented in various software such as OpenCV. If a tracking failure undesirably occurs such as players overlapping each other, position information during the tracking failure may be interpolated using the player position information immediately before the tracking failure has occurred and position information at which the player is detected in the next place.

Figure 17:
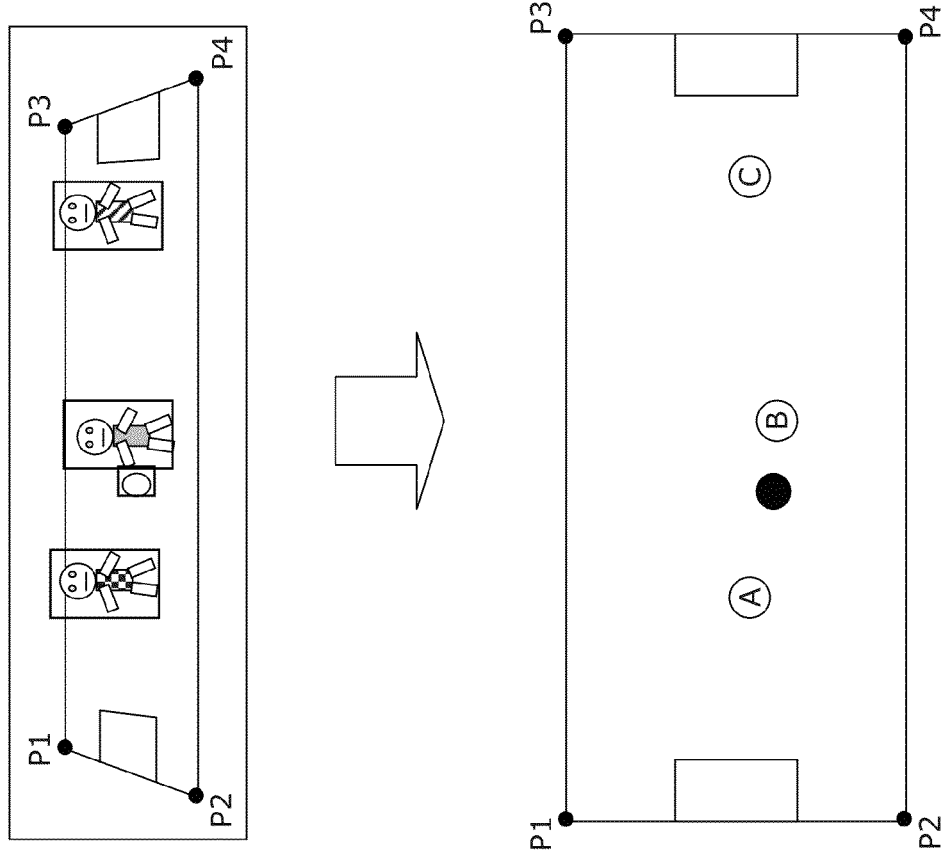
FIG. 17 is a diagram illustrating a method of converting positional information in a video to court position information.

Moreover, a region of the court may be specified in the wide-angle video and the person position information may be transformed into two-dimensional coordinate information on the court region. As FIG. 17 shows for example, a transformation matrix such as a homography matrix is created based on correspondence between end points of the court on the wide-angle video and end points of the court on two-dimensional coordinates, and the transformation matrix operation is applied to the player position information and the ball position information on the wide-angle video, thereby transforming them into two-dimensional coordinates. It should be noted that if the cameras of the capturing system 1410 are stereo cameras, the wide-angle video can be generated in a stereo image, and depth information can be obtained. Thus, the use of depth information allows acquisition of accurate player position information and ball position information. Alternatively, if depth sensors are incorporated into the cameras of the capturing system 1410, instead of employing the stereo cameras, depth map which is the depth information can be acquired, thereby allowing the acquisition of accurate player position information and ball position information. Herein, the "depth sensor" refers to a sensor which measures a distance between the sensor and a target in each pixel unit, utilizing a scheme (TOF) of emitting a laser, such as an infrared-ray, to the target and measuring a time for the laser to make a roundtrip. For example, Kinect by Microsoft Corporation is a well-known camera that utilizes a depth sensor. The use of depth map thus generated allows acquisition of not only the person position but also bone structural information. Thus, reproduction of the captured event in CG on a three-dimensional space is also possible.

The information acquisition unit 1425 acquires the user preference information via the communication I/F 1427. In other words, the information acquisition unit 1425 acquires the user preference information via a network. The user preference information is information indicating a way of viewing the video content as preferred by the user. For example, in the example of FIG. 2, the user preference information is a value selected by the user from among options "Video with ball at center," "Video with player A at center," and "Video with player B at center." in other words, the user preference information is information indicating a viewed subject the user desires to view.

The automatic video editing unit 1424 generates a video stream, using the wide-angle video generated by the video generation unit 1423, the subject position information, generated by the location unit 1422, indicating the position of the viewed subject, and the user preference information acquired by the information acquisition unit 1425. The automatic video editing unit 1424 includes a region calculating unit 1424a and a cropping unit 1424b.

The region calculating unit 1424a calculates a cropping region, based on the user preference information acquired by the information acquisition unit 1425. The cropping region is a partial area of the wide-angle video generated by the video generation unit 1423 and smaller than the area of the wide-angle video. More specifically, the region calculating unit 1424a calculates as the cropping region a region that includes the viewed subject in the wide-angle video, using the position of the viewed subject located by the location unit 1422. Herein, the region calculating unit 1424a may calculate as the cropping region a region that is defined by a cropping frame when the position of the viewed subject is adjusted to a predetermined reference position in the cropping frame in the wide-angle video. The cropping frame is for cropping the wide-angle video and has a predetermined size.

Then, the cropping unit 1424b crops the wide-angle video generated by the video generation unit 1423 into the cropping region calculated by the region calculating unit 1424a.

Figure 18:
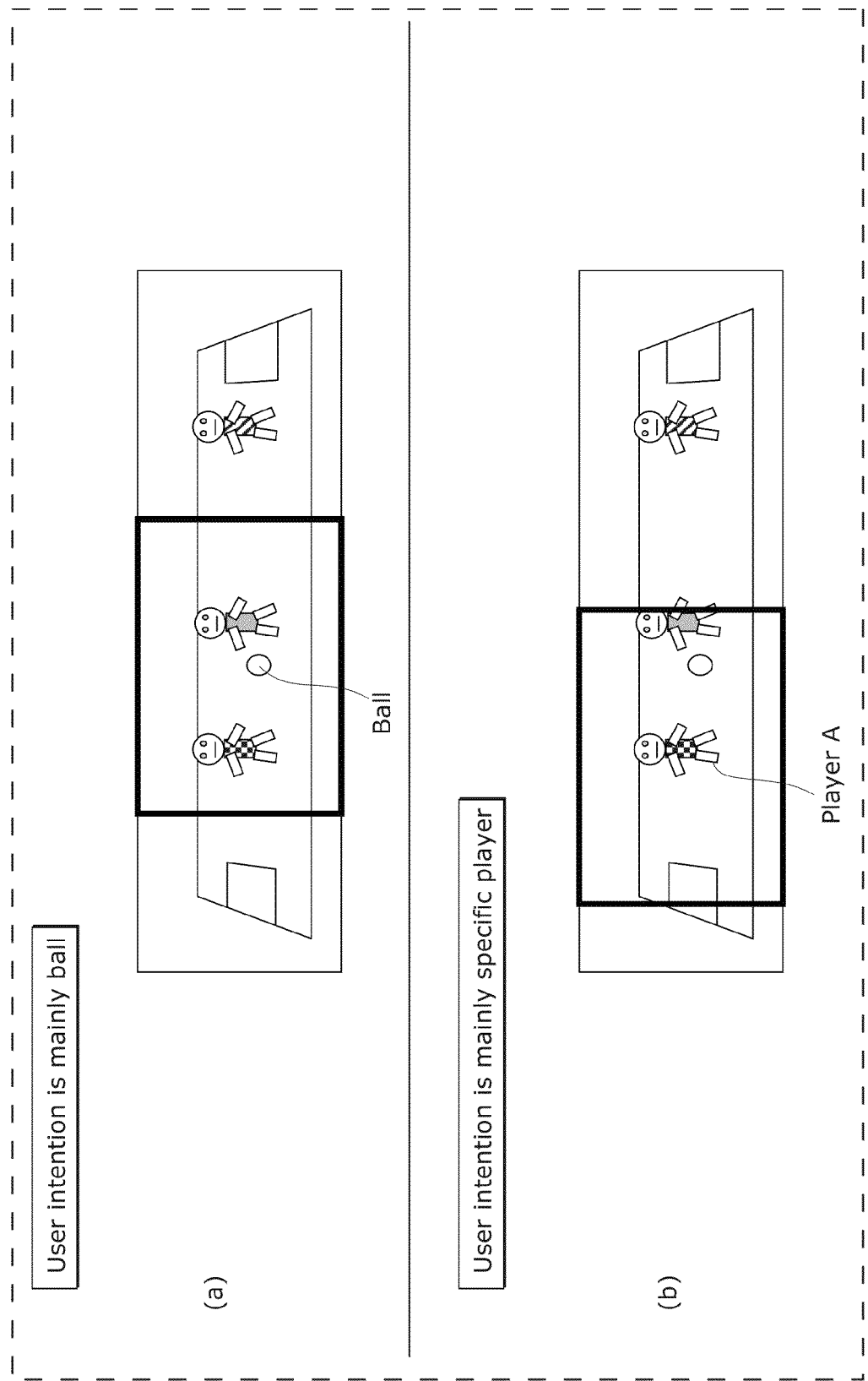
FIG. 18 is a diagram illustrating a method for generating a video content, based on user preference information.

An example is illustrated in FIG. 18. If the viewed subject indicates "Video with ball at center" in the user preference information, the region calculating unit 1424a determines the position of the cropping frame, positioning the ball position information at the center of the cropping frame in the wide-angle video, for example. Then, the cropping unit 1424b crops the wide-angle video into the cropping region defined by the cropping frame, thereby generating a user-preferred video. In other words, in the example of (a) of FIG. 18, the cropping region surrounded by the black bounding box (the cropping frame) is a video (the cropped video) to be provided to the user. If the user preference information indicates "Video with specific player at center," the cropping unit 1424b crops the wide-angle video in a manner that positional information of the specific player is positioned at the center of the cropping frame, thereby generating a user-preferred video. Specifically, in the example of (b) of FIG. 18, if the specific player the viewed subject) is the player A, the cropped video of the cropping region surrounded by the black bounding box (the cropping frame) is a video to be provided to the user. The video obtained by the cropping unit 1424b cropping the wide-angle video is compression encoded, multiplexed with audio, and outputted as a system stream by the video providing unit 1426. In other words, the video providing unit 1426 provides the user with the cropped video generated by the cropping unit 1424b cropping the wide-angle video, as the system stream. It should be noted that the system stream generated by the automatic video editing unit 1424 will be referred to as a communication stream, hereinafter.

It should be noted that there are several methods of cropping the wide-angle video as shown in FIG. 19, and a method may be selected therefrom as appropriate for an application. Part (a) of FIG. 19 illustrates a method of cropping out a rectangular area from the wide-angle video. A method illustrated in (b) and (c) of FIG. 19 is of configuring a three-dimensional object and displaying the wide-angle video. This method is typically employed as a method of displaying a wide-angle video. Specifically, utilizing an OpenGL library for three-dimensional rendering, the method generates, for example, a cylindrical model on a three-dimensional coordinates, and attaches the wide-angle video as a texture to the inside surface of the cylindrical model as shown in (b) of FIG. 19. The wide-angle video is decoded to update the texture, in accordance with a frame rate of the wide-angle video. Part (c) of FIG. 19 is a top view of the cylindrical model shown in (b) of FIG. 19. As (c) of FIG. 19 shows, the viewpoint of the user is at the center of the cylindrical model on the three-dimensional coordinates. By perspectively projecting a video viewing the three-dimensional cylindrical model from the viewpoint in a viewing direction indicated by the arrow, a video viewed from the viewpoint can be cropped out from the wide-angle video and displayed. In the case of viewing the "ball" at the center by way of example, the video can be cropped out and played so as to have the ball position at the center by specifying coordinates of the ball position on the inside surface of the cylindrical model to which the texture of the wide-angle video is attached and setting to the ball position the direction from the viewpoint. It should be noted that the texture of the wide-angle video may be attached to a sphere model, rather than the cylindrical model. In this case, the cropped video can be obtained by the same method as with the cylindrical model, of positioning the viewpoint at the center of the sphere and perspectively projecting a video in a direction from and at the angle of view of the viewpoint.

Figure 20:
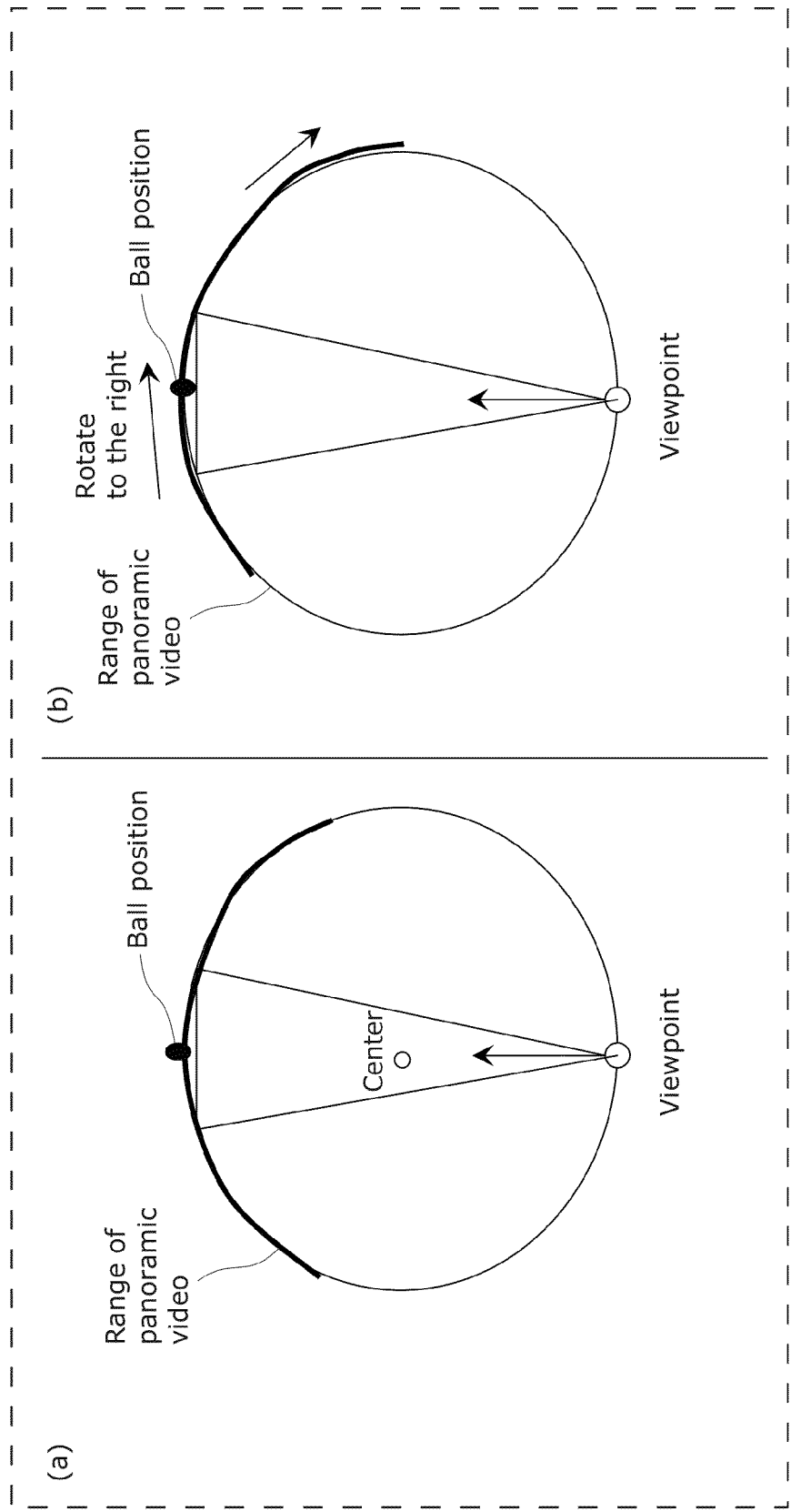
FIG. 20 is a diagram illustrating a variation of the method for cropping out the video from the wide-angle video.

While the wide-angle video has been cropped positioning the viewpoint at the center of the cylindrical model and changing the direction from and the angle of view of the viewpoint, the viewpoint may not necessarily be at the center of the cylindrical model as shown in FIG. 20. In the example of (a) of FIG. 20, the viewpoint is positioned, rather than at the center of the cylindrical model, on a circumference of the cylindrical model at the rear of the center. In this case, positioning the viewpoint at the rear of the center of the cylindrical model reduces the distortion and, depending on a video, consequence may be better. In particular, positioning the viewpoint on the circumference of the cylindrical model facilitates the calculation since the angle of view is half by inscribed angle theorem, as compared to positioning the viewpoint at the center. In this case, as shown in (b) of FIG. 20, the direction from the viewpoint is fixed and the cylindrical model is rotated about the center. In the example of (b) of FIG. 20, if the ball moves to the left in the wide-angle video, the cylindrical model is rotated to the right. In this configuration, the cropped video can be generated following the ball position, while the direction of viewpoint is fixed.

Figure 21:
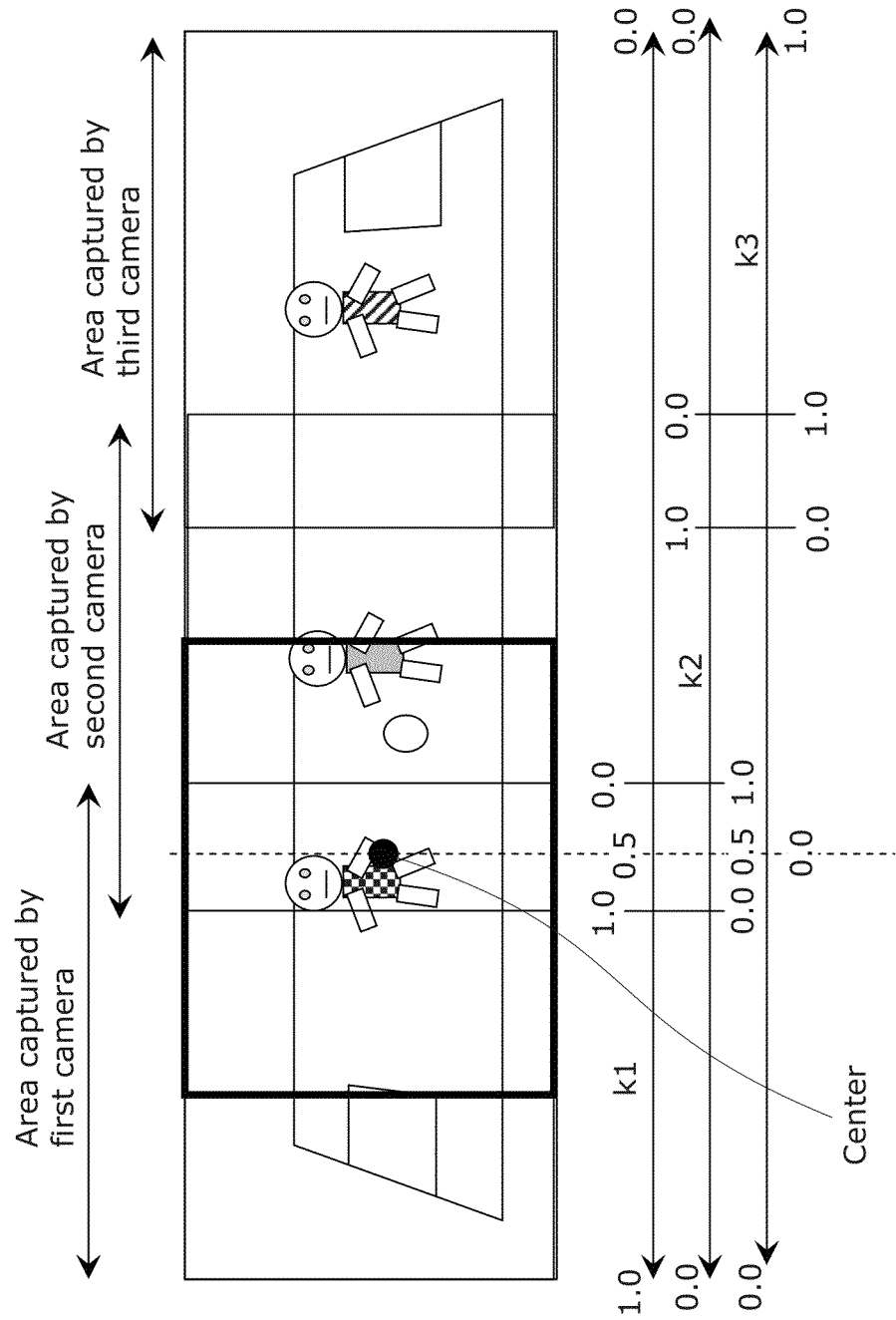
FIG. 21 is a diagram illustrating a method for generating audio data.

Audio data can be generated utilizing audio data collected by the video capture units. As FIG. 15 shows, when generating the wide-angle video by the plurality of video capture units, if audio data is selected from a video capture unit that is capturing the cropped region, the relationship between the video and the audio increases. Thus, realistic audio data can be generated. As FIG. 15 shows, when generating the wide-angle video by the plurality of video capture units, the video data may be generated changing the audio synthesis coefficients of the video capture units, in accordance with the location of the cropped region. An example is shown in FIG. 21. The image in FIG. 21 is a wide-angle video obtained by combining the videos captured by the plurality of video capture units, where respective areas captured by the video capture units (the first camera, the second camera, the third camera) are indicated by the arrows on the upper row of the image. Examples of the audio synthesis coefficients to the audio data collected by the cameras are indicated by the arrows on the lower row of the image. Indicated by k1 is the audio synthesis coefficient to the audio data from the first camera, k2 indicates the audio synthesis coefficient to the audio data from the second camera, and k3 indicates the audio synthesis coefficient to the audio data from the third camera. It is assumed that the examples of the audio synthesis coefficients vary depending on the central position of the cropped region. For example, in FIG. 21, when the cropping region is a region enclosed by the thick black bounding box and the solid circle indicates the center of the black box area, k1 is 0.5, k2 is 0.5, and k3 is 0.0. Respective audio data are multiplied by the coefficients and synthesized, thereby generating synthesis audio data. In this configuration, the relationship between the video and the audio increases. Thus, more realistic audio data can be generated. It should be noted that the relationship between the location of the cropping region and the audio synthesis coefficients in FIG. 21 is merely an illustration and may be changed in accordance with characteristics of the content or the user preference.

It should be noted that for generation of audio data, sound effects may be synthesized by analyzing scenes utilizing the video data or the subject position information generated by the location unit 1422. For example, taking a soccer game as an example, it can be determined that a player has just took a shot when ball position information leaves away from player position information immediately after the ball position information approached the player position information and the ball position information approaches toward a goal at a constant velocity or faster. Thus, prepared general sounds when a player takes a shot may be synthesized as sound effects. Likewise, if it can be determined by the subject position information or image analysis on the video data that the ball hits a goal post or a goal keeper catches the ball, synthesization of sound effects that correspond to the actions can provide a powerful audio to the user.

The communication I/Fs 1421 and 1427 each indicate an I/F for connecting to the Internet. This is, for example, a NIC, an I/F which connects to the Internet via a router or the like.

(Operation of Editing System)

The editing system 1420 performs the processing below as a method for providing a video.

Figure 22:
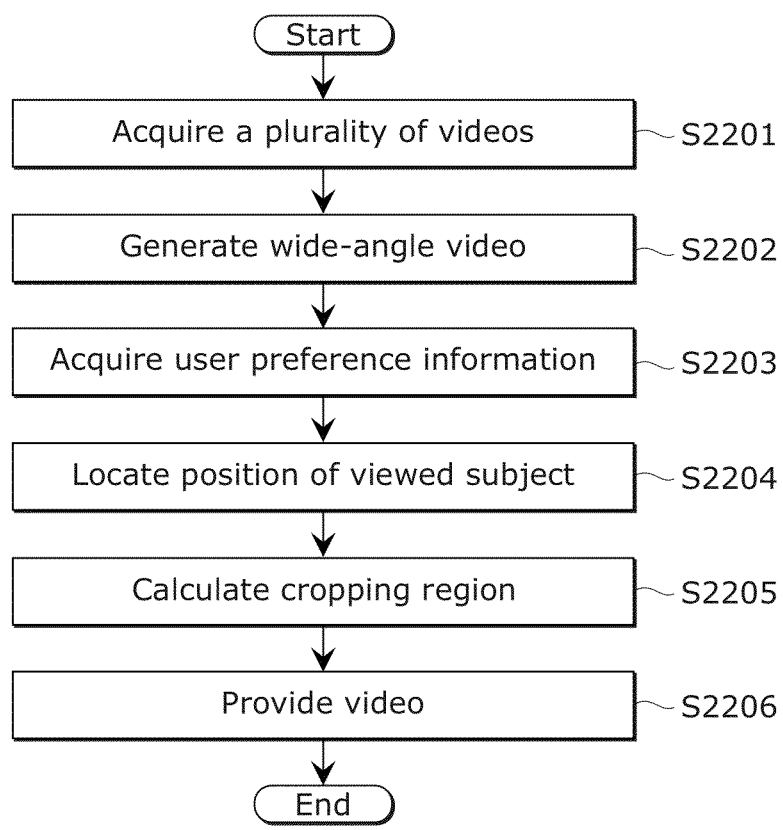
FIG. 22 is a flowchart illustrating a video providing process flow performed by an editing system.

FIG. 22 is a flowchart illustrating a video providing process flow performed by the editing system 1420.

First, the communication I/F 1421 as the information acquisition unit acquires the first main video 1511, the second main video 1512, and the third main video 1513 (S2201: Video acquisition step).

Next, the video generation unit 1423 generates the wide-angle video from the first main video 1511, the second main video 1512, and the third main video 1513 acquired by the communication I/F 1421 (S2202: Video generation step).

The information acquisition unit 1425 acquires user preference information via a network through the communication I/F 1427 (S2203: Information acquisition step).

The location unit 1422 locates a viewed subject in the wide-angle video by performing the image recognition on the wide-angle video, based on the user preference information (S2204: Locating step).

The region calculating unit 1424*a* calculates as the cropping region a region in which the viewed subject is included, using the position of the viewed subject located by the location unit 1422 (S2205: Region calculating step).

The video providing unit 1426 transmits a cropped video to the playback system and thereby provides to the user the cropped video which is generated by cropping out the cropped region from the wide-angle video by the cropping unit (S2206: Video providing step).

(Playback System)

The playback system 1430 includes a communication I/F 1431, a stream decoding unit 1432, an application execution unit 1434, and an input I/F 1433. The playback system 1430 is a terminal, such as a digital television, which plays a communication stream generated by the editing system 1420. The playback system 1430 functions as the receiving device which is connected to the editing system 1420 functioning as the transmitting device via a network, and receives videos transmitted from the editing system 1420.

The communication I/F 1431 is, for example, a NIC, an I/F for connecting to the Internet.

The stream decoding unit 1432 decodes the communication stream. The stream decoding unit 1432 decodes a compression coded video stream in the communication stream, generates an uncompressed image video, and output it as a video plane, thereby outputting the video to a television or the like. The stream decoding unit 1432 decodes a compression coded audio stream in the communication stream, generates and outputs uncompressed LPCM audio frames to a loudspeaker of the television, for example.

The application execution unit 1434 is an execution control unit which executes application transmitted thereto via the communication I/F 1431. If the application is, for example, HTML content, the application execution unit 1434 refers to a Web browser. If the application is described in Java (registered trademark), the application execution unit 1434 refers to a Java (registered trademark) VM. The application execution unit 1434 can access the processing units of the playback device via various APIs. Via an API for playback control, the application controls playback and stop which is executed by the stream decoding unit 1432. Moreover, via an API for drawing graphics, the application outputs graphics data to a graphics plane, and combines and outputs the graphics plane and a video plane, which is output by the stream decoding unit 1432, to a television or the like, thereby providing the user with a menu and so on by graphics. Moreover, the application acquires data from the input I/F 1433 and changes the screen display, in accordance with instructions from the user, thereby achieving a graphical user interface.

The input I/F 1433 is an I/F which inputs information indicative of user intention to the playback system, and is, for example, a remote controller. The input information is input to the application execution unit 1434.

This is the end of description of the distribution and viewing system 1400 according to the present embodiment.

While the above method of synchronization between the plurality of video capture units 1402 has demonstrated in the example of FIG. 15 that the plurality of cameras are connected to one another via the network and the synchronization signals from the capture control unit 1401 are embedded in streams, it should be noted that the plurality of video capture units 1402 may be synchronized by any of the methods below.

1. Method of Embedding GPS Information in Stream

If the video capture units 1402 are each mounted with a GPS receiver, the video capture unit 1402 can receive GPS information from a GPS satellite. The GPS information stores time data by an atomic clock carried by the satellite. Thus, use of the GPS information allows the streams produced by the plurality of video capture units 1402 to be synchronized. Moreover, by using positional information of the GPS information, the relationship between the streams produced by the plurality of video capture units 1402 can be determined. In other words, if there is a plurality of video streams uploaded on a server, a combination of the streams for forming the wide-angle video can be determined using the positional information. It should be noted that only the capture control unit 1401 may include a receiver for the GPS information, in which case the capture control unit 1401 acquires the GPS information and transmits the information to the video capture units 1402 through a wired or wireless communication unit.

Figure 23:
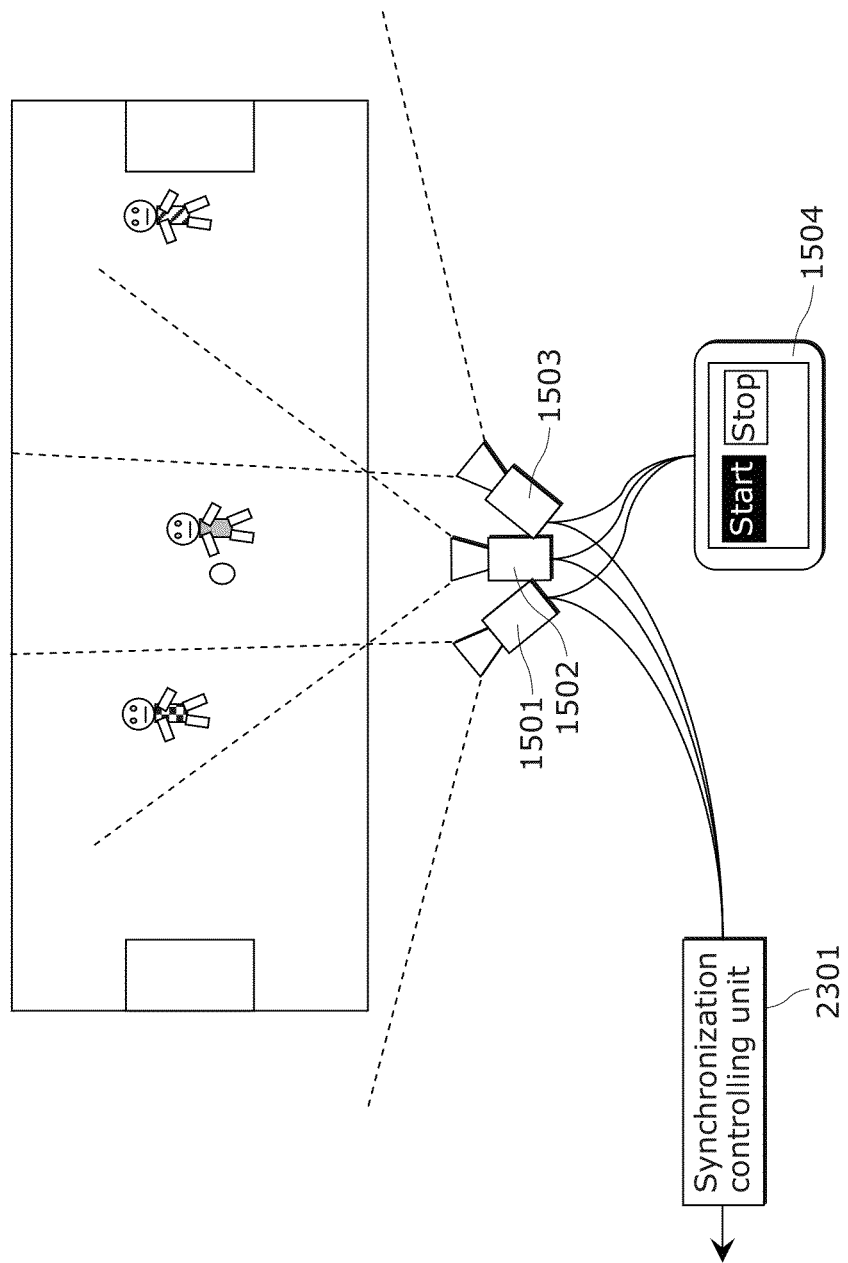
FIG. 23 is a diagram illustrating a variation of transmission from the video capture units to the editing system.

2. Method of Storing Transmitting Videos Captured by Plurality of Video Capture Units 1402 in/to Another Device FIG. 23 shows the configuration of FIG. 15 to which a synchronization controlling unit 2301 is added. The synchronization controlling unit 2301 directly receives the videos captured by the cameras 1501 to 1503 in a wired manner (for example, HDMI (registered trademark)) or wirelessly, attaches a synchronization signal to each video stream, and, for example, stores the video stream into a device such as an SD card or uploads the video stream on the editing system on the network via the communication I/F. Thus, the streams can be synchronized, without the synchronization signals being set by the cameras 1501 to 1503.

3. Method of Altering Angle of View After Clapperboard/Clock is Captured by Plurality of Video Capture Units 1402

If, after the plurality of video capture units 1402 capture a clapperboard or a clock, the angle of view is altered so that the plurality of video capture units 1402 are in predetermined orientations, the clapperboard or clock is included in the videos captured by the plurality of video capture units 1402. Thus, by performing image analysis on streams captured of the clapperboard or the clock, if the clapperboard, frames at a moment the clapperboard is hit, or if the clock, frames at the same time, are identified, thereby allowing the plurality of streams to be synchronized.

4. Method of Emitting Light Fluctuating in Intensity to Plurality of Video Capture Units 1402

By emitting light fluctuating in intensity to the plurality of video capture units 1402, the videos captured by the plurality of video capture units 1402 include the same light emitted thereto. Specifically, frames that have the same intensity can be identified by performing image analysis, for identifying a temporal difference in intensity of the light, on a plurality of streams including the same light emitted thereto. Frames having the same intensity can be identified in this way, thereby allowing the plurality of streams to be synchronized.

5. Method of Using Time Information at which Video Stream is Uploaded from Video Capture Unit 1402 to Server If video streams are uploaded from the plurality of video capture units 1402 to the server in real time, the times of arrival at the server may be utilized as reference values for synchronizing the streams.

Figure 24:
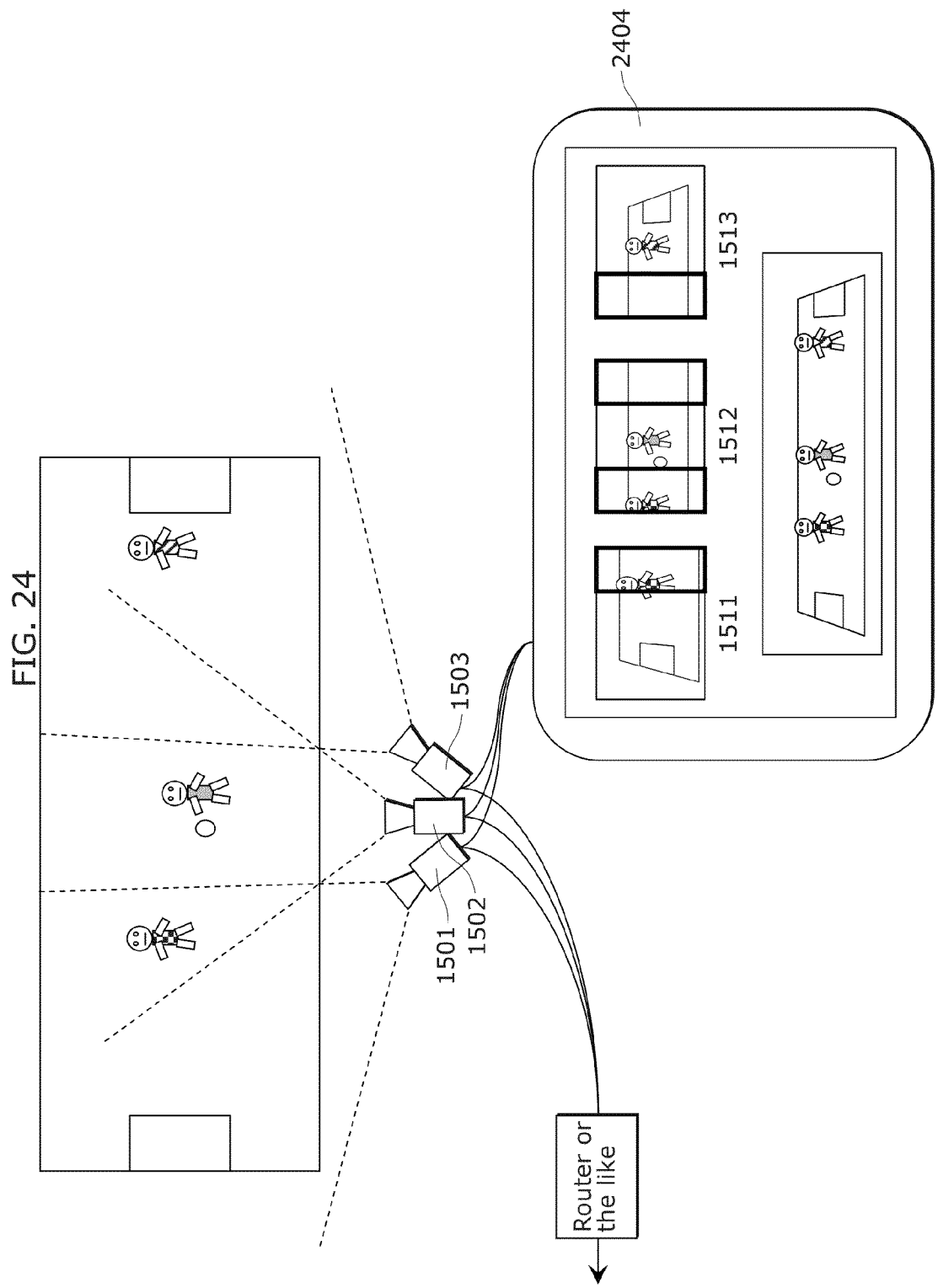
FIG. 24 is a diagram illustrating a variation of the video capture units.

While the plurality of video capture units 1402 are fixed in orientation and position so as to capture the entirety of the event as shown in FIG. 15, it should be noted that the following method may be implemented for assisting the user in setting the orientations and positions of the plurality of video capture units 1402. As FIG. 24 shows, the present embodiment is configured in which the video data from the plurality of video capture units 1402 are transmitted to the capture control unit 1401 so that the user can review a combined video. FIG. 24 is different from FIG. 15 in configuration of media tablet 2404 which is the capture control unit. The media tablet 2404 in FIG. 24 has the same functionality as the video generation unit 1423 included in the editing system 1420 described above. Specifically, the media tablet 2404 displays the video streams captured by the plurality of video capture units 1402, and a wide-angle video obtained by combining the video streams by the functionality of the video generation unit. In this manner, the user can review the orientations and positions of the plurality of video capture units 1402 while seeing the video. It should be noted that for display of the video streams captured by the plurality of video capture units 1402, the overlapping regions may be displayed in surrounding boxes or in color as the videos 1511, 1512, and 1513 shown in FIG. 24. Since the videos displayed on the media tablet 2404 are for the purpose of reviewing the orientation and position settings of the plurality of video capture units 1402, it is not necessarily be videos and may be still images at the same time.

It should be noted that the wide-angle video may not be produced by the media tablet 2404. For example, the plurality of videos captured by the plurality of video capture units 1402 may be uploaded to the server on the network and the video generation unit of the server may generate the wide-angle video. In this case, the wide-angle video generated by the server may be downloaded and displayed on the tablet. In this configuration, processing load on the media tablet 2404 in generating the wide-angle video can be reduced.

It should be noted that if the wide-angle video cannot be properly generated in the manner described above, an advice for combining the video streams may be presented to the user together with a warning message. Examples of the message include "Change zoom ratio of right camera," "Adjust position of left camera to the right," and so on. In this configuration, the user can readily achieve the camera settings, in accordance with the instructions.

It should be noted that if the video capture unit 1402 has functionality of receiving control codes for pan-tilt-zoom operations of the cameras and executing the pan-tilt-zoom operations, the camera setting may be automatically adjusted to achieve best-suited camera orientation and zoom ratio by the capture control unit 1401 calculating pan-tilt-zoom and transmitting the control codes to the video capture units 1402. If the wide-angle video is not properly generated such as that a dead angle exists between the cameras and the subject is hidden, the capture control unit 1401 transmits a control code for inwardly moving the camera orientation to eliminate the dead angle. A PTZ camera is well-known as a camera which achieves the pan-tilt-zoom operations of the cameras by such program operations, and the video capture units 1402 can be implemented by using such cameras. Moreover, if the entirety of the event cannot be captured by the plurality of video capture units 1402, the capture control unit 1401 may notify missing portions in alarm or the like or a message or the like.

If camera parameter settings of the video capture units 1402 are controllable by wireless or wired signals, the capture control unit 1401 can control the camera parameters of the video capture units 1402 in uniform. For example, matching the camera parameters of, for example, white balance of the video capture units 1402 can reduce variations in color in the wide-angle video. The camera parameters of the plurality of video capture units 1402 may be aligned to those of a video capture unit 1402 that has lowest performance. For example, if the first camera can capture a video of 1920×108060 pixels, the second camera can capture a video of 1920×108030 pixels, and the third camera can capture a video of 1280×72030 pixels, all the cameras are caused to operate to capture videos of 1280×72030 pixels. In this manner, quality distortion of a combined wide-angle video can be reduced and also the processing such as video upconversion and downconversion can be reduced.

It should be noted that in the method of cropping out, following the subject position information, and generating a video from the wide-angle video by the automatic video editing unit 1424 using the user preference information, use of any of the methods outlined below allows generation of a natural and eye-friendly video.

Figure 25:
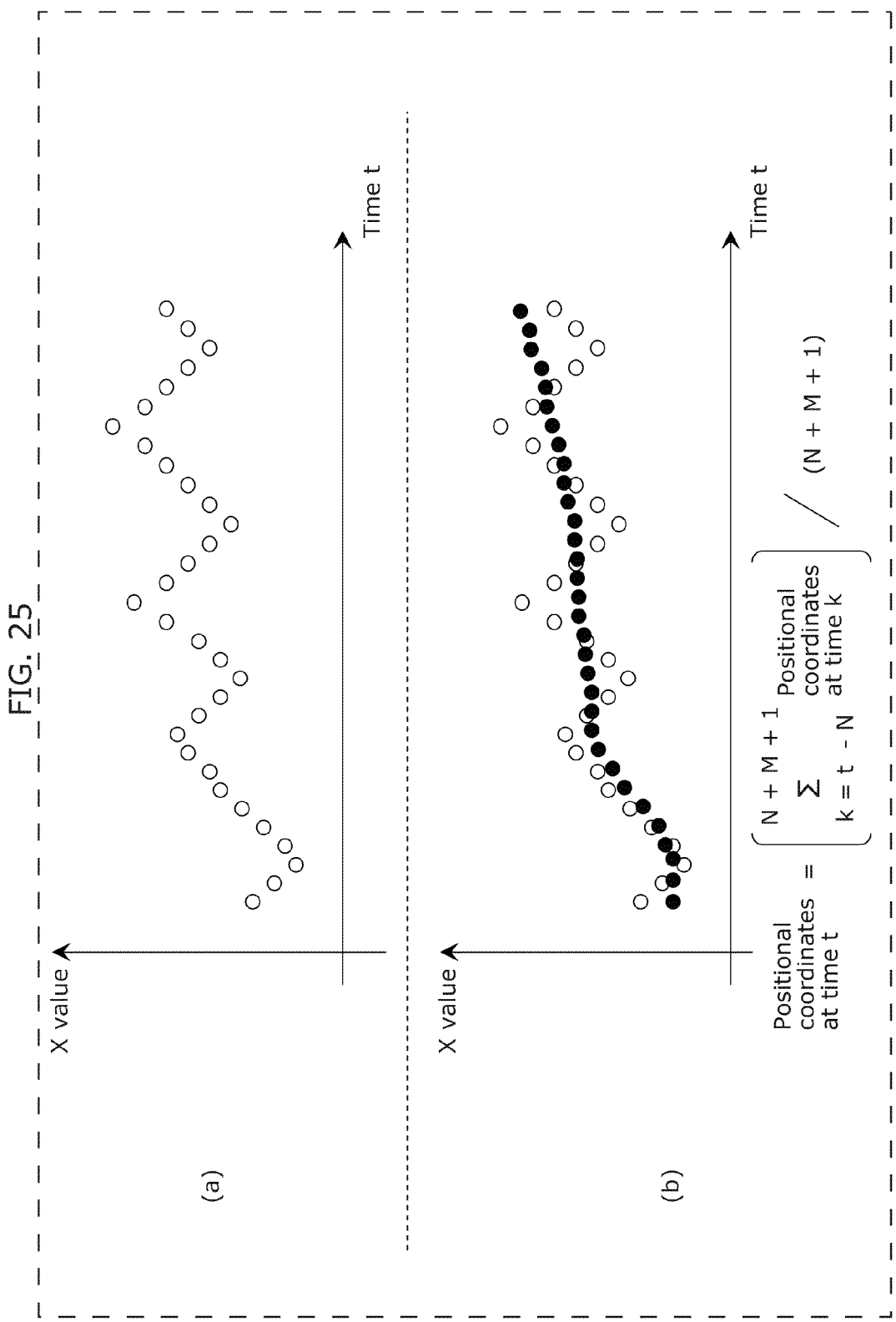
FIG. 25 is a diagram illustrating an example of correcting subject position information.

1. Method Of Low-Pass Filtering Positional Information Of Viewed Subject On Screen Part (a) of FIG. 25 shows changes in subject position information (herein, values on the X coordinate) over time. If the position information is directly used for cropping, a video follows wiggles of the subject, ending up being a blurry video. Such a video is difficult for the user to see. Thus, as shown in (b) of FIG. 25, by utilizing, for cropping, the positional information (solid dots) which is calculated by low-pass filtering positional information using positional information items previous and prior to the positional information subjected to the low-pass filtering, a video that has less screen blurry and is easy for the user to see can be provided to the user. The positional information is calculated as follows: Positional coordinates at a time t is obtained by dividing a sum of subject position information at a time (t−N) to a time (t+M) by N+M+1. The mathematical formula is shown on the lower row of FIG. 21. N and M values satisfy, for example, N=M=0.5 second, provided that N and NI values are adjusted so that k does not fall in a negative value or exceeds the stream end. Different values may be set to N and M values, depending on content. Examples of N and M include for example, 0.5 second in the case of soccer, 0.4 second in the case of basket ball. This configuration allows cropping control in accordance with characteristics of content. It should be noted that the user may be allowed to set N and M values. In this configuration, the user preference can be reflected in videos.

Figure 26:
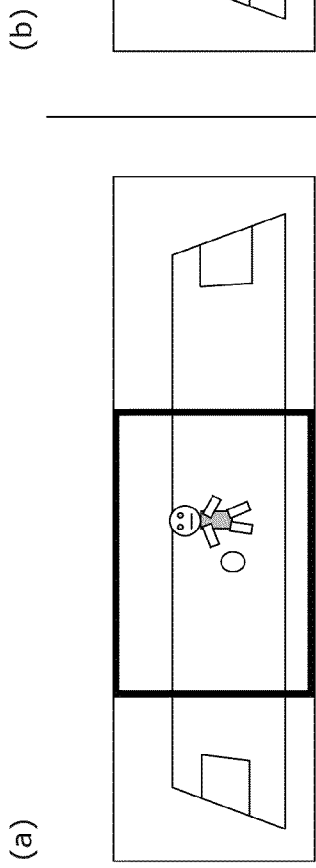
FIG. 26 is a diagram illustrating a method for cropping the wide-angle video, for generating a video with no discomfort.

2. Method of Employing Previous Time Instant as Positional Information of Viewed Subject As positional information of the viewed subject, which is a reference based on which a video is cropped out, positional information at temporally prior time (t−D), rather than at a stream playback time (t) is utilized. FIG. 26 schematically illustrates an example where the cropping region is set following the ball position information. Part (a) of FIG. 26 shows an example where the cropping region moves as the ball position information moves. In this case, the cropping region excessively follows the ball position information, making the user feel discomfort. This is because the movement of the cropped region undesirably gives an impression to the user as if the motion of the ball is predicted. Thus, as (b) of FIG. 26 shows, the cropping region is caused to lag behind the motion of the ball position information. In the example of (b) of FIG. 26, the solid circle which is the reference of the cropping region indicates the ball position information at a point of time (t−D) which is later than a display time (t) of a video frame, the black bounding box (the cropping frame) for specifying the cropping region indicates a region to be cropped out so that the ball position information at a point of time (t−D) is set to the center of the region. In other words, the region calculating unit 1424*a* calculates, as the cropping region, a region which is defined by the cropping frame when the position (solid circle) of the viewed subject in a frame, of the wide-angle video, earlier by a predetermined time (a delay amount D) than a frame to be processed is matched with the predetermined reference position (the center of the cropping frame) of the cropping frame (the black bounding box).

This configuration moderates the relationship between the ball position information and the cropping region, producing a video which has no discomfort and gives an impression as if the video is captured by a person. In other words, when a person attempts to pan a camera, the pan operation follows a movement of the viewed subject. Thus, the pan operation by a person is performed basically after the subject moves. Hence, by retarding the motion of the camera on a predetermined basis, a video giving a natural impression as if the video is captured by a person can be provided to the user. It should be noted that the delay amount D may be set by the user or changed in accordance with the characteristics of the content.

Figure 27:
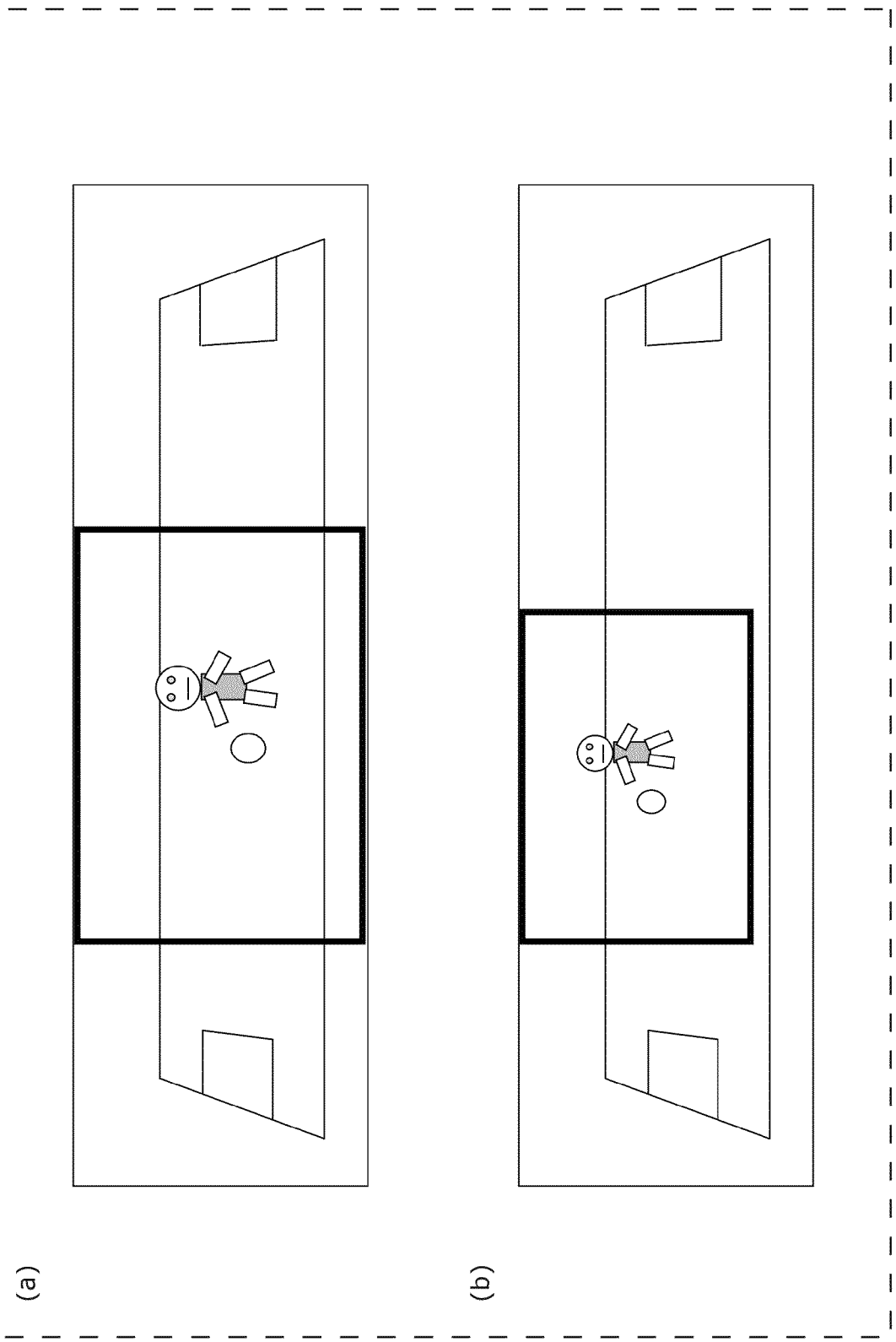
FIG. 27 is a diagram illustrating a method of resizing the cropping region.

3. Method of Resizing Cropping Region in Accordance with Subject Position Information As FIG. 27 shows, the cropping region may be resized in accordance with the subject position information, as if tilt and zoom operations are performed. Part (a) of FIG. 27 shows a video before the cropping region is resized. Part (b) of FIG. 27 shows a video after the cropping region is resized. The cropping region can be resized using vertical coordinate values in the positional information. It should be noted that the size of the cropping region may be set by the user. For example, it is user friendly if the user is allowed to enlarge or reduce the size of the cropping region by pinch operation on the tablet.

Figure 28:
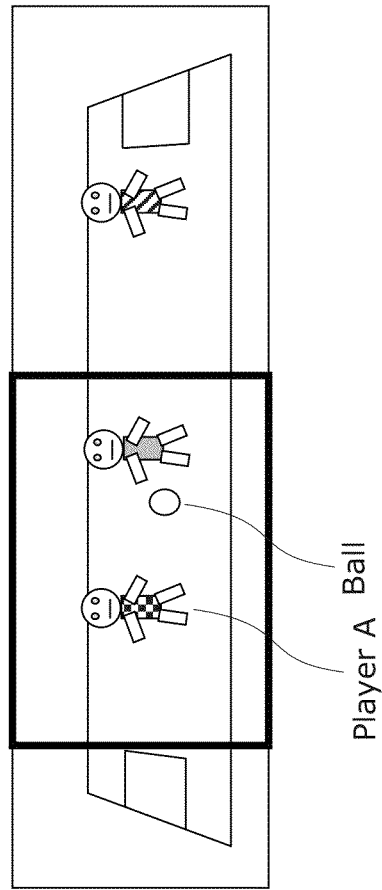
FIG. 28 is a diagram illustrating a cropping method in the case where a plurality of subjects is set as the user preference information.

As the method of cropping out and displaying the cropped region that reflects user intention by the automatic video editing unit 1424, the example of FIG. 18 has described the configuration in which only one viewed subject is exclusively selected. However, in the case of reflecting such intention as that the user desires to concurrently view a plurality of viewed subjects, the location of the cropping region may be set such that an average value of a plurality of pieces of viewed subject position information is at the center of the screen. An example is illustrated in FIG. 28. In the example of FIG. 28, the cropping region is set such that an average value of the position information of the player A and the ball position information is at the center of the screen. In this configuration, the user can enjoy a video focusing on the plurality of viewed subjects. If the viewed subjects of interest are prioritized, a weighted average value of the plurality of pieces of positional information may be used, rather than the average value of the plurality of pieces of viewed subject position information. For example, if the player A has a priority level higher than the ball, a weighted average can be obtained by (the ball position information*2+the position information of the player A*1)/3.

While the user preference information specifies objects, such as a "player" and "ball," it should be noted that the user preference information may specify a video angle preferred by the user, such as "Bird's-eye" and "Zoom." For example, if "Bird's-eye" is selected, the automatic video editing unit 1424 crops out a video from the wide-angle video, mainly distributing a video in which the entire court can be viewed from above. For example, if "Zoom" is selected, the automatic video editing unit 1424 crops out a video from the wide-angle video, mainly distributing a little zoomed image. The user may more specifically communicate the cropping region as the user preference information. In this case, the cropping frames indicating the wide-angle video and the cropping region may be displayed on the media tablet or the like, and the user may pinch in/out the cropping region to alter the size and/or location, and communicate region information of the altered cropping region to the editing system 1420. In this configuration, the user can reflect not only the preference in viewed subject as a target, but also preference in type of a video. Alternatively, the user may communicate a television size as the user preference information to the editing system 1420. More specifically, if the editing system 1420 alters the cropping region to generate a bird's-eye video for a large television size and alters the cropping region to generate a zoom video for a small television size, the user can achieve viewing videos suited to a device size.

In the distribution and viewing system 1400 according to the present embodiment 1, the editing system 1420 compression encodes a video cropped out from wide-angle video, in accordance with the user preference information, and transmits the video to the terminal of the user. The editing system 1420, however, may compression encodes the wide-angle video and transmit the wide-angle video to the terminal of the user, and the playback system 1430, which is the terminal of the user, may perform the processing to crop out a video from the wide-angle video. In this case, the supplemental data and so on of the video stream of the stream to be transmitted to the user includes coordinate information indicating the ball position and the person position in each frame. In this case, if the playback system 1430 includes the automatic video editing unit, the playback system 1430 can perform the cropping process in the playback system, using the coordinate information embedded in the wide-angle video and the stream, in accordance with the user preference information, and display a cropped video on a display terminal such as a television. In this configuration, there is no need to transmit the user preference information over a network. This allows faster responses. If the position information is to be embedded in a stream. ID and a name of the person or ID and the still image are stored in association at the beginning of the GOP or the beginning of the scene, and the ID and the position information may be stored in the subsequent frames. This way of storing the position information is efficient, reducing an amount of data, as compared to storing the name of person or still images in all frames. It will be appreciated that the structure of the stream and the playback method may be implemented in broadcast waves.

It will be appreciated that some or all networks connected by the communication I/Fs 1403, 1421, 1427, and 1431 may not be the Internet but networks on local areas.

It should be noted that the video generation unit 1423 may be included in the capturing system. In that case the capturing system 1410 generates a wide-angle video stream, and transmits the generated wide-angle video stream to the editing system. Hence, the editing system is configured to use the transmitted stream as the wide-angle video. Moreover, if, for example, the video capture unit 1402 is a high-resolution camera such as 8K/4K cameras, housing a wide-angle lens capable of capturing a wide-angle video, the video generation unit 1423 becomes unnecessary and the video capture unit 1402 may transmit video streams captured by the video capture units 1402 to the editing system. In other words, in such a case, the video generation unit may not be equipped in the capturing system or the editing system.

It should be noted that the video capture unit 1402 is not limited to a video camera, and may be a smartphone or the like equipped with camera functionality. A problem with capturing videos using smartphones that are laid out occurs when the terminal receives a phone call in the middle of capturing an event. In this case, the phone call may be forwarded to a mobile phone of a friend, a wife, or the like of the user that is authenticated as a surrogate receiver for the smartphone. For example, in the case where a father's smartphone is utilized for capturing an event, if a telephone call has arrived, it may be notified by displaying "Mr. XX is calling father" on a mother's mobile phone and the call may be allowed on the mother's mobile phone.

It should be noted that when transmitting the video content captured by the plurality of video capture units 1402 to the editing system, the video content may be collected at one terminal and then transmitted, rather than being transmitted from the respective terminals via the network. For example, if video content is captured by smartphones A, B, and C, the video content captured by the smartphones B and C may be collected at the smartphone A. Wireless transmission such as Wi-Fi or WiGig, or data passing using an SD card may be a way of collecting the video content. Then, the smartphone A transmits the video content to the editing system in bulk. Wireless transmission such as Wi-fi, LTE, or 3G, or a wired transmission such as a wired LAN may be a way of transmitting the video content. Transmitting the video content in bulk as such, rather than separately, facilitates content management and association.

(Embodiment 2)

In the present embodiment 1, the distribution and viewing system 1400 for achieving viewing the video content reflecting personal preference has been described. The present embodiment, on the other hand, will describe implementation of a distribution and viewing system 2900 for implementing advanced video content editing which produces more viewing enjoyment.

Figure 29:
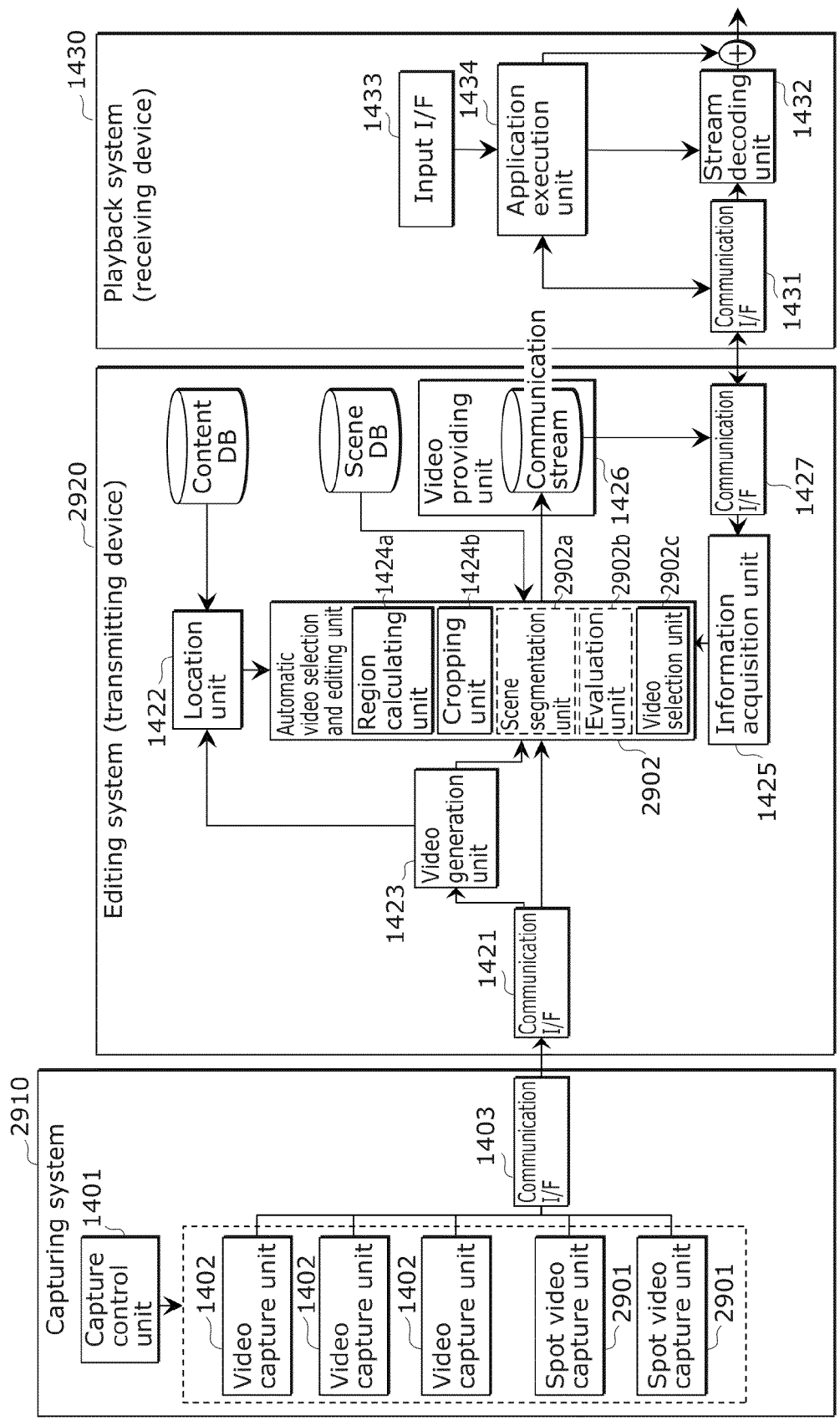
FIG. 29 is a diagram illustrating an automatic generation and viewing system for video content reflecting personal preference, according to the embodiment 2.

FIG. 29 shows a distribution and viewing system according to an embodiment 2. The basic configuration is the same as the system described with reference to FIG. 14 and thus the description will be omitted and only differences will be described.

A capturing system 2910 further includes spot video capture units 2901, besides the capture control unit 1401, the video capture units 1402 which generate a wide-angle video, and the communication I/F 1403.

Figure 30:
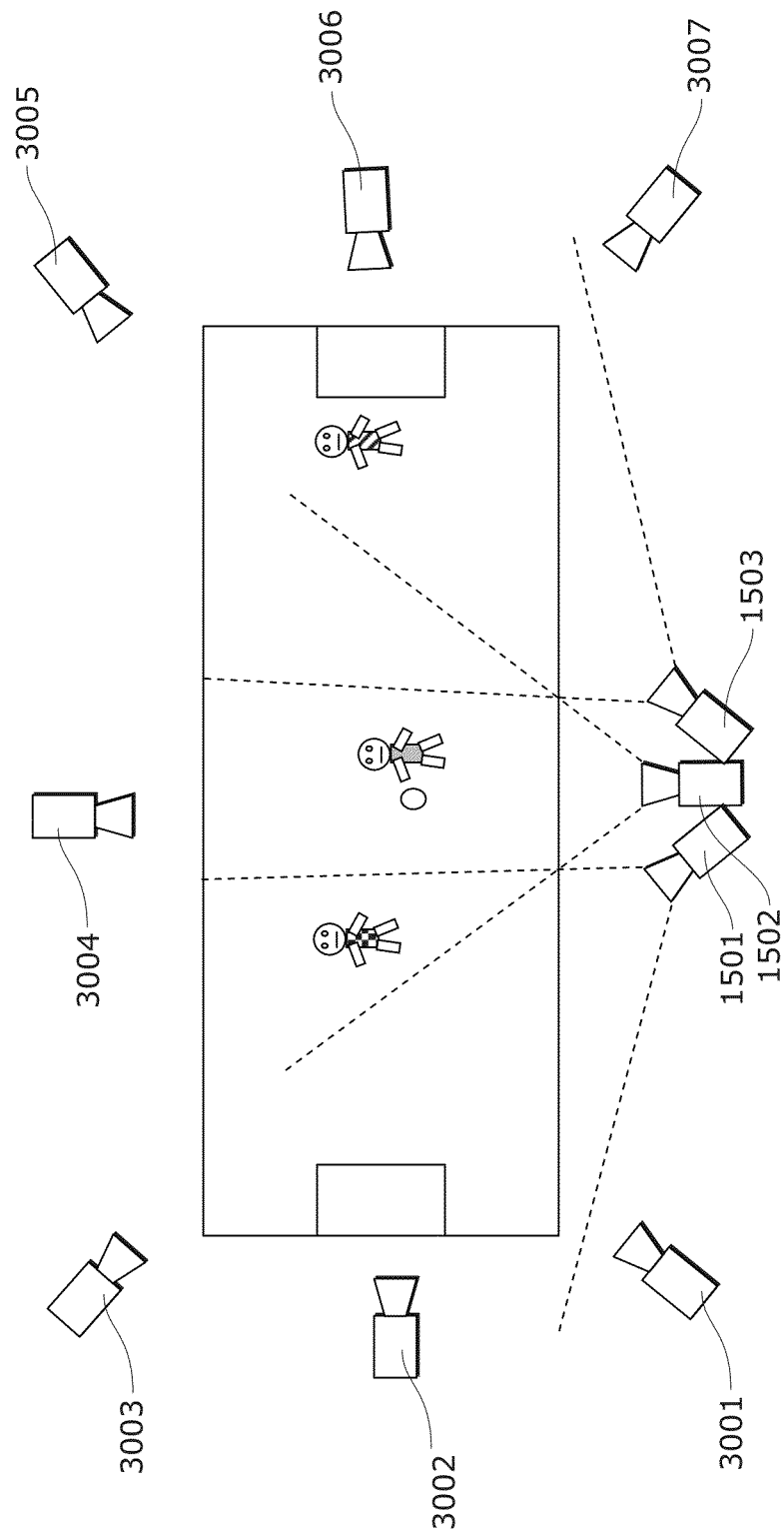
FIG. 30 is a diagram illustrating an exemplary arrangement of spot video capture units.

The spot video capture units 2901 are fixed cameras which capture videos of an event from different viewpoints than a wide-angle video. In the example of FIG. 30, the cameras 1501 to 1503 are arranged as video capture units which capture a wide-angle video of the entirety of the event, and, besides the cameras, cameras 3001, 3002, 3003, 3004, 3005, 3006, and 3007 are arranged as the spot video capture units 2901. The cameras 3001 to 3007 capture videos from respective viewpoints. The spot video capture units 2901 are, as with the video capture units 1402, under control of the capture control unit 1401, and video streams captured by the spot video capture units 2901 are transmitted to an editing system 2920 via the communication I/F 1403. The video streams captured by the spot video capture unit 2901 can be synchronized in a manner similar to the way the video streams captured by the video capture units 1402 are synchronized. At the same timing as the first main video 1511, the second main video 1512, and the third main video 1513, the spot video capture units 2901 capture spot videos, as sub videos, captured of at least partial spaces of a capture space at different angles than the first main video 1511, the second main video 1512, and the third main video 1513.

The editing system 2920 is different from the editing system 1420 in FIG. 14 in that the editing system 2920 includes an automatic video selection and editing unit 2902, instead of the automatic video editing unit 1424. The editing system 2920 is different from the editing system 1420 in FIG. 14 also in that the communication I/F 1421 of the editing system 2920 further acquires the spot videos, besides the first main video 1511, the second main video 1512, and the third main video 1513.

The automatic video selection and editing unit 2902 generates a video stream in accordance with user preference, using a wide-angle video generated by the video generation unit 1423, the spot videos captured by the spot video capture units 2901, subject position information generated by the location unit 1422, and the user preference information acquired by the information acquisition unit 1425. As compared to the automatic video editing unit 1424 of FIG. 14, the automatic video selection and editing unit 2902 is different in that the automatic video selection and editing unit 2902 further includes a scene segmentation unit 2902a, an evaluation unit 2902b, and a video selection unit 2902c, besides the region calculating unit 1424a and the cropping unit 1424b. In other words, the automatic video selection and editing unit 2902 is different from the automatic video editing unit 1424 in that when generating a video to be provided to a user, the automatic video selection and editing unit 2902 utilizes videos which are captured by the spot video capture units 2901, and, when generating a video reflecting user intention, selects a best suited video from among the wide-angle video and the spot videos and generates a communication stream. The scene segmentation unit 2902a segments a cropped video which is cropped out from the wide-angle video by the cropping unit 1424b and each of the spot videos which are acquired by the communication I/F 1421 as an information acquisition unit into a plurality of scenes, based on a predetermined algorithm. The evaluation unit 2902b evaluates each of the scenes obtained by the segmentation by the scene segmentation unit 2902a, based on the user preference information acquired by the information acquisition unit 1425 and predetermined metrics. The video selection unit 2902c selects one of the cropped video and the spot videos for each of the scenes obtained by the segmentation by the scene segmentation unit 2902a, based on the user preference information acquired by the information acquisition unit 1425. Alternatively, the video selection unit 2902c may select one of the cropped video and the spot videos for each scene, based on a result of evaluation by the evaluation unit 2902b.

FIG. 31 illustrates an example of editing by the automatic video selection and editing unit 2902. The left of FIG. 31 shows a captured scene and camera arrangements. FIG. 31 illustrates an example of a scene of a soccer game. Specifically, the figure shows a scene in which a player 1 and a player 2 are on the court, wherein the player 1 making an offensive attack downwardly relative to the screen by dribbling, the player 2 defending against the player 1 who is making the offensive attack, illustrating a scene where the player 1 is passing the player 2 by dribbling. Herein, it is assumed that both the "player 1" and "ball" are selected as the user preference information.

Herein, a camera C which includes a plurality of cameras as the video capture units 1402 is arranged so as to view down on the entire court. The video generation unit 1423 generates a wide-angle video from a plurality of videos captured by the camera C. The automatic video selection and editing unit 2902 performs a cropping process on the wide-angle video generated by the video generation unit 1423, based on the user preference information, and generates a video stream formed of the cropped video. Since the player 1 and the ball are selected as the user preference information, the video is generated by being cropped out from the wide-angle video so that an average value of the position information of the player 1 and the ball position information is at the center of the screen. The screen images are shown on the row 3103. A camera A and a camera B are arranged as the spot video capture units 2901 and capture event videos at fixed positions. The videos are transmitted to the automatic video selection and editing unit 2902. The screen images are shown in 3101 and 3102.

The automatic video selection and editing unit 2902 selects a video from among the videos and generates a communication stream. Since a cropped video obtained by being cropped out from the wide-angle video, and the spot videos captured by the spot video capture units 2901 are synchronized, selecting a video from among these videos generates stitched content that has a constant sequence of time. In other words, video content which does not go back in time nor jump to the future can be generated.

The automatic video selection and editing unit 2902 utilizes the subject position information generated by the location unit 1422 to select a video from among the plurality of videos (the cropped video and the plurality of spot videos). For example, in the example of FIG. 31, the positional information at a time t1 is shown in 3104, the positional information at a time t2 is shown in 3105, and the positional information at a time t3 is shown in 3106. Objects denoted by circles indicate persons, the ball, and camera positions. Specifically, the circles assigned with numbers "1" and "2" denote positions of persons, the circles assigned with alphabets "A," "B," and "C" denote camera positions, and the solid circle denotes the ball. Here, an example of the video selection process by the automatic video selection and editing unit 2902 will be shown, wherein a video is selected using a logic (the predetermined algorithm) of "selecting a video in which viewed subject is close to camera, without obstacles between viewed subject and camera," Here, it is assumed that "the player 1 and the ball" are to be selected based on the user preference information. In the example of FIG. 31, the video selection unit 2902c performs the video selection process for each frame of each video. In other words, FIG. 31 shows an example where the region calculating unit 1424a, the cropping unit 1424b, and the video selection unit 2902c of the automatic video selection and editing unit 2902 are functioning, and the scene segmentation unit 2902a and the evaluation unit 2902b are not functioning. In other words, the process described in conjunction with FIG. 31 may not require the scene segmentation unit 2902a and the evaluation unit 2902b.

In a frame at the time t1, the camera A is the closest of the plurality of cameras to the player 1 and the ball, which are viewed subjects, and there is no object, other than the viewed subjects, between the camera A and the viewed subjects. Thus, the video selection unit 2902c selects a video captured by the camera A that is the closest of the plurality of cameras to the viewed subjects.

In a frame at the time t2, despite that the camera A is the closest to the player 1 and the ball which are viewed subjects, there is the player 2, who is not the viewed subject, between the camera A and the viewed subjects. Thus, it is difficult to identify the viewed subjects in the video captured by the camera A. Hence, the video selection unit 2902c selects the video captured by the camera C that is the second closest of the plurality of cameras to the viewed subjects.

In a frame at the time t3, the camera B is the closest to the player 1 and the ball which are viewed subjects, and there is no object, other than the viewed subjects, between the camera B and the viewed subjects. Thus, the video selection unit 2902c selects the video captured the camera B that is the closest of the plurality of cameras to the viewed subjects.

Using the subject position information as such, a video is selected from among a plurality of videos, allowing automatic video selection in accordance with the user preference. The automatic video selection and editing unit 2902 compression encodes and multiplexes the selected video and generates a communication stream. Then, the video providing unit 1426 provides one of the cropped video and spot video that is selected by the video selection unit 2902c of the automatic video selection and editing unit 2902 to the user via the communication I/F 1427.

Figure 32:
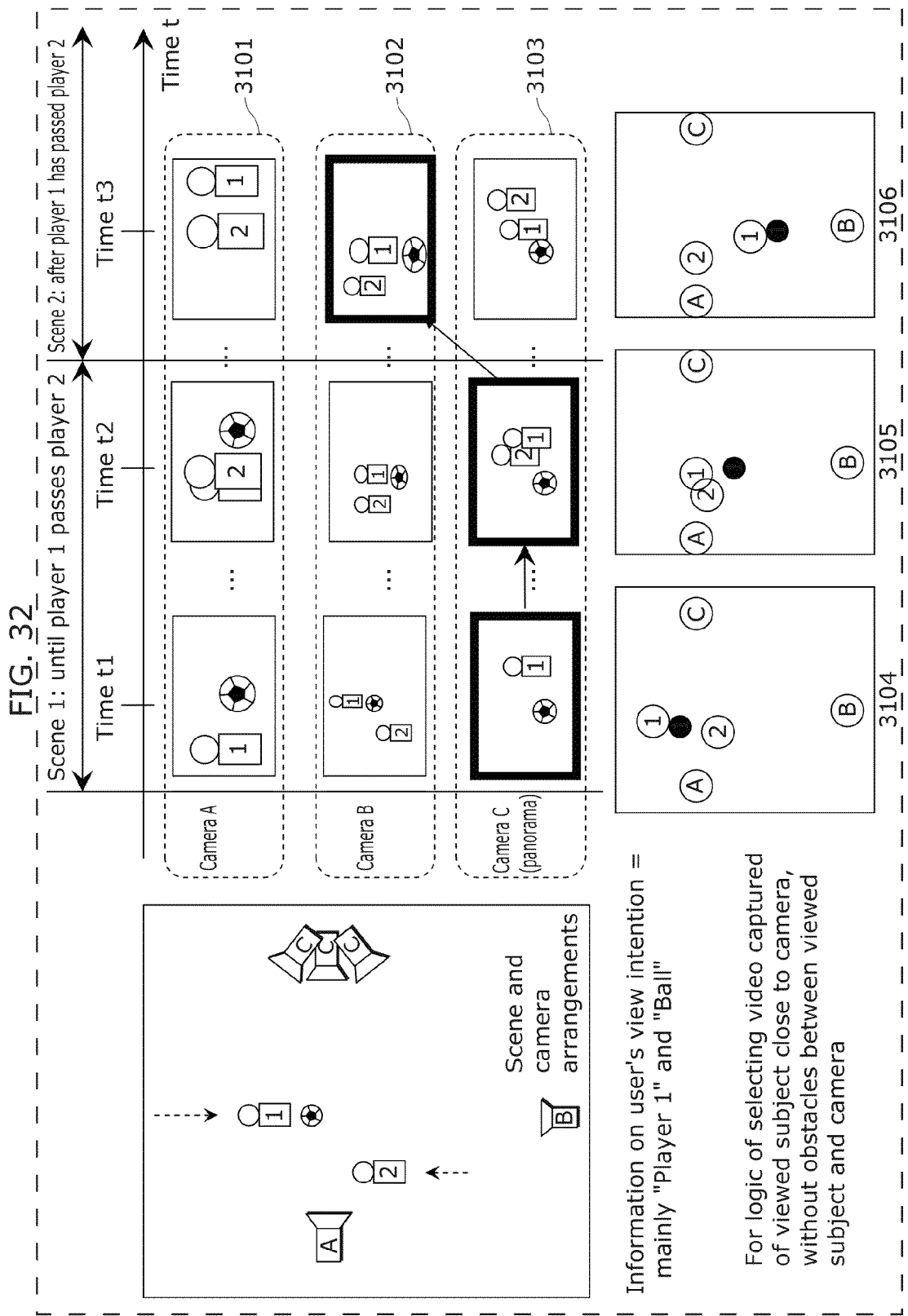
FIG. 32 is a diagram illustrating an example of editing by the automatic video selection and editing unit, utilizing scene information.

When the automatic video selection and editing unit 2902 selects a video from among a plurality of videos, an image to be used is selected in accordance with a frame at each time in the example of FIG. 31. In this case, however, videos are switched too frequently and it is highly likely that the video ends up being difficult for the user to view. Thus, as shown in FIG. 32, the content may be separated into a plurality of scenes on a time axis, a plurality of videos being synchronized may be evaluated for each scene based on the position of the subject, and a video displaying the scene may be selected based on a result of the evaluation. Thus, videos selected for the same scene are ones captured by the same camera. In the processing illustrated in FIG. 32, all the region calculating unit 1424a, the cropping unit 1424b, the scene segmentation unit 2902a, the evaluation unit 2902b, and the video selection unit 2902c of the automatic video selection and editing unit 2902 function.

The configuration in FIG. 32 is the same as FIG. 31, with respect to the positions of cameras, persons, balls, and so on. Here, the scene segmentation unit 2902a of the automatic video selection and editing unit 2902, as FIG. 32 shows, separates the scenes on the time axis, based on the subject position information. In the example of FIG. 32, utilizing the predetermined algorithm, the scene segmentation unit 2902a separates the scenes into a scene 1 captured of a scene until the player 1 passes the player 2, based on the subject position information, and a scene 2 after the player 1 has passed the player 2, based on the subject position information. The scene segmentation unit 2902a separates the scenes by referring to a scene database, in accordance with the subject position information. "How scenes are separated" will be described below.

Then, the evaluation unit 2902b evaluates each of the videos being synchronized, for each of the scenes separated by the scene segmentation unit 2902a. In the example of FIG. 32, first, the video captured by the camera A, the video captured by the camera B, and the video captured by the camera C are evaluated in the range of the scene 1. For example, in the case of the logic that "viewed subject is close to camera, without obstacles between viewed subject and camera," the method of evaluating the videos is to select, in the range of an interval of the scene 1, a video best fit to the logic that "viewed subject is close to camera, without obstacles between viewed subject and camera," based on the subject position information. More specifically, the evaluation unit 2902b may count a total distance from the camera to the viewed subjects (the position information of the player A and the ball position information) in the scene 1, count a total number of times objects other than the viewed subjects enter between the camera and the viewed subjects, and evaluate the video, based on the counted amounts. A specific example of the evaluation method of selecting a video from among the plurality of videos being synchronized as such will be described below. In the example of FIG. 32, the video selection unit 2902c selects the video captured by the camera C for the scene 1, based on a result of the evaluation by the evaluation unit 2902b. The videos in a scene 2 are also evaluated by the evaluation unit 2902b, and the video selection unit 2902c selects a video captured by the camera B in the example of FIG. 32, based on the evaluation of the scene 2 by the evaluation unit 2902b. As such, the automatic video selection and editing unit 2902 segments the plurality of videos being synchronized into a plurality of scenes, and selects a video for each of the scenes obtained by the segmentation, thereby providing a video controlling camera switchover and easy for the user to view.

How the scene segmentation unit 2902a of the automatic video selection and editing unit 2902 separates scenes will be described.

A simplest method of separating scenes is to separate scenes at regular intervals. In other words, the scene segmentation unit 2902a may segment, based on the predetermined algorithm, each video into a plurality of scenes at predetermined intervals. For example, setting a constant such as five seconds, the scene segmentation unit 2902a separates scenes in five seconds. In this configuration, camera switchover can be controlled. On the other hand, however, if angles are undesirably switched one after another without linking to the content, a video is likely to be difficult for the user to view. For example, a scene where a player is taking a shot at the soccer game may be further segmented, and a bird's-eye video of the scene may be undesirably switched to a close-up of the player. This ends up with the user not knowing the motion and positional relationship between the ball and the player. Thus, it is preferable that scenes are separated in a manner linking to content occurring in the event.

Figure 33:
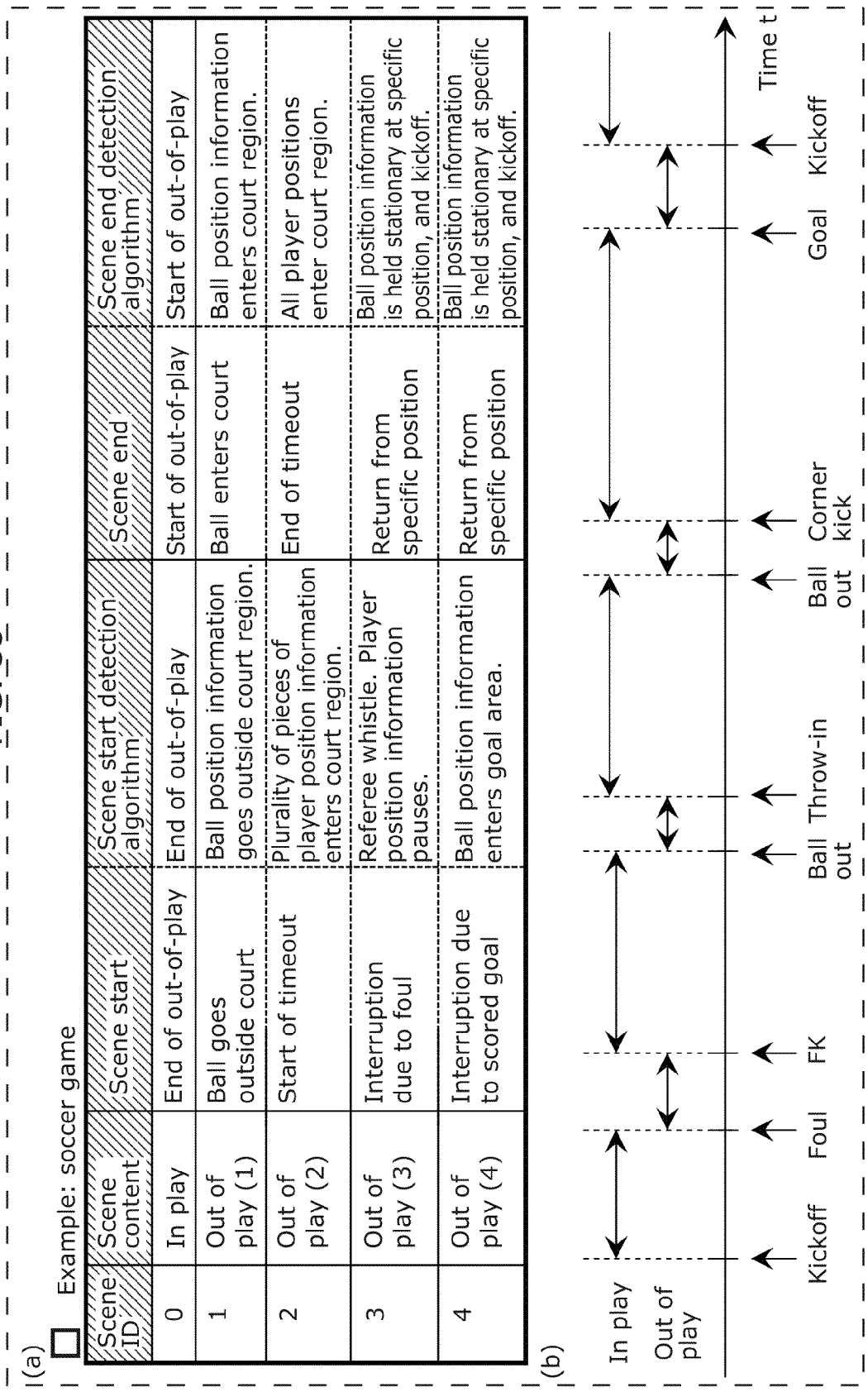
FIG. 33 is a diagram illustrating a method for separating scenes.

Thus, it is contemplated to define scenes for each content item and use the subject position information, video, and audio to implement scene separating. In other words, the predetermined algorithm according to the scene segmentation process performed by the scene segmentation unit 2902*a* on a plurality of videos may be different for different types of an event taking place in the capture space. An example is shown in FIG. 33. FIG. 33 shows scenes in video content of a soccer game. Each scene is defined with the content and a detection algorithm for a scene cut (a start point and an end point). Scene cut is detected by executing the detection algorithm on the subject position information, video, or audio. Each scene includes a scene ID, scene content, a scene start, a scene start detection algorithm, a scene end, and a scene end detection algorithm. "Scene ID" means a number unique to the scene, "Scene content" means information in which content of the scene is described, "Scene start" means content semantics for a scene start, "Scene start detection algorithm" is an algorithm for detecting the scene start, "Scene end" means content semantics for a scene end, and "Scene end detection algorithm" is an algorithm for detecting the scene end.

Herein, not limiting to the soccer, sports content can be categorized broadly into two scenes. One is "In play." In play means a situation in which player's performances may score a goal. In the case of soccer, the situation is that the game is within a time limit, a ball is in a court, no interruption due to a foul or the like is occurring, and player's motion can score a goal. In the case of valley ball and tennis, the situation covers from when a service is started to when either team or a player scores a point. The other is "Out of play." Out of play means a situation in which player's performances cannot score a goal, meaning an opposite situation to that of in-play. In the case of soccer, the situation is where no matter how players of both teams perform, a goal cannot be scored, such as the time limit has elapsed, a ball goes outside the court, the game is interrupted due to a foul, interrupted due to a scored goal, and so on. In the case of valley ball and tennis, the situation covers from when either team or a player has scored a point until a service is started or until a halftime. As described above, scenes of many of sports content items can be split into "In play" and "Out of play," the characteristics between which are significantly different. During "Out of play," the game is relaxing and the user can have a pause, whereas during "In play," the game is tense and the user cannot take his/her eyes off the game. Selecting a video in accordance with the characteristics of "In play" and "Out of play" allows effective representation. In other words, if a type of an event taking place in the capture space is sport, the scene segmentation unit 2902*a* determines whether the sport is "In play" or "Out of play" by the predetermined algorithm. At the timing when a result of the determination switches from one of in-play and out-of-play to the other, the scene segmentation unit 2902*a* may segment each of the videos (the cropped video and the plurality of spot videos) into a plurality of scenes.

An example scene of the soccer game in FIG. 33 will be described. In other words, FIG. 33 is a diagram illustrating the predetermined algorithm which is executed by the scene segmentation unit 2902*a* in the scene segmentation process if an event taking place in the capture space is a soccer game.

First, the algorithm, shown in (a) of FIG. 33, for determining each scene will be described.

A scene having the scene ID=0 means "In play," and it is defined that the scene start detection algorithm is an end of "Out of play" that has scene IDs 1, 2, 3, and 4, and the scene end detection algorithm is a start of "Out of play" that has scene IDs 1 to 4.

A scene having the scene ID=1 means "Out of play," and defines a time period during which the ball is outside the court. The scene start detection algorithm is that "Ball position information goes outside court area," the scene end detection algorithm is that "Ball position information enters court area." Execution of the algorithms can be implemented by using the subject position information. In other words, the scene start and end can be determined by detecting whether the ball position information enters or goes outside the court area. Determination as to whether a given point is inside a polygonal region can be obtained by calculating the number of line segments intersecting a ray emitted from the point. If the number is an odd number, which means that the point is inside the polygonal region. If the number is an even number, which means that the point is outside the polygonal region. The test is called Point-in-Polygon and implemented in various software such as OpenCV.

A scene having the scene ID=2 means "Out of play," and defines a timeout duration. The scene start detection algorithm is that "Plurality of pieces of player position information goes outside court area," and the scene end detection algorithm is that "Plurality of pieces of player position information enters court area," Execution of the algorithms can be implemented by using the subject position information. In other words, the scene start and end can be determined by detecting whether a plurality of pieces of player position information enters or goes outside the court area. It should be noted that a "whistle" may be used in the detection algorithms. A whistle for timeout is distinct and thus the scene start and end can be determined by pattern matching the wavelength features of the whistle and detecting the whistle.

A scene having the scene ID=3 means "Out of play," and defines a time period during which the game is interrupted due to a foul. The scene start detection algorithm is that "Referee whistle. Player position information pauses," and the scene end detection algorithm is that "Ball position information is held stationary at a specific position, and kickoff." In the scene start detection algorithm, the referee whistle can be detected by pattern matching the wavelength features of the whistle, and the stationary of the player position information can be determined by detecting the motion of the player position information. In the scene end detection algorithm, the stationary of the ball position information can be determined by detecting the motion of the ball position information.

A scene having the scene ID=4 means "Out of play," and defines an interrupted period due to scoring. The scene start detection algorithm is that "Ball position information enters goal area," and the scene end detection algorithm is that "Ball position information is held stationary at specific position, and kickoff." In the scene start detection algorithm, it can be determined, utilizing the subject position information, that a goal is scored, if the ball position information is within the goal area. In the scene end detection algorithm, the stationary of the ball position information can be determined by detecting the motion of the ball position information utilizing the subject position information.

Figure 34:
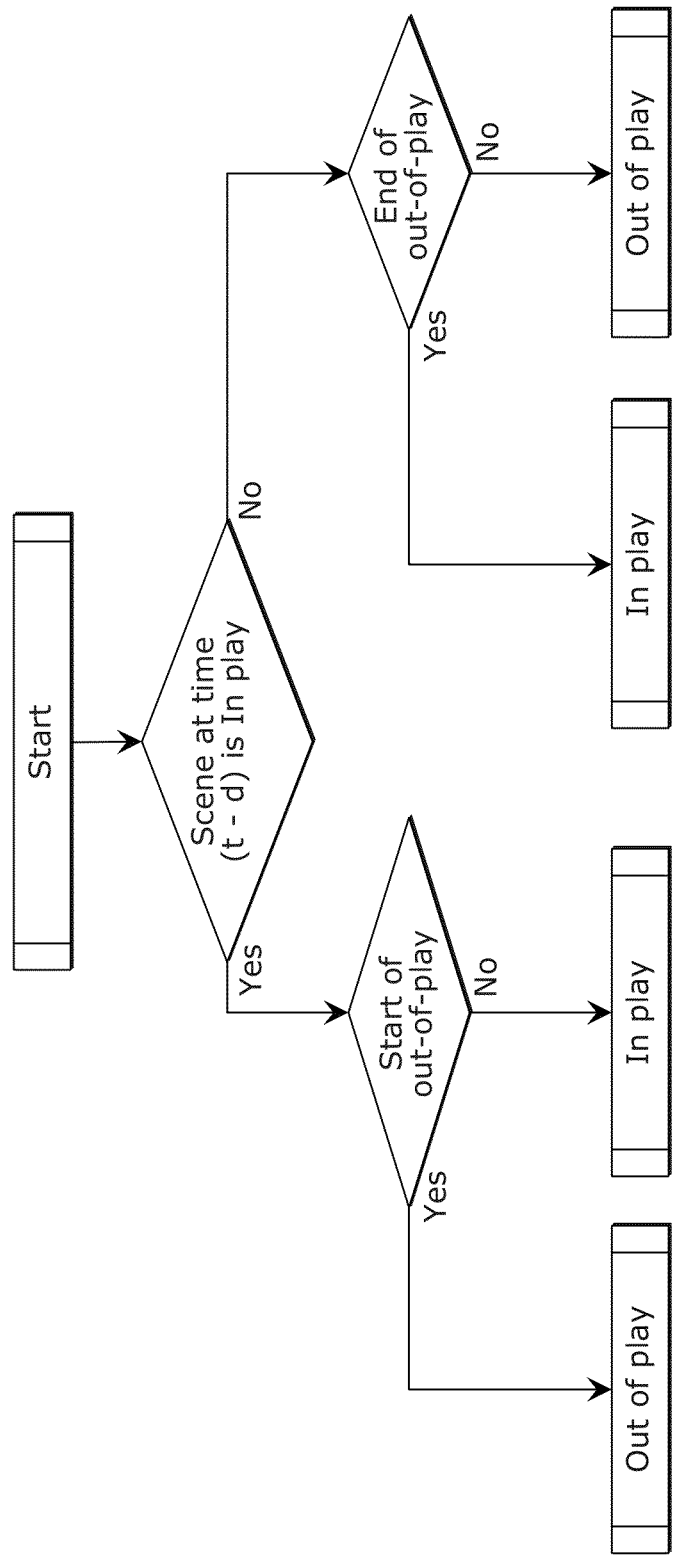
FIG. 34 is a diagram illustrating a flowchart of algorithms of separating scenes.

FIG. 34 is a flowchart illustrating the scene start and end algorithms. First, a scene at the time t−d is looked up to specify a scene at a time t, where d indicates a frame time. In other words, a scene in an immediately preceding frame is looked up. If the scene at the time t−d is "In play," the scene start detection algorithm is executed for a "Out of play" scene (the scene ID=1 to 4 in the case of FIG. 33). If any scene start is detected, it is determined that the scene at the time t is "Out of play," otherwise, it is determined that the scene at the time t is "In play." If the scene at the time t−d is "Out of play," the scene end detection algorithm that has the scene ID of the "Out of play" is executed. If a scene end is detected, it is determined that the scene at the time t is "In play," otherwise, it is determined that the scene at the time t is "Out of play."

Part (b) of FIG. 33 shows an example way of separating scenes of a soccer game. After a start of the game, an "In play" scene transitions to a "Out of play" scene when, for example, a player receives a foul, the ball goes outside the court, or a goal is scored, and the "In play" scene otherwise.

This is the end of description as to how the automatic video selection and editing unit 2902 separates scenes.

Next, a specific method by the evaluation unit 2902b of the automatic video selection and editing unit 2902 to perform evaluation for selecting a video from among a plurality of videos being synchronized (hereinafter, the evaluation method will be simply referred to as a "video evaluation method") will be described. The video evaluation method, provided with metrics for video evaluation, evaluates frames of the scene at all or some times and selects a highly valued frame. In other words, the predetermined metrics the evaluation by the evaluation unit 2902b is based on will be described hereinafter. Not all video items described hereinafter needs to be performed, and may be changed depending on the characteristics of content or user preference.

Metric 1: A distance between the video capture unit (including the spot video capture unit) and positional information of the viewed subject (ex.: ball or player) specified by the user preference information The metric 1 is an indicator for determining a higher value on a video which is captured by a video capture unit that is closer to the viewed subject and has an angle of view covering the viewed subject. This configuration allows the user to view a close-up video of the viewed subject. In other words, the predetermined metrics include an indicator for determining a higher value on a video scene captured by a camera, among a plurality of cameras capturing videos, that is closer to the viewed subject and has an angle of view covering the viewed subject.

Metric 2: The number of objects existing between the position information of the viewed subject specified by the user preference information and the position information of the video capture unit (including the spot video capture unit)

The metric 2 is an indicator for determining a lower value on a video that includes a greater number of objects other than the viewed subject, between the video capture unit capturing the video and the viewed subject, in particular, when the object is a person other than players, such as a referee. This configuration allows the user to view a video captured of the viewed subject without the viewed subject being hidden by obstacles. In other words, the predetermined metrics include an indicator for determining a higher value on a video scene captured by a camera, among a plurality of cameras capturing videos, that includes a less number of objects between the camera and the viewed subject and has an angle of view covering the viewed subject.

Metric 3: The area of the viewed subject specified by the user preference information in a video captured by the video capture unit (including the spot video capture unit)

The metric 3 determines a higher value on a video, among videos captured by the video capture units, that includes a larger area of the viewed subject. The determination can be obtained by specifying the viewed subject (such as a player) in the video data by face recognition or the like, and obtaining the area of the viewed subject. Similarly to the metric 1, however, the video means nothing unless the viewed subject is in the angle of view. Thus, the value of a video may be lowered if the face is not in the angle of view, for example.

This configuration allows the user to view a close-up video of the viewed subject. In other words, the predetermined metrics include an indicator for determining a higher value on a video scene that includes the larger area of the viewed subject and is captured by a camera, among a plurality of cameras capturing videos, that has an angle of view covering the viewed.

It should be noted that a weighing of each metric may be changed depending on user preference or a scene. For example, in the example of the soccer, since in a scene prior to a goal, goal position information is important as well as a target player and the ball, a high value may be determined on a video by which the positional relationship between players, the target, and a goal is known. In other words, if the predetermined metrics include two or more indicators of a first indicator (the metric 1), a second indicator (the metric 2), and a third indicator (the metric 3), the evaluation unit 2902b may evaluate each of the scenes, based on a total sum of weighted values obtained by applying predefined weights, which are associated with the respective two or more indicators, to a plurality of results of evaluating the scene based on the two or more indicators.

Herein, as mentioned earlier, in the automatic video selection and editing unit 2902, scene separation in accordance with the content can be achieved by the scene segmentation unit 2902a separating the scenes, and the evaluation unit 2902b modifies the method of evaluating videos or the video selection unit 2902c modifies the method of selecting a video. This can generate video content that is edited effectively to the user.

As mentioned earlier, scenes can be categorized broadly into two scenes: "in play" and "Out of play" in sports content, wherein tense (in play) and relaxation (out of play) are repeated.

Viewpoints at which a user desires to view a video are significantly different between "In play" and "Out of play" scenes. Since the situation is tense in an "In play" scene as to whether a goal is to be scored or not, a bird's-eye video, for example, is preferable in which the positional relationship between players, the ball, and the court can be known, rather than a video showing a close-up of only one player. On the other hand, since the situation is relaxing in a "Out of play" scene wherein a goal is less likely to be scored and the user can have a pause or think back the previous in-play scene, a video focusing on one player or a replay is preferable. Specific video methods to achieve selecting a video in accordance with the characteristics of the "In play" and "Out of play" scenes will be listed below. Not all video selection methods described hereinafter needs to be performed, and may be changed depending on the characteristics of content or user preference.

1. In an interval of a "Out of play" scene, the automatic video selection and editing unit 2902 may switch from a video to one capturing a player who has last touched the ball in an "In play" scene immediately before the interval. The player who has touched the ball is a player the position information of which is in contact with the ball position information. This configuration allows the user to view, in the "Out of play" scene, a video focusing on a key player in the "In play" scene immediately before the interval, thereby increasing viewing enjoyment of the user.

2. In the interval of the "Out of play" scene, the automatic video selection and editing unit 2902 may switch from a video to one capturing a player on an attacking team who has last touched the ball in the court in the "in play" scene immediately before the interval. This configuration allows providing a video focusing on a player of interest of many users. This is because a player of interest is, for many users, a player on an attacking team.

3. in the interval of the "Out of play" scene, the automatic video selection and editing unit 2902 may switch from a video to one capturing a player who is preferred by the user and in the user preference information. This configuration allows providing, in the "Out of play" scene, a video focusing on a player preferred by the user.

4. In the interval of the "Out of play" scene, the automatic video selection and editing unit 2902 may switch from a video to one capturing players of a team which is preferred by the user and in the user preference information. This configuration allows providing the user, in the "Out of play" scene, with a video focusing on players of a team preferred by the user.

Figure 35:
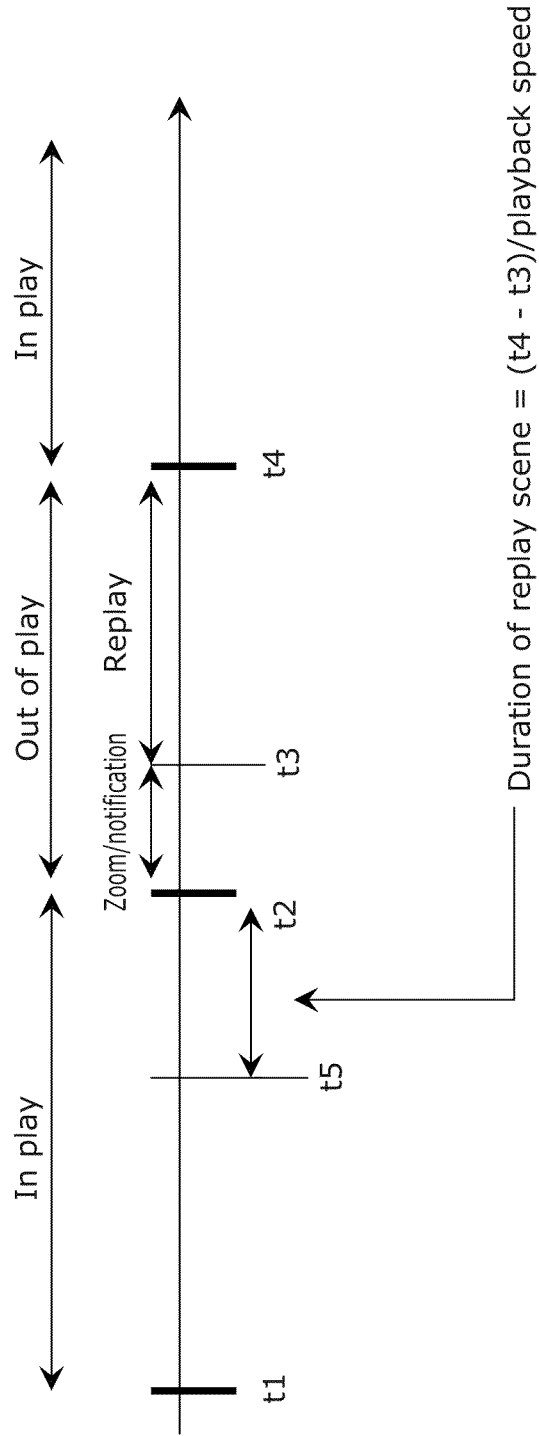
FIG. 35 is a diagram illustrating a video scene utilized in a replay.

5. In the interval of the "Out of play" scene, the automatic video selection and editing unit 2902 may switch from a video to a replay of an immediately preceding "In play" scene. This configuration allows the user to recall, in the "Out of play" scene, the immediately preceding in-play scene. In other words, if a type of an event taking place in the capture space is sport, the video selection unit 2902c of the automatic video selection and editing unit 2902 may select a video from among videos of an immediately preceding "In play" scene when an "In play" scene is switched to a "Out of play" scene, instead of selecting the "Out of play" scene. Herein, the "In play" scene to be utilized in the replay is set so as to end at an end time of the immediately preceding "In play" scene. FIG. 35 shows an interval utilized in the replay. In FIG. 35, t1 is a start time of an "In play" scene, t2 is an end time of the "In play" scene as well as a start time of a "Out of play" scene, t4 is an end time of the "Out of play" scene as well as a start time of a subsequent "In play" scene. Then, if a close-up of a specific player is displayed or a message that the replay is to be played is notified to the user at the beginning of the "Out of play" scene, the replay may start playing at a time t3. In this case, the replay is played at t4 to t3. Dividing the replay by a playback speed determines a replay scene time which is a duration of the immediately preceding "In play" scene to be utilized in the replay. Herein, the playback speed is slower than a predetermined real time. Subtracting the replay scene time from t2, which is the end time of the immediately preceding "In play" scene, determines a top time (t5) of the immediately preceding "In play" scene to be utilized in the replay. In this manner, a scene of interest in the immediately preceding "In play" scene can be played in a replay.

6. In the interval of the "Out of play" scene, the automatic video selection and editing unit 2902 may switch from a video to a camera feed capturing spectators. This configuration allows the user to know the state surrounding the event during the "Out of play" scene.

7. At a timing a "Out of play" scene is switched to an "In play" scene, the automatic video selection and editing unit 2902 may switch from the scene to a video capturing a player holding the ball (a player the positional information of which is close to the ball position information). When switching from the "Out of play" scene to the "In play" scene in sports, the "In play" scene, in most cases, resumes showing a specific player, examples of which include a throw-in or a corner kick in soccer and a serve in valley ball. Switchover to a video capturing a player holding the ball at the timing the "Out of play" scene is switched to the "In play" scene accurately conveys, to the user, that the game is to resume. Upon resuming with the "In play" scene displaying throw-in in soccer, it is preferable that a scene is switched to an image capturing a player throwing in the ball from behind. Selecting such an image allows the user to know not only the player throwing in the ball but also the positional relationship between other players around the player.

8. In the interval of an "In play" scene, the automatic video selection and editing unit 2902 may switch from the scene to a bird's-eye video. The bird's-eye video can be generated by cropping the wide-angle video captured by the video generation unit, based on the ball position information or a player specified by the user. The bird's-eye video allows the user to know the positional relationship between the ball, players and the court, and thus the user can view the "In play" scene that is tense where a goal can be scored, while seeing the entire court, without missing scoring play.

9. In the interval of an "In play" scene, the automatic video selection and editing unit 2902 may temporarily switch from the scene to a zoomed image of a specific player or the ball. In this case, the zoomed image of the specific player or ball allows the user to view a video reflecting the user preference. In this case, however, user's enjoyment is lost if the user misses scoring play due to focusing on the zoomed image of the specific player. Thus, it is preferable that such a zoomed image of the specific player or the ball is shown, limiting to intervals in which no goal is scored in the "In play" scene.

Figure 36:
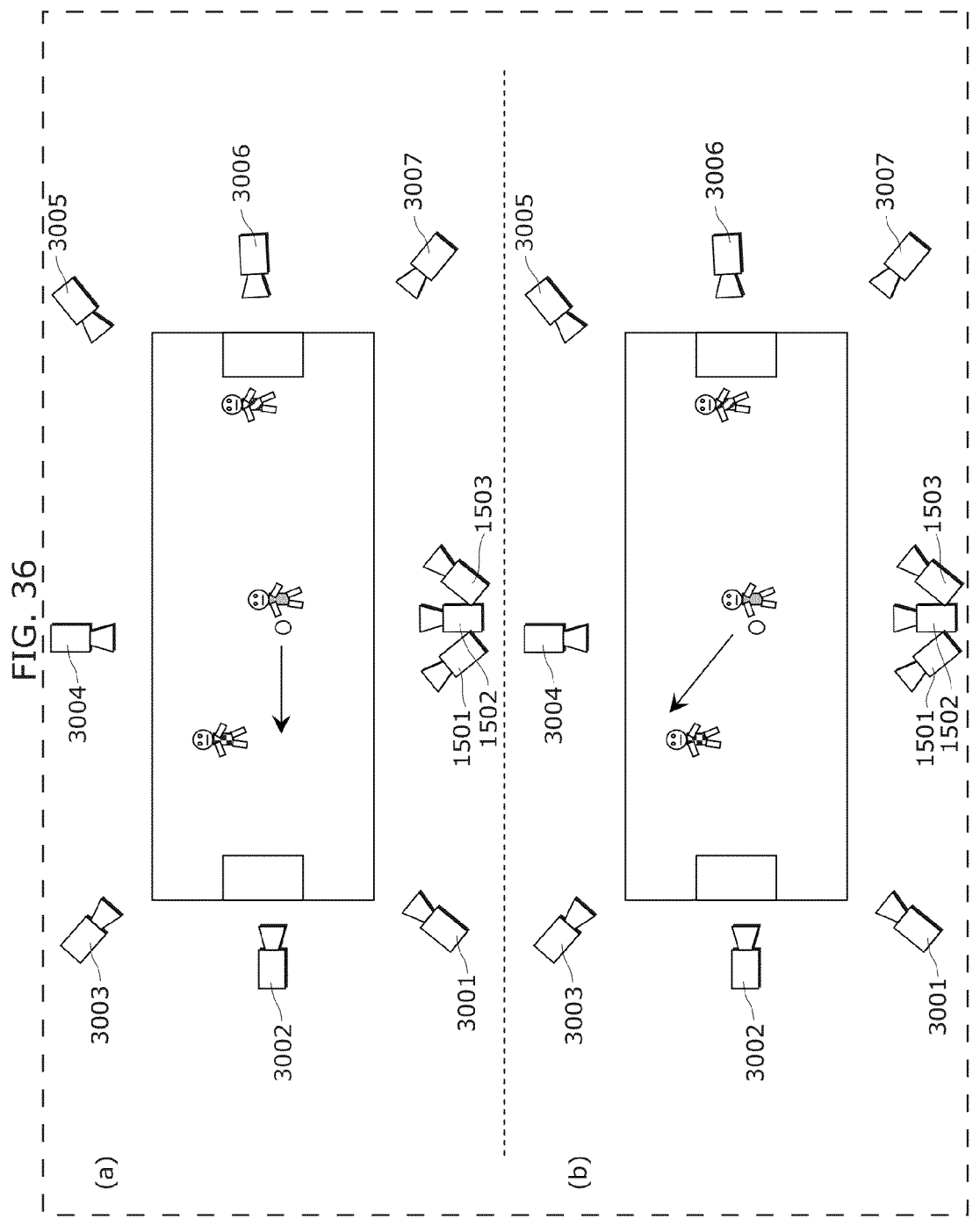
FIG. 36 is a diagram illustrating an example of using motion vectors of players to select a video by the automatic video selection and editing unit.

10. In the interval of an "In play" scene, the automatic video selection and editing unit 2902 may switch from a video to one captured by a camera that is arranged oriented in a direction of a motion vector of a player holding the ball and behind the motion vector. For instance, if the direction of the motion vector of the player holding the ball is as indicated by the arrow in the example of (a) of FIG. 36, the automatic video selection and editing unit 2902 switches from a video to one captured by a camera 3006 that is arranged behind the motion vector, and if the direction of the motion vector of the player holding the ball is as indicated by the arrow in the example of (b) of FIG. 36, the automatic video selection and editing unit 2902 switches from a video to one captured by a camera 3007 that is arranged behind the motion vector. This configuration allows the user to view a powerful video of the player holding the ball who is attacking the opponent in a depth direction, giving the user an impression as if the user is attacking the opponent.

This is the end of description of the automatic generation and viewing system for video content reflecting personal preference according to the present embodiment.

While real time (providing an event to a user in real time) is not mentioned in the embodiments 1 and 2, it will be appreciated that shortening times that take for: (1) the transmission from the capturing system to the editing system; (2) the image generation process by the editing system; and (3) the transmission of a stream from the editing system to the playback system approaches real time, i.e., achieves a live video. For example, suppose that there are a delay of one second for the transmission in (1), a delay of ten seconds for the image generation process of (2), and a delay of one second for the transmission in (3), a total delay is twelve seconds. The user, however, can enjoy viewing content of the event in a manner close to live. In other words, when segmenting each of the cropped video and the plurality of spot videos into a plurality of scenes, the scene segmentation unit 2902a may segment them at predetermined time intervals, independent of the predetermined algorithm.

Figure 37:
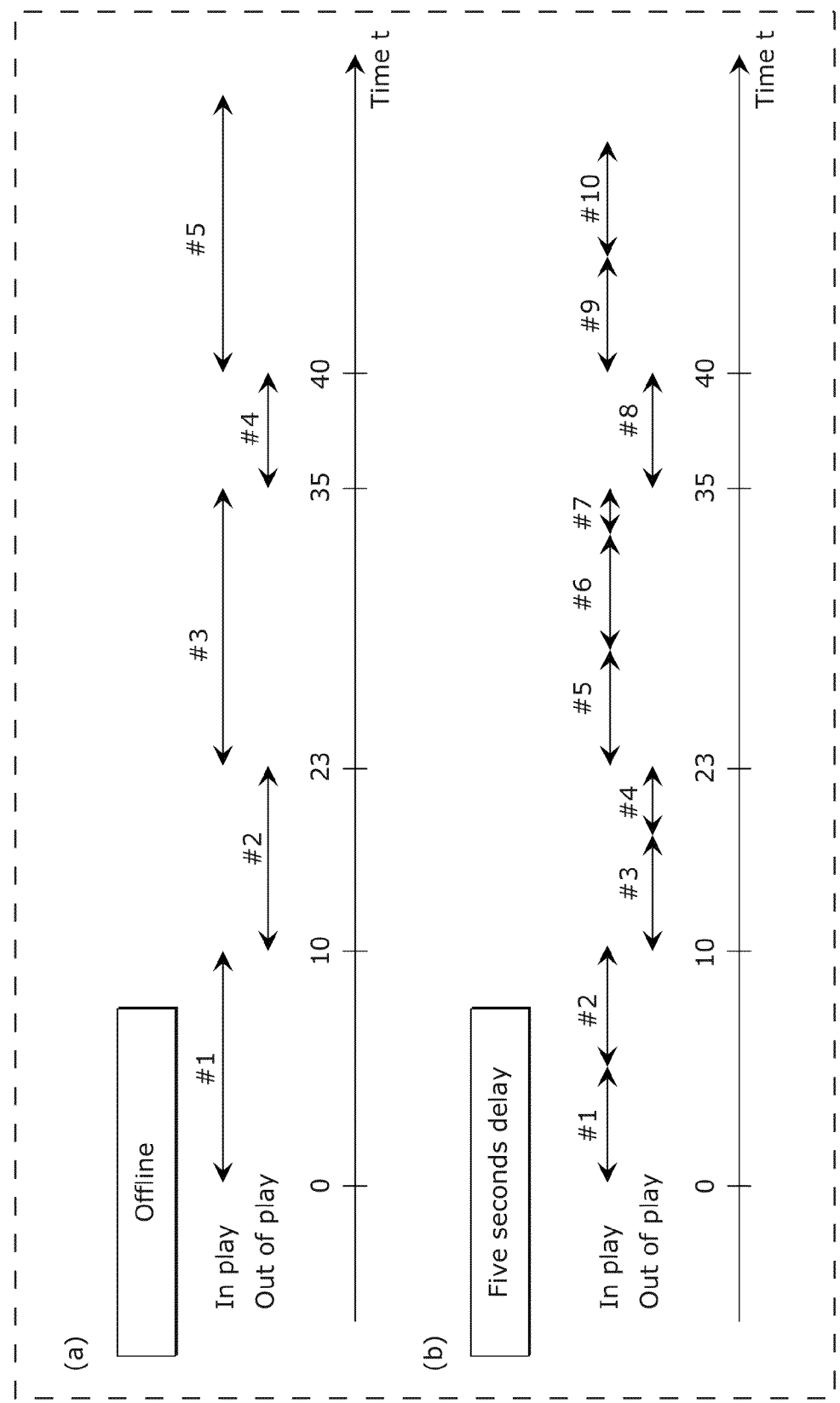
FIG. 37 is a diagram illustrating an example of separating scenes where an allowable delay amount is set.

Herein, how scenes are separated to provide to the user a video in a manner close to live will be described. The method of scene segmentation in this case is illustrated in FIG. 37. Part (a) of FIG. 37 shows an offline example (in other words, the editing system is executed after the entire event has been captured). In this case, scenes may be separated in accordance with the subject position information or the like in the event, and the automatic video selection and editing unit may then generate a video. Therefore, intervals having the same status (in-play or out-of-play) are not separated as different scenes. Part (b) of FIG. 37 shows an example where the automatic video selection and editing unit 2902 is allowed for delay of five seconds. In other words, the automatic video selection and editing unit 2902 may determine a scene in five seconds delay. In this case, waiting for the detection of the end of the scene ends up delaying the scene separation process. In other words, suppose that there is a scene, duration of which is ten seconds where the allowed delay is five seconds, waiting for the scene separation for ten seconds ends up failing to complete the scene separation process. Thus, for a given allowable delay amount, if the scene separation does not occur from the start of a scene until the allowable delay amount has elapsed, scenes are separated even if they have the same status. The automatic video selection and editing unit evaluates and selects a video as described above in unit of the separated scenes. In this manner, the scene separation can be implemented in a manner close to live. It should be noted that if the scenes having the same status are contiguous (ex.: #1 and #2 in (b) of FIG. 37), it is encouraged to select videos captured at the same angle. This configuration can reduce the number of times the angles are switched.

While the "player" and the "ball" are specified as the user preference information, a "team" may be specified, for example. If a team preferred by the user is set as the user preference information, the automatic video selection and editing unit 2902 selects a video that has frequently captured players of the preferred team. This configuration allows the user to view video content reflecting the user preference.

While the automatic video selection and editing unit 2902 selects the video data, it will be appreciated that the automatic video selection and editing unit 2902 may crop out only a region of interest as a video is cropped out and generated from a wide-angle video.

As an example, scenes are separated into "In play" and "Out of play" scenes in FIG. 33. However, as shown in FIG. 38, scenes may be separated based on a switchover between attack and defense in an "In play" scene. In this case, examples of the detection algorithm in a scene where a team A is on the attack include "(1) Player touching ball has changed to player of team A," "(2) Majority of players is in team B's environment," and "(3) Majority of motion vectors of players is on a team B side." In (1), the switchover between attack and defense can be determined by whether a player having the positional information close to the ball position information belongs to the team A. In (2), the switchover between attack and defense can be determined by counting the number of players that have the positional information existing in the team B's environment area. In (3), the switchover between attack and defense can be determined by calculating a motion vector in player position information. For example, a video capturing the attacker is selected by splitting scenes based on the "switchover between attack and defense" in such a manner. This, in general, draws attention to an attacker in sport, thereby providing the users with a video which is capturing a player of interest of many users.

While the description has addressed a sports event by way of example of the content in the present embodiment, it will be appreciated that the present invention is applicable to other events. For example, the content may be a concert video as shown in FIG. 39. In the case of a concert of an idol group of a plurality of members, fans do not always desire to see videos captured of all the group members, but have a strong desire for videos focusing on a specific group member. In such a case as well, the automatic generation and viewing system for video content reflecting personal preference according to the present embodiment is effective and can be implemented in the same manner as with the case of sport. How scenes are separated in the case of concert will be described. First, content of a concert can be categorized broadly into two scenes; "In performance" and "Out of performance." In other words, if a type of an event taking place in the capture space is concert, the scene segmentation unit 2902*a* may segment each of the cropped video and the plurality of spot videos units into a plurality of scenes by determining whether the concert is in an "In performance" scene or a "Out of performance" scene by a predetermined algorithm.

In this case, an "In performance" indicates a time during which members are singing or dancing in the case of an idol group. An "Out of performance" indicates a time during which the members are doing things, other than singing and dancing, in the case of an idol group. During periods of no performance, in the case of an idol group, members chat or talk among the group or to audiences, for example. This is called a narrative interlude. The difference between "In performance" and "Out of performance" scenes is determined by analyzing audio which is collected by the video capture units. The audio analysis, for example, measures tones of digitized sounds, and determines the difference between "In performance" and "Out of performance" scenes from characteristics of the tone. Tones of music to be performed at the concert are previously registered in a database after which a tone of picked up voice is matched with a tone on the database, thereby determining whether the current scene is "In performance" or "Out of performance." For example, "twelve-tone analysis" from Sony Corporation is well known as such an audio analysis technique.

Additional information to separate scenes into "In performance" and "Out of performance" includes lighting and audience voice. Lighting can act as assisting the scene split by analyzing an image and measuring luminance values. Audience voice can act as assisting the scene split by measuring the magnitude of the sound. Splitting scenes into "In performance" and "Out of performance" scenes in doing so can achieve selection of a video in accordance with the scene. For example, in many cases, the members talk in a "Out of performance" scene. Thus, a person actually uttering a sound may be identified and a video may be switched to one focusing on that person. The identification of the person uttering a sound can be achieved by measuring each of microphone volumes of the members. This configuration allows the user to concurrently view the voice and an image of a person actually talking, thereby providing the user with a readily comprehensible video.

In a "Out of performance" scene, the audio analysis may be performed on talk, and a result may be displayed as subtitles overplayed on the screen. In this manner, the content of the conversation can be presented to the user in a readily comprehensible manner. It should be noted that for "In performance" scenes, the audio analysis may be further exploited, matching the performance with a music tone in a database to split scenes in such a unit as "introduction," "verse," "bridge," "chorus," and "interlude," Switching videos for each scene in this manner allows providing powerful video content that does not make the user bored. It should be noted that similar effects can be obtained by splitting scenes during performance in unit of lyrics (i.e., one line), for example.

Figure 40:
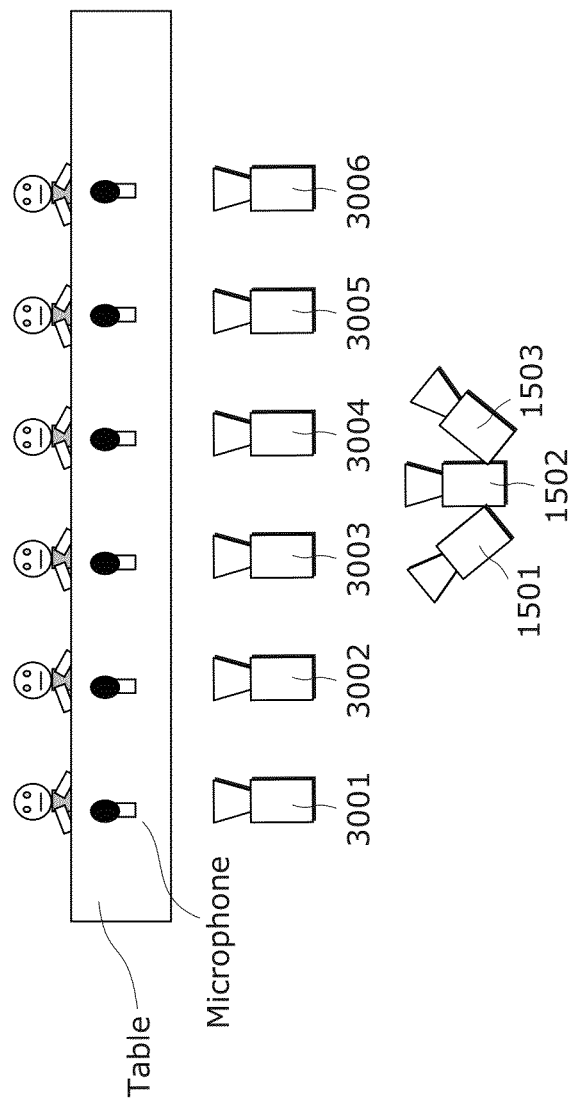
FIG. 40 is a diagram illustrating application 2 of the embodiments 1 and 2.

While a sports event is taken by way of example of the content in the present embodiment, it will be appreciated that the present invention is also applicable to events other than sports events. For example, the content may be an event capturing discussion and conference as shown in FIG. 40. In this case, in FIG. 40, the spot video capture unit is prepared for each panelist, and video capture units for generating a wide-angle video are prepared separately. How scenes are separated in such a case of discussion and conference will be described. The scene separation in discussion and conference is based on a changeover from one speaker to another. In other words, if a type of an event taking place in the capture space is discussion, the scene segmentation unit 2902*a* may segment each of the cropped video and the plurality of spot videos into a plurality of scenes by determining, by a predetermined algorithm, a changeover from one speaker to another during the discussion, among a plurality of participants of the discussion.

For example, in a case of a discussion involving a person A, a person B, a person C, a scene where the person A talks, a scene where the person B talks, and a scene where the person C talks occur in turn. To determine a switchover between the speakers, a result of measuring each of the microphone volumes of the speakers, or a feature value of the tune of the speaker's voice, and so on may be previously registered in a database. Then, the currently uttered voice is matched with the database, thereby identifying who is currently talking. Alternatively, the current speaker may be identified by detecting a movement of a person's mouth by image recognition. Separating scenes for each speaker in this manner and the automatic video selection and editing unit 2902 selecting a video focusing on a speaker in the scene allow the user to concurrently view the voice and an image of a person actually talking, thereby providing the user with a readily comprehensible video.

As an example, scenes are separated into "In play" and "Out of play" in FIG. 33. However, in the case of, for example, figure skating, scenes may be separated for each element. Changing a video for each scene allows providing powerful video content which does not make the user bored. For example, if bone structural information of a player can be obtained from the player position information, breaks between skills can be determined by motion patterns of the bones.

It should be noted that an operator may be able to manually set a scene while viewing a video such as the wide-angle video. For example, buttons indicating "In play" and "Out of play" are provided on a display device such as a tablet, and when the operator depresses a button while viewing the wide-angle video, a scene setting is made and its information is notified to the automatic video selection and editing unit 2902 of the editing system. In this manner, the automatic video selection and editing unit can set scenes without analyzing the positional information.

It should be noted that the generated scene information may, of course, be utilized as chapter information for the user to view videos. When the user selects the chapter information displayed as a chapter menu on a television or the like by a remote controller or the like, the playback starts from the chapter position. Thus, the user can readily search for a video of interest and play it easily.

It should be noted that, utilizing the generated scene information, the editing system 2920 may generate and provide the user with a highlight video. For example, in a team A versus team B game match, if the user is a fan of the team A, only "In play" scenes wherein "the team A is on the attack" may be selected to generate and provide a video stream to the user. Generating a highlight video using the scene information in this manner allows the user to play only scenes of interest in a short time.

It should be noted that the generated scene information may be utilized for playback of a replay which is played in the section of a "Out of play" scene or the like. For example, the replay is played from a switchover between attack and defense. In this configuration, the user can view a key scene video in the replay.

While in the distribution and viewing systems 1400 and 2900 according to the present embodiments 1 and 2, respectively, the description has been given with reference to the remote controller as an input I/F, it should be noted that the input I/F may be, as illustrated in a media tablet 4101 in FIG. 41, a device (an information terminal) equipped with a display, such as tablets and smartphones. Buttons (icons) of a ball and players' names are provided on the media tablet. Selection of a button by the user may transmit the selection information as the user preference information to the editing systems 1420 and 2920. In other words, the information acquisition unit 1425 may acquire, via a network, the user preference information input by the user to the information terminal connected to the computer via the network. The editing systems 1420 and 2920 generates a video from videos captured by the spot video capture units or by cropping the wide-angle video to focus on a target in the user preference information, and transmit it to the playback system 1430, and the video is displayed on a television or the like. In doing so, the editing systems 1420 and 2920 may generate a wide-angle video stream conforming to the resolution of the media tablet 4101, play on the media tablet 4101 the wide-angle video displayed combined with a rectangular area indicating the currently cropped region. This configuration allows the user to comfortably view the video by simple operation.

It should be noted that when the user moves the rectangular area shown on the media tablet 4101 in FIG. 41 by pinch-in/pinch-out or slide operation, its position or rectangular size information may be notified to the editing systems 1420 and 2920, the editing systems 1420 and 2920 may crop a region at the position and having the rectangular size from the wide-angle video and generate a stream, and transmit the stream to the viewing system to display it on a television or the like. In this manner, the user can directly operate a viewpoint which the user desires. It should be noted that the similar effects can be obtained by providing a slide bar on the tablet and changing the location of the cropping region by moving the slide bar.

Figure 42:
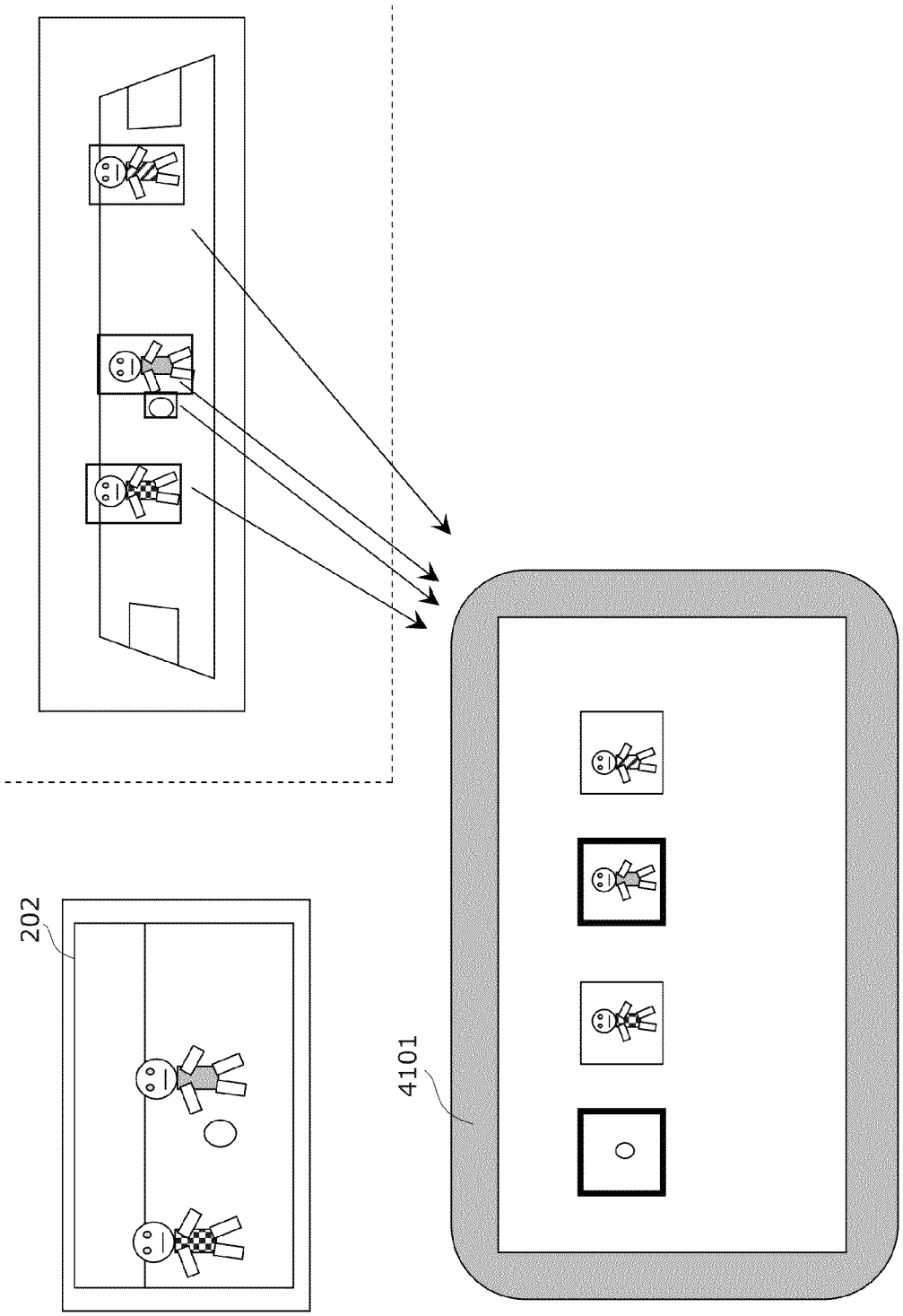
FIG. 42 is a diagram illustrating a user interface for reflecting user preference data.

While in the distribution and viewing systems 1400 and 2900 according to the present embodiments 1 and 2, respectively, "name" buttons of persons or the ball are provided. The user selects a button, and the user preference information is reflected to a video. However, as shown in FIG. 42, "still image" buttons which are cropped out from the wide-angle video using the subject position information may be displayed, rather than the "name" buttons, on an information terminal such as the media tablet 4101, and the user may select a button. The subject position information is attached with an ID for each subject, and information on the still image and the ID in pair are transmitted to the media tablet 4101. When the user selects a still image, an ID associated with the still image is transmitted as the user preference information to the editing system. The editing system crops the wide-angle video or selects a spot video, utilizing the subject position information having the ID, generates and transmits a video content to the viewing system, and the video contend is displayed on a television or the like. This configuration allows the user to play a video reflecting the user preference even if the association between the subject (i.e., a person) and the name on the wide-angle video is not obtained.

Figure 43:
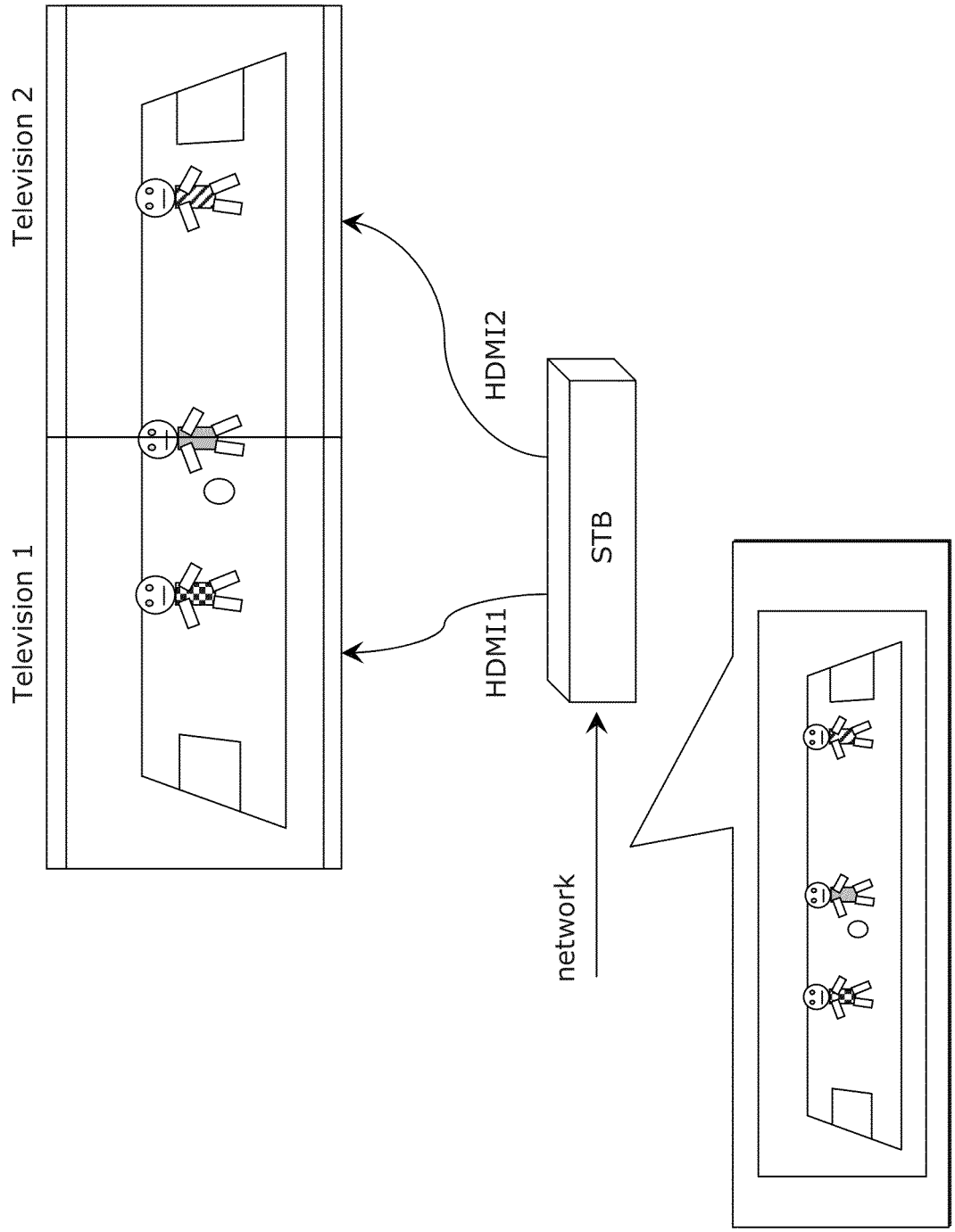
FIG. 43 is a diagram illustrating a configuration 1 for displaying a wide-angle video on a plurality of televisions.

While the distribution and viewing systems 1400 and 2900 according to the respective embodiments 1 and 2 receive a video generated by being cropped out from the wide-angle video utilizing the subject position information, and present the video to the user, the distribution and viewing systems 1400 and 2900 may, as shown in FIG. 43, receive and display the wide-angle video on a plurality of televisions placed side by side. In the configuration of FIG. 43, STB is connected to the Internet, receives the wide-angle video from the capturing system on the network, and STB crops out an image of the left half of the wide-angle video and outputs it to a television 1 through HDMI (registered trademark) 1 and crops out an image of the right half of the wide-angle video and outputs it to a television 2 through HDMI (registered trademark) 2. Connecting televisions in such a manner allows the user to view a super-wide video. It should be noted that selection of videos to be output from the respective HDMIs (registered trademark) may be set by the user through GUI or the like.

Figure 44:
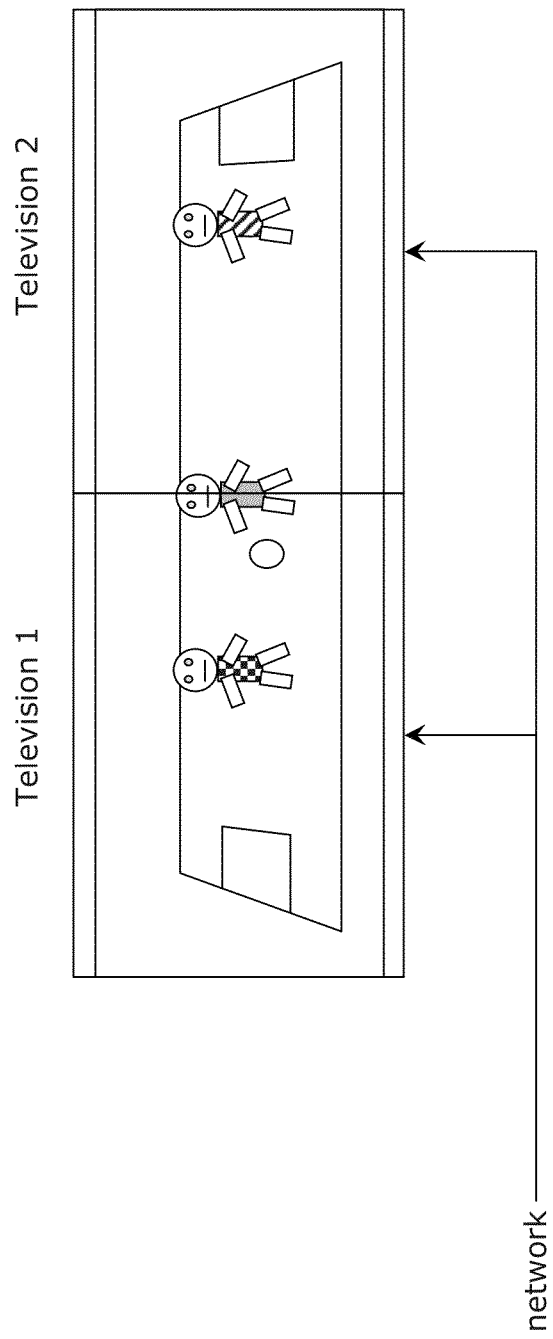
FIG. 44 is a diagram illustrating a configuration 2 for displaying a wide-angle video on the plurality of televisions.

Moreover, as FIG. 44 shows, the televisions may be connected to a network so that the television 1 on the left side receives and displays a video stream of the left half of a wide-angle video from the capturing system, and the television 2 on the right receives and displays a video stream of the right half of the wide-angle video from the capturing system. For synchronization, real-time information of the television 1 and the television 2 are synchronized at an NTP server or the like, and the real-time information at which respective frames are displayed are added to the supplemental data or the like in respective video streams. The televisions display the respective frames at the respective real-time information, thereby synchronizing each other. This configuration allows the wide-angle video to be displayed on a plurality of televisions, and also obviates the need for the STB in FIG. 43.

Figure 45:
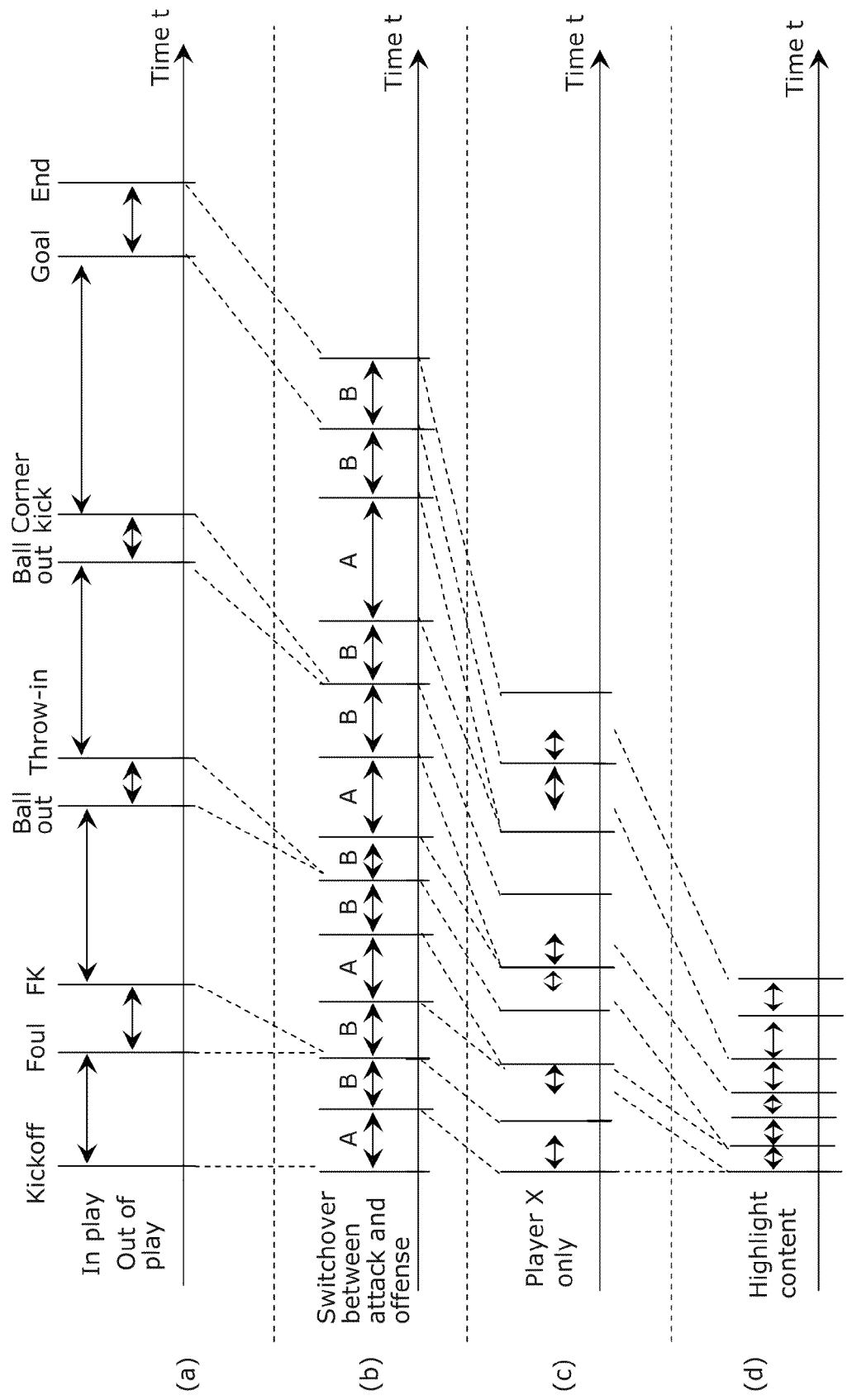
FIG. 45 is a diagram illustrating a method for implementing highlight playback that reflects user preference.

While in the distribution and viewing systems 1400 and 2900 according to the present embodiments 1 and 2, respectively, the preferred player and the preferred viewpoint are set as the user preference information, a "set playback time" may be specified in the user preference information. For example, the "set playback time" is specified due to a demand for viewing 120-minute game in a playback time of 10 minutes. In this case, the editing system weighs scenes based on the user preference information (preferred player), the subject position information, or the scene information, generates highlight scenes to generate a video so that a total length falls in the set playback time range, and the video is provided to the user. This configuration allows the user to view a video obtained by extracting only scenes of interest within the set time range. A specific example of the automatic video editing will be described with reference to sport in FIG. 45. The example of FIG. 45 illustrates a soccer game. First, the editing system deletes "Out of play" scenes from out-of-play scenes shown in (a) of FIG. 45, except for those at interruption due to a goal. A result is shown in (b) of FIG. 45. The user has less interest in out-of-play scenes. Thus, cutting these scenes can extract a region of user interest. Next, the editing system extracts scenes where a team preferred by the user is on the attack from scenes shown in (b) of FIG. 45, based on a switchover between attack and defense. A result when the user interest is a team B is shown in (c) of FIG. 45. In general, the user preferentially views scenes where the preferred team is on the attack. Thus, this can extract a region of user interest. Next, the editing system extracts scenes, shown in (c) of FIG. 45, where a player preferred by the user is close to ball position information. A result when a player X is preferred by the user is shown in (d) of FIG. 45. In general, a region of user interest is the ball position. Thus, extracting scenes where the preferred player is close to the ball position information can extract a region of user interest. In this manner, a short highlight playback content reflecting the user interest can be generated, FIG. 45 is by way of example. For example, the order of scene extraction may be different or the scene extraction may be performed once.

Figure 46:
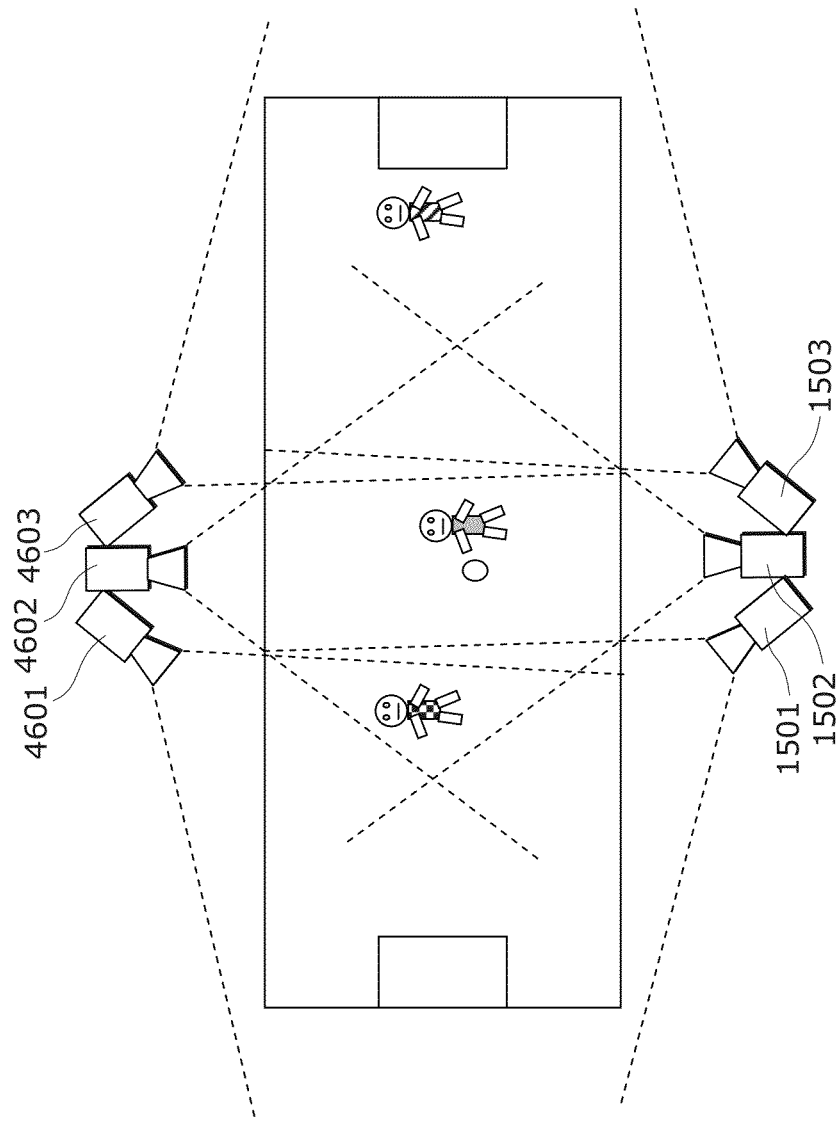
FIG. 46 is a diagram illustrating a method for recognizing characters, using a plurality of cameras.

While in the distribution and viewing systems 1400 and 2900 according to the respective embodiments 1 and 2, the location unit 1422 specifies the subject position information by performing the image recognition processing on the wide-angle video, not only the wide-angle video generated by the video generation unit 1423, but also the plurality of spot videos captured by the spot video capture units 2901 or a second wide-angle video, as shown in FIG. 46, that is captured from a different viewpoint than that of the wide-angle video may be utilized for the image recognition processing. One problem with the character recognition in the image recognition processing is image resolution. In the example of FIG. 46, the cameras 1501 to 1503 can capture a person in large size if the person is in the lower portion of the court (near side). Thus, the cameras 1501 to 1503 can recognize the face and so on. If the person moves to the upper portion (far side of the court), the cameras 1501 to 1503 cannot capture the person in large size, and the face recognition and so on may be difficult. Thus, providing means, such as cameras 4401, 4402, and 4403, of capturing the person from the opposite side, even the person moving toward the upper side of the court can be captured in large size. Hence, a result of analysis based on a wide-angle video captured by the cameras 4401, 4402, and 4403 is prioritized when the person position is in the upper portion, and a result of analysis based on a wide-angle video captured by the cameras 1501 to 1503 is prioritized when the person position is in the lower portion. This improves the accuracy of the analysis result of character recognition.

Moreover, for example, for character recognition based on face, a face can be recognized if the person is facing downward relative to the court of FIG. 46, but cannot be recognized if the person is facing opposite. Thus, providing means, such as the cameras 4401, 4402, and 4403, of capturing the person from the opposite side, the face can be recognized even if the person is facing upward relative to the court (in a direction toward far side of the court). Likewise, for example, for character recognition based on a uniform number on the back of a player, if the person is facing upward relative to the court of FIG. 46, the uniform number can be recognized, but cannot be recognized if the person is facing opposite. Thus, providing means, such as the cameras 4401, 4402, and 4403, of capturing the person from the opposite side, the uniform number can be recognized even if the person is facing downward relative to the court (in a direction toward the near side of the court). Thus, if the character can be recognized by any video by concurrently performing the image recognition on a plurality of videos having different viewpoints, the information is used as the subject position information. This configuration can improve the accuracy of the subject position information.

Figure 47:
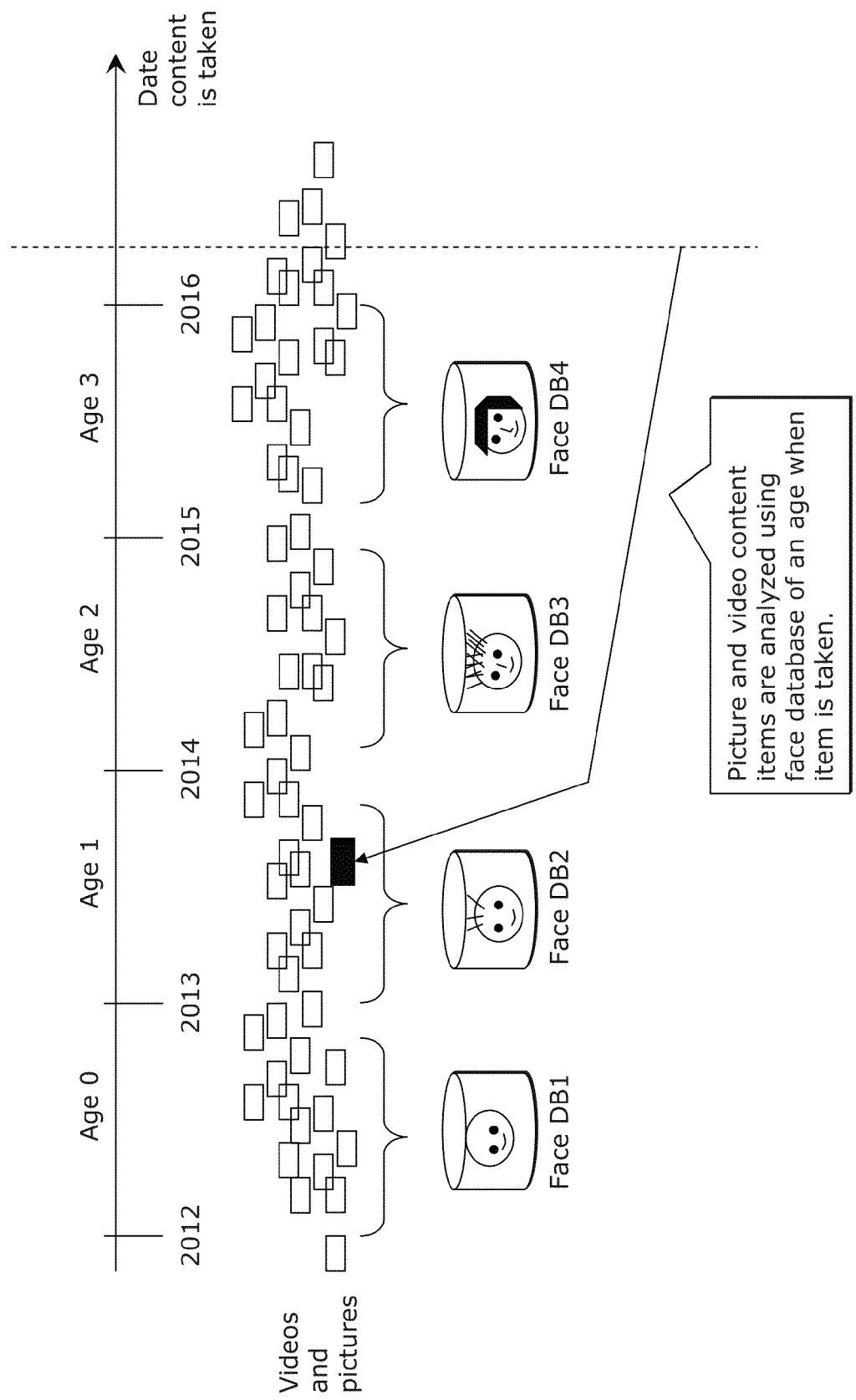
FIG. 47 is a diagram illustrating a configuration in which face recognition databases are provided for each age.

Moreover, exploitation of personal content is one embodiment of the distribution and viewing systems 1400 and 2900 according to the present embodiments 1 and 2. Examples include an event for leisure and various sports events such as sports meet at a preschool and a grade school for a child of the user. In such a case, the parent demand for viewing a video focusing on their own child. In doing so, the location unit 1422 of the editing systems 1420 and 2920 stores a child face recognition database, and using the face recognition database, identifies and tracks a person, and the automatic video selection and editing unit crops out a video from the wide-angle video or switches from a video to one captured by a spot video capture unit, in accordance with position information of the child specified by the user preference information, thereby responding to the demand. Here, the face recognition database may manage, as FIG. 47 shows, personal content captured by the user, in accordance with an age. The arrow in FIG. 47 indicates a time axis as to dates content items are taken, and personal content items such as videos and pictures are indicated by open squares. In this case, the face recognition database is created in accordance with date the videos and pictures are taken. In the example of FIG. 47, a face recognition database 1 (face DB1) is generated including videos and pictures taken in 2012 to 2013, a face recognition database 2 (face DB2) is generated including videos and pictures taken in 2013 to 2014, a face recognition database 3 (face DB3) is generated including videos and pictures taken in 2014 to 2015, and a face recognition database 4 (face DB4) is generated including videos and pictures taken in 2015 to 2016. Here, for example, when the video content captured in October, 2013 is to be added, a database that corresponds to a date the video was taken; the face DB2, in the case of FIG. 47, is referred to and the face recognition is performed. By changing the face recognition database depending on an age in such a manner, the location unit 1422 can accurately perform the face recognition and identify a person even if the person is growing up.

Moreover, in the present embodiments 1 and 2, the location unit 1422 utilizes the face recognition database to generate the subject position information. The face recognition database utilized to generate the subject position information may be added not only once but may be additionally added after a given time interval. In other words, as the number of pictures in the face recognition database increases, the face recognition database learns better, increasing the accuracy. Thus, the accuracy of the face recognition database improves as personal content increases over time. This configuration allows an increase in accuracy of tracking a child of the user after a given time interval, even if the tracking is poor when the user first saw the video.

While in the distribution and viewing system 2900 according to the present embodiment 2, the spot video capture units 2901 are fixed cameras, the spot video capture units 2901 may be PTZ cameras or the like capable of pan-tilt-zoom, and the analysis by the location unit 1422 of the editing system 2920 may be done in real time, the subject position information may be transmitted to the capture control unit 1401, and pan-tilt-zoom by the spot video capture units 2901 may be controlled so that the capture control unit 1401 can focus on the surrounding of a person or the ball. This configuration allows capturing and providing a more powerful video to the user.

While in the distribution and viewing systems 1400 and 2900 according to the present embodiments 1 and 2, respectively, the editing systems 1420 and 2920 generate and provide to a user video streams in accordance with personal preference, electronic books, in particular, a comic as shown in FIG. 48 may be provided to the user, rather than the video streams. To achieve this, the automatic video editing unit 1424 or the automatic video selection and editing unit 2902 generates a list of representative still images from the scene information, the subject position information, and the user preference information. The automatic video editing unit 1424 or the automatic video selection and editing unit 2902 sets panels of a comic, based on information on the representative still images, and inserts still images into the panels. At this time, information on the progress of the game and so on may be presented as a narration of FIG. 48. If a shooting scene is determined from the subject position information as illustrated in the last panel in (a) of FIG. 48, effects and imitative words (onomatopoeia) may be combined with the still images. Moreover, when capturing an event such as a conference, the conversation may be converted into text and a video may be combined with the text in a speech bubble next to the person position as shown in (b) FIG. 48. This configuration allows the user to enjoy the event not only in a video but also in a different mode: comic.

It should be noted that each of the components in each embodiment may take the form as dedicated hardware or may be implemented by executing a software program suitable for each component. Each component may be implemented by CPU or a program execution unit, such as processor, loading and executing a software program stored in a hard disk or a recording medium such as a semiconductor memory. Here, the software program for implementing the method for providing a video according to the embodiments is as follows.

In other words, the program causes a computer to execute a method for providing a video to a user, the method including: (a) acquiring (i) a first main video captured of a first capture space which is a portion of a capture space, and (ii) a second main video captured of a second capture space including a space other than the first capture space, the second capture space being a partial space of the capture space; (b) generating a wide-angle video by combining the first main video and the second main video acquired in step (a); (c) acquiring user preference information of the user via a network; (d) calculating a cropping region, based on the user preference information acquired in step (c), the cropping region being a partial area of the wide-angle video and smaller than an area captured in the wide-angle video; (e) cropping the wide-angle video generated in step (b) into the cropping region calculated in step (d); and (f) providing the user with a cropped video generated by cropping the wide-angle video in step (e).

While only the method for providing a video according to one or more aspects of the present invention has been described, with reference to the exemplary embodiments, the present invention is not limited to the embodiments. Various modifications to the present embodiments that may be conceived by those skilled in the art and combinations of components of different embodiments are intended to be included within the scope of the one or more aspects of the present invention, without departing from the spirit of the one or more exemplary embodiments.

While the present invention has been described with reference to the above embodiments, it should be noted that the present invention is, of course, not limited to the above embodiments. The present invention includes the following variations.

(1) The devices described above can be implemented in, specifically, a computer system which includes a microprocessor, a ROM, a RAM, a hard disk unit, a display unit, a keyboard, a mouse, and so on. The RAM or the hard disc unit stores a computer program. By the microprocessor operating in accordance with the computer program, each device achieves its function. Here, the computer program is, to achieve predetermined functionality, configured in combination with a plurality of instruction codes indicating instructions to the computer.

(2) Some or all the components included in each of the devices described above may be configured with one system LSI (Large Scale integration). The system LSI is a super multi-function LSI manufactured by integrating a plurality of components on one chip, and is, specifically, a computer system which includes a microprocessor, a ROM, a RAM, and so on. The ROM stores a computer program. The system LSI achieves its function by the microprocessor loading the computer program from the ROM into the RAM and performing operations, such as computing, in accordance with the loaded computer program.

(3) Some or all the components included in each of the devices described above may be configured with an IC card or a single module removably attached to each device. The IC card or the module is a computer system which includes a microprocessor, a ROM, a RAM, and so on. The IC card or the module may include the super multi-function LSI described above. The IC card or the module achieves its function by the microprocessor operating in accordance with the computer program. The IC card or the module may be of tamper-resistant.

(4) The present invention may be implemented in the methods described above. Moreover, the present invention may be achieved in a computer program implementing the methods by a computer, or may be achieved in digital signals which include the computer program.

Moreover, the present invention may be implemented in a computer-readable recording medium having stored therein the computer program or digital signals, for example, a flexible disk, a hard disk, CD-ROM, MO, DVD, DVD-ROM, DVD-RAM, BD (Blu-ray (registered trademark) Disc), or a semiconductor memory. Alternatively, the present invention may be implemented in the digital signal stored in these recording media.

The present invention may transmit the computer program or the digital signals via an electric communication line, a wireless or wired communication line, a network represented by the Internet, data broadcast, and so on.

Moreover, the present invention may be implemented in a computer system which includes a microprocessor and a memory, the memory may store therein the computer program, and the microprocessor may operate in accordance with the computer program.

Moreover, by transferring the program or the digital signals stored in the recording medium, or transferring the program or the digital signals via the network or the like, the program or the digital signals may be executed in other independent computer system.

(5) The above-described embodiment and variations may be combined.

INDUSTRIAL APPLICABILITY

A distribution and viewing system for video content, using the method for providing a video according to the present invention allows distribution of novel video content that reflects user preference information, which has not been achieved by conventional distribution by a broadcast station. Therefore, the present invention is highly usable in video distribution industry, such as internet video distributors, and industry of consumer products, such as televisions.

REFERENCE SIGNS LIST

10 Distribution and viewing system
100 Broadcast system
101 Broadcast video capture unit
102 Broadcast video editing unit
103 Broadcast stream production unit
104 Broadcast stream
110 Playback device
111 Tuner
112 Broadcast stream decoding unit
201 Remote controller
202 Digital TV
501 Video stream
502 PES packet string
503 TS packet
504 Audio stream
505 PES packet string
506 TS packet
507 Subtitle stream
508 PES packet string
509 TS packet
513 Transport stream
1400, 2900 Distribution and viewing system
1401 Capture control unit
1402 Video capture unit
1403 Communication I/F
1410 Capturing system
1420 Editing system
1421, 1427 Communication I/F
1422 Location unit
1423 Video generation unit
1424 Automatic video editing unit
1424a Region calculating unit
1424b Cropping unit
1425 Information acquisition unit
1426 Video providing unit
1430 Playback system
1431 Communication I/F
1432 Stream decoding unit
1433 Input I/F
1434 Application execution unit
1501 First camera
1502 Second camera
1503 Third camera
1504 Media tablet
1511 First main video
1512 Second main video
1513 Third main video
2301 Synchronization controlling unit
2404 Media tablet
2901 Spot video capture unit
2902 Automatic video selection and editing unit
2902a Scene segmentation unit
2902b Evaluation unit
2902c Video selection unit
2910 Capturing system
2920 Editing system
3001 to 3007 Camera
4101 Media tablet
4401 Camera

The invention claimed is:
1. A method, executed by a computer, for providing a video to a user, the method comprising:
(a) acquiring (i) a first main video captured of a first capture space which is a portion of a capture space, (ii) a second main video captured of a second capture space including a space other than the first capture space, the second capture space being a partial space of the capture space, and (iii) a sub video captured of at least a partial space of the capture space at a different angle from the first main video and the second main video at a same timing as the first main video and the second main video;
(b) generating a wide-angle video by combining the first main video and the second main video acquired in step (a);
(c) acquiring user preference information of the user via a network;

(d) calculating a cropping region, based on the user preference information acquired in step (c), the cropping region being a partial area of the wide-angle video and smaller than an area captured in the wide-angle video;

(e) cropping the wide-angle video generated in step (b) into the cropping region calculated in step (d);

(f) providing the user with a cropped video generated by cropping the wide-angle video in step (e);

(h) segmenting each of the cropped video obtained in step (e) and the sub video acquired in step (a) into plural scenes, based on a predetermined algorithm dependent on a type of an event taking place in the capture space; and (i) selecting, for each of the plural scenes, one of the cropped video and the sub video, based on the user preference information acquired in step (c), wherein in step (f), the one of the cropped video and the sub video selected in step (i) is provided to the user, and wherein in step (h), if the type of the event taking place in the capture space is sport, each of the cropped video and the sub video is segmented into the plural scenes at a timing when a result of determining, by the predetermined algorithm, whether a state of the event is "In play" or "Out of play" changes from one of the "In play" and the "Out of play" to the other.

2. The method according to claim 1, wherein in step (i), if the type of the event taking place in the capture space is sport, a video is selected from among videos of an immediately preceding "In play" scene when the "In play" is switched to the "Out of play," instead of selecting a scene of the "Out of play".

3. A method, executed by a computer, for providing a video to a user, the method comprising:

(a) acquiring (i) a first main video captured of a first capture space which is a portion of a capture space, (ii) a second main video captured of a second capture space including a space other than the first capture space, the second capture space being a partial space of the capture space, and (iii) a sub video captured of at least a partial space of the capture space at a different angle from the first main video and the second main video at a same timing as the first main video and the second main video;

(b) generating a wide-angle video by combining the first main video and the second main video acquired in step (a);

(c) acquiring user preference information of the user via a network;

(d) calculating a cropping region, based on the user preference information acquired in step (c), the cropping region being a partial area of the wide-angle video and smaller than an area captured in the wide-angle video;

(e) cropping the wide-angle video generated in step (b) into the cropping region calculated in step (d);

(f) providing the user with a cropped video generated by cropping the wide-angle video in step (e);

(h) segmenting each of the cropped video obtained in step (e) and the sub video acquired in step (a) into plural scenes, based on a predetermined algorithm dependent on a type of an event taking place in the capture space; and (i) selecting, for each of the plural scenes, one of the cropped video and the sub video, based on the user preference information acquired in step (c), wherein in step (f), the one of the cropped video and the sub video selected in step (i) is provided to the user, and wherein in step (h), if the type of the event taking place in the capture space is concert, each of the cropped video and the sub video is segmented into the plural scenes by determining, by the predetermined algorithm, whether a state of the event is "In performance" or "Out of performance".

\* \* \* \* \*